United States Patent [19]

Matsuzaki et al.

[11] Patent Number: 5,357,439
[45] Date of Patent: Oct. 18, 1994

[54] CUSTOM-MADE MANUFACTURING SYSTEM AND CUSTOM-MADE MANUFACTURING METHOD

[75] Inventors: Kichie Matsuzaki, Yokohama; Kaoru Imai, Yamato; Hideaki Suzuki, Yokohama; Hideaki Matoba, Yokohama; Masahiro Watanabe, Yokohama; Hidetoshi Inaba, Sapporo; Hisashi Onari, Yokohama; Masahito Uno, Kanagawa; Toru Mita; Ichiro Taniguchi, both of Yokohama; Koichi Sugimoto, Hiratsuka; Yoshio Matsumoto, Yokohama, all of Japan

[73] Assignee: Hitachi, Ltd., Tokyo, Japan

[21] Appl. No.: 666,927

[22] Filed: Mar. 11, 1991

[30] Foreign Application Priority Data

Mar. 9, 1990 [JP] Japan .................................. 2-56348

[51] Int. Cl.5 ............................................. G06F 15/46
[52] U.S. Cl. ................................. 364/468; 364/188
[58] Field of Search ............ 364/468, 146, 188, 474.22

[56] References Cited

U.S. PATENT DOCUMENTS

| | | | |
|---|---|---|---|
| 4,807,108 | 2/1989 | Ben-Arich et al. | 364/468 |
| 4,873,643 | 10/1989 | Powell et al. | 364/468 |
| 4,887,206 | 12/1989 | Natarajan | 364/468 |
| 4,887,207 | 12/1989 | Natarajan | 364/468 |
| 4,961,148 | 10/1990 | Holda et al. | 364/468 |
| 4,998,206 | 3/1991 | Jones et al. | 364/468 |
| 5,093,794 | 3/1992 | Howie et al. | 364/468 |
| 5,101,352 | 3/1992 | Rembert | 364/468 |
| 5,134,560 | 7/1992 | Ferriter et al. | 364/468 |
| 5,148,370 | 9/1992 | Litt et al. | 364/468 |
| 5,212,635 | 5/1993 | Ferriter | 364/468 |

FOREIGN PATENT DOCUMENTS 56-102455  5/1981  Japan .

OTHER PUBLICATIONS

The Industrial Robot vol. 4, No. 3 pp. 119–131, 1977 An International Quarterly Journal.
Machine and Tool, pp. 17–72 Oct. 1976 Tool Engineer.

*Primary Examiner*—Jerry Smith
*Assistant Examiner*—Jim Trammell
*Attorney, Agent, or Firm*—Antonelli, Terry, Stout & Kraus

[57] ABSTRACT

The present invention relates to a manufacturing system which accepts a custom order of product from a customer and custom manufactures a product without sacrificing manufacturing efficiency. The manufacturing system includes the featuring steps of inputting the required specification of a product, creating the product design based on the design information of the product transmitted from a designing department, status data from the production department, and the input required specification, showing the created product design to the customer, selectively indicating a product to be purchased, transmitting the specification of the selected product to the production department, and producing a product based on the selected product specification.

16 Claims, 52 Drawing Sheets

FIG. 13

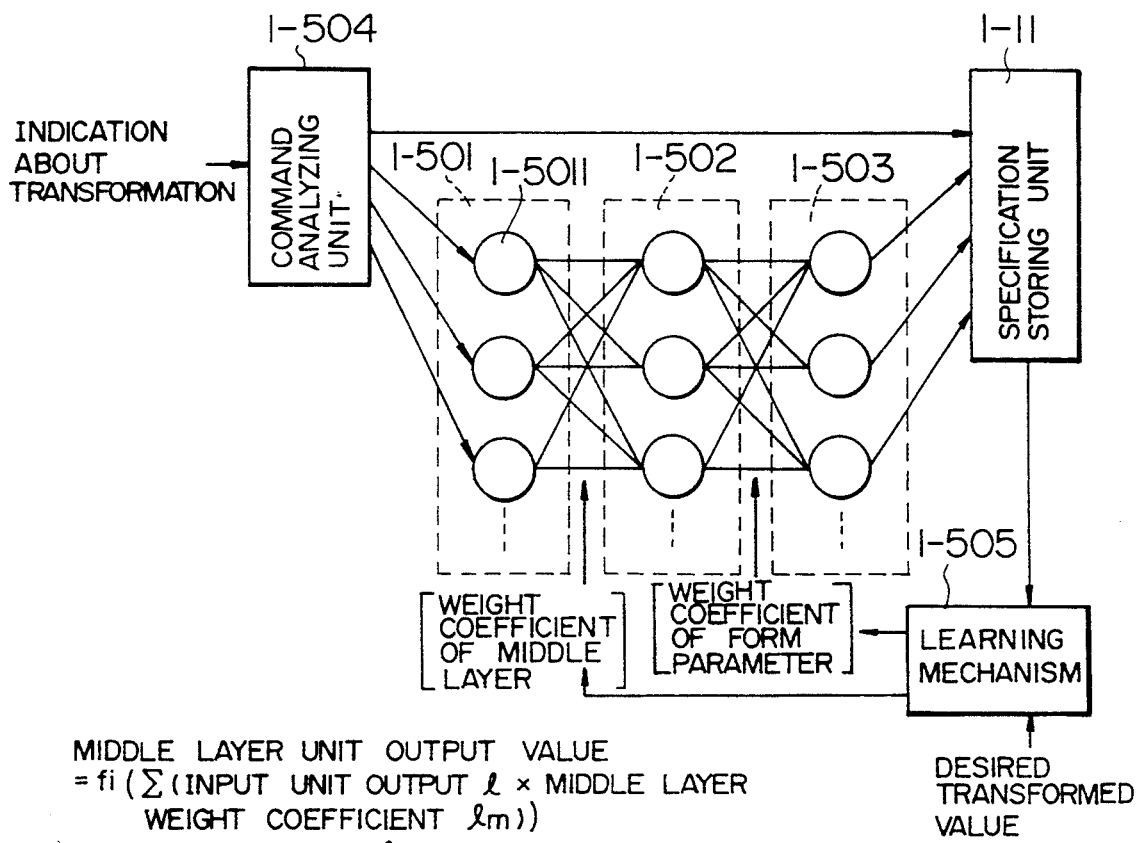

MIDDLE LAYER UNIT OUTPUT VALUE
= fi ( $\sum$ (INPUT UNIT OUTPUT $l$ × MIDDLE LAYER
     WEIGHT COEFFICIENT $lm$ ))
INPUT UNIT NUMBER $l$ FORM PARAMETER LAYER UNIT OUTPUT VALUE n
= fo ( $\sum$ (MIDDLE UNIT OUTPUT m × FORM PARAMETER
     LAYER WEIGHT COEFFICIENT mn ))
MIDDLE UNIT NUMBER m ·fi ( ), fo ( ) : ZIGMOID FUNCTION ① · INPUT UNIT OUTPUT $l$ : OUTPUT VALUE OF $l$-th INPUT UNIT ② · MIDDLE LAYER WEIGHT COEFFICIENT $lm$ : WEIGHT COEFFICIENT
    BETWEEN $l$-th INPUT UNIT AND m-th MIDDLE UNIT ③ · MIDDLE UNIT OUTPUT m : OUTPUT VALUE m-th MIDDLE UNIT ④ · WEIGHT COEFFICIENT mn OF FORM PARAMETER LAYER : WEIGHT
    COEFFICIENT BETWEEN m-th MIDDLE UNIT AND n-th FORM
    PARAMETER LAYER UNIT

FIG. 14

(1) INDICATION ABOUT EACH COMPONENT FORM
  · INDICATIONS ABOUT "LONGER", "SHORTER" AND "LARGER" AGAINST EACH COMPONENT SUCH AS A MAIN WING, A BODY AND A FAIL WING
(2) INDICATIONS ABOUT OVERALL FORM
  · INDICATIONS ABOUT "LONGER", "SHORTER" AND "LARGER" AGAINST THE OVERALL FORM
(3) SENSITIVE INDICATION
  · STYLISH
  · SHARP
  · WELL-BALANCED
  · CURVED
  · LINEAR
  · PRETTY
  · SIMPLE (FEATURE AMOUNT ABOUT CURRENT FORM)
  · MAIN WING SPAN / OVERALL LENGTH
  · BODY HEIGHT / OVERALL LENGTH
  · VERTICAL TAIL WING HEIGHT / OVERALL LENGTH
  · MAIN WING POSITION / OVERALL LENGTH
  · VERTICAL TAIL WING HEIGHT / BODY HEIGHT
  · BODY WIDTH / BODY HEIGHT
  · HORIZONTAL TAIL WING SPAN / MAIN WING SPAN
  · MAIN WING SPAN / MAIN WING ROOT WIDTH
  · WING END WIDTH / MAIN WING ROOT WIDTH
  · MAIN WING BACKWARD ANGLE
  · VERTICAL TAIL WING BACKWARD ANGLE
  · HORIZONTAL TAIL WING BACKWARD ANGLE

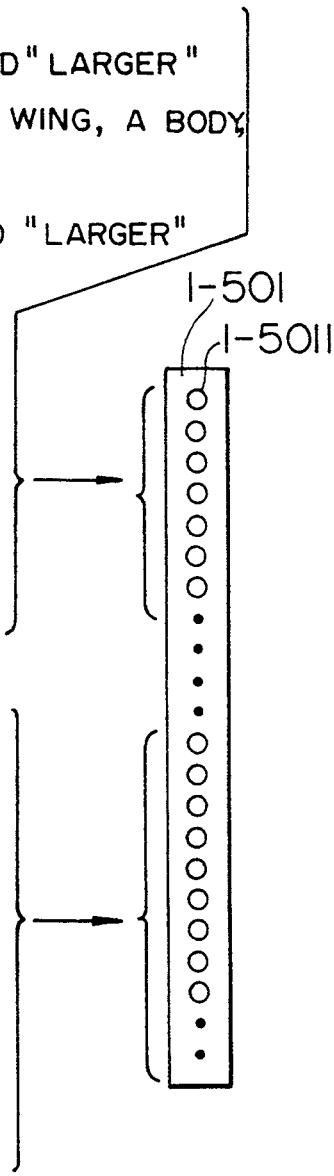

FIG. 18

<FUNCTION AND PERFORMANCE>

| SPECIFICATION ITEM | CONTENTS |
|---|---|
| ASCENDING SPEED<br>SPEED<br>STALL SPEED<br>STABILITY<br>FLIGHT RANGE<br>TURNING RADIUS<br>SPACE<br>COST | |

< OUTER APPEARANCE >
( RIGHT MAIN WING: )
( LEFT MAIN WING: )
( NOSE: )
( MIDDLE BODY: )
( TAIL: )
( VERTICAL TAIL WING: )
( RIGHT HORIZONTAL TAIL WING: )
( LEFT HORIZONTAL TAIL WING: )
( ENGINE: )
( RIGHT WHEEL: )
( LEFT WHEEL: )

< FORM PARAMETER >

| PARAMETER | CONTENTS |
|---|---|
| OVERALL LENGTH<br>MIDDLE BODY DIAMETER<br>OVERALL WIDTH<br>WING AREA<br>MAIN WING FORM<br>MAIN WING ASPECT RATIO<br>MAIN WING MOUNTING POSITION (AGAINST BODY)<br>HORIZONTAL TAIL WING AREA<br>HORIZONTAL TAIL WING MOUNTING POSITION (AGAINST BODY)<br>VERTICAL TAIL WING AREA<br>VERTICAL TAIL WING MOUNTING POSITION (AGAINST BODY) | |

STRUCTURE OF PARTS DATA OF TOY PLANE

CONTENTS OF PART MANAGEMENT DATA
- ( PART TITLE :                    )
-   ( NUMBER OF PART TYPES :        )
-   ( GROUP OF PART NUMBERS :       )

CONTENTS OF PARTS DATA
- ( PART NUMBER :                   )
-   ( ATTRIBUTE GROUP :             )
-   ( CONSTRAINT GROUP :            )
-   ( SUPPLYING STATE :             )
-   ( COST :                        )

FIG. 27

INPUT PATTERN ITEM

| |
|---|
| (1) PRODUCT SPECIFICATION (CARS)<br>　　　PRESENCE OR ABSENCE OF OPTION<br>　　　SIZE OF BODY<br>　　　OUTPUT OF ENGINE |
| (2) STOCK OF PARTS (OR ITS CHANGE) |
| (3) LINE STATUS<br>　　　AMOUNT OF UNDIGEST ORDERS<br>　　　LOAD OF WORK CENTER · RATIO OF URGENT JOB · NUMBER OF STEPS<br>　　　CHANGE OF WORK CENTER STATUS |
| (4) SELLING STRATEGY<br>　　　IMPORTANCE OF ORDER<br>　　　PROFIT RATIO |
| (5) DESIGN LEAD TIME<br>　　　UNDIGEST ORDER<br>　　　PROPORTION OF NON-STANDARD PRODUCT |

FIG. 28

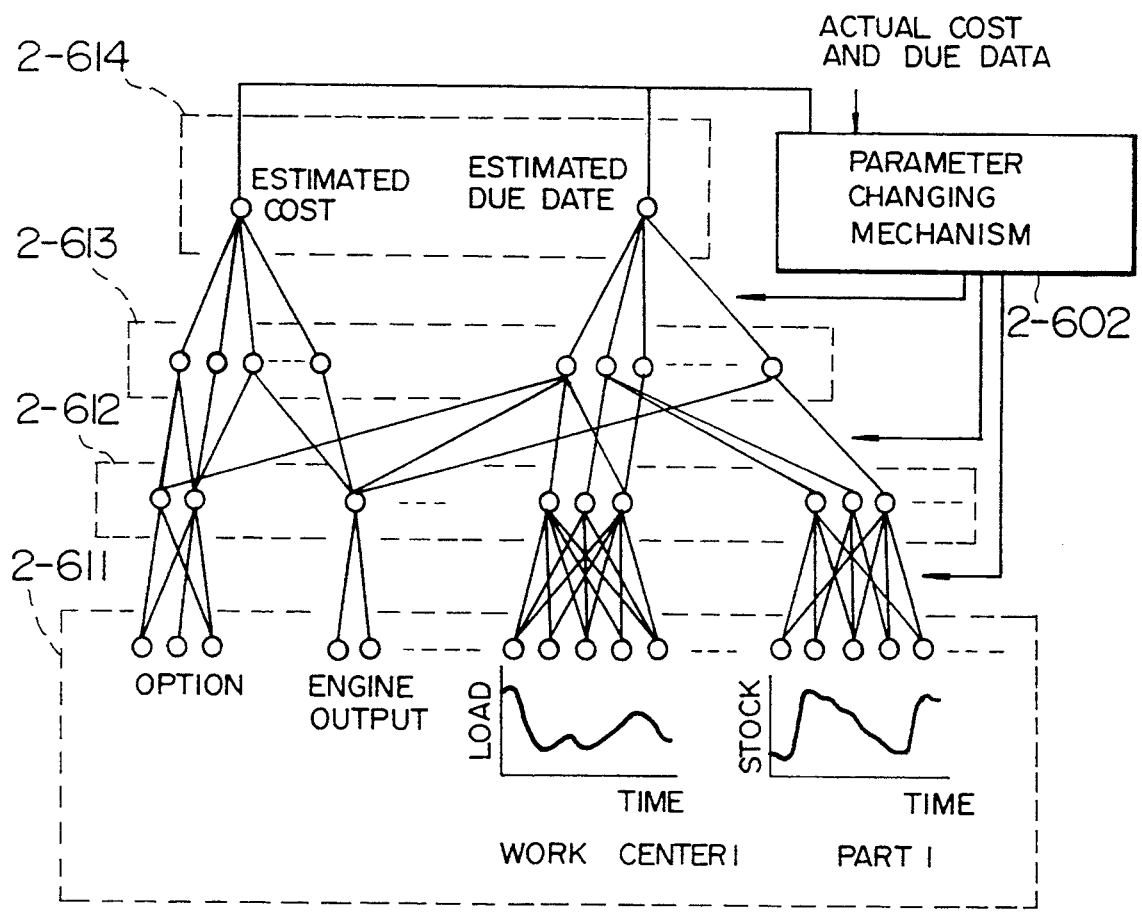

OUTPUT VALUE OF FEATURE DRAWING LAYER =

$f(\Sigma$ INPUT UNIT OUTPUT $\times$ WEIGHT PARAMETER OF FEATURE DRAWING LAYER)
INPUT LAYER

OUTPUT VALUE OF MIDDLE LAYER =

$f(\Sigma$ FEATURE DRAWING LAYER UNIT OUTPUT $\times$ WEIGHT PARAMETER OF MIDDLE LAYER)
FEATURE DRAWING LAYER

OUTPUT VALUE OF OUTPUT LAYER =

$f(\Sigma$ MIDDLE LAYER OUTPUT $\times$ WEIGHT PARAMETER OF OUTPUT LAYER)
MIDDLE LAYER $f$ : ZYGMOID FUNCTION 2-611 --- INPUT LAYER
2-612 --- FEATURE DRAWING LAYER
2-613 --- MIDDLE LAYER
2-614 --- OUTPUT LAYER

REQUIREMENT FREQUENCY

REQUIREMENT TENDENCY

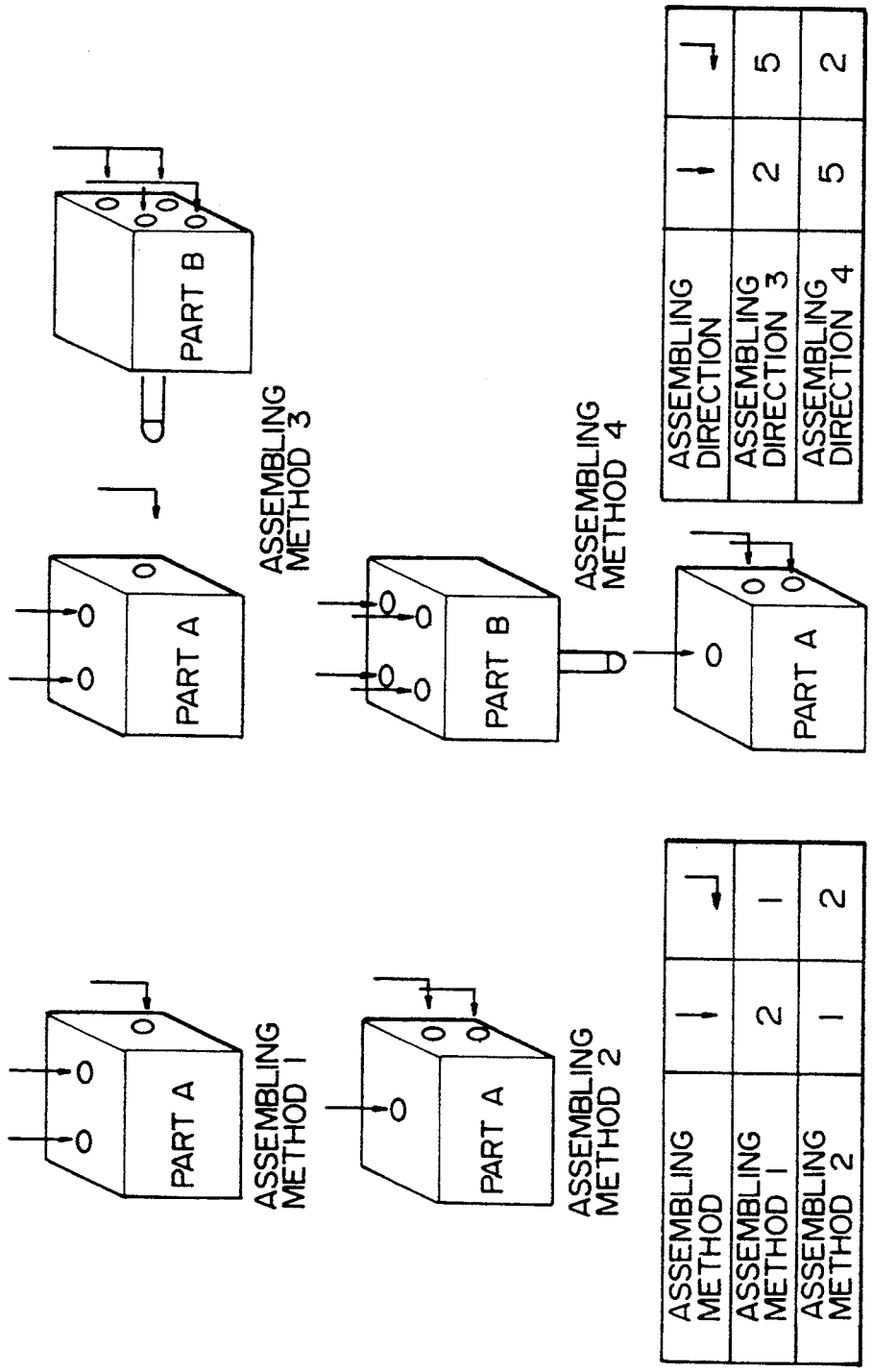

FIG. 35

| COORDINATE SYSTEM TITLE | DETERMINING FLAG |
|---|---|
| A_Base | 0 |
| A_Hole 1 | 1 |
| A_Hole 2 | 1 |
| ⋮ | |

FIG. 37

| ASSEMBLING DIRECTION | DIFFICULTY |
|---|---|
| ↓ | 0 |
| ↗ | 5 |
| → | 10 |
| ↑ | 15 |
| ↗ | 20 |
| ⋮ | ⋮ |

PART B
PART A
ROBOT
WORKING BENCH

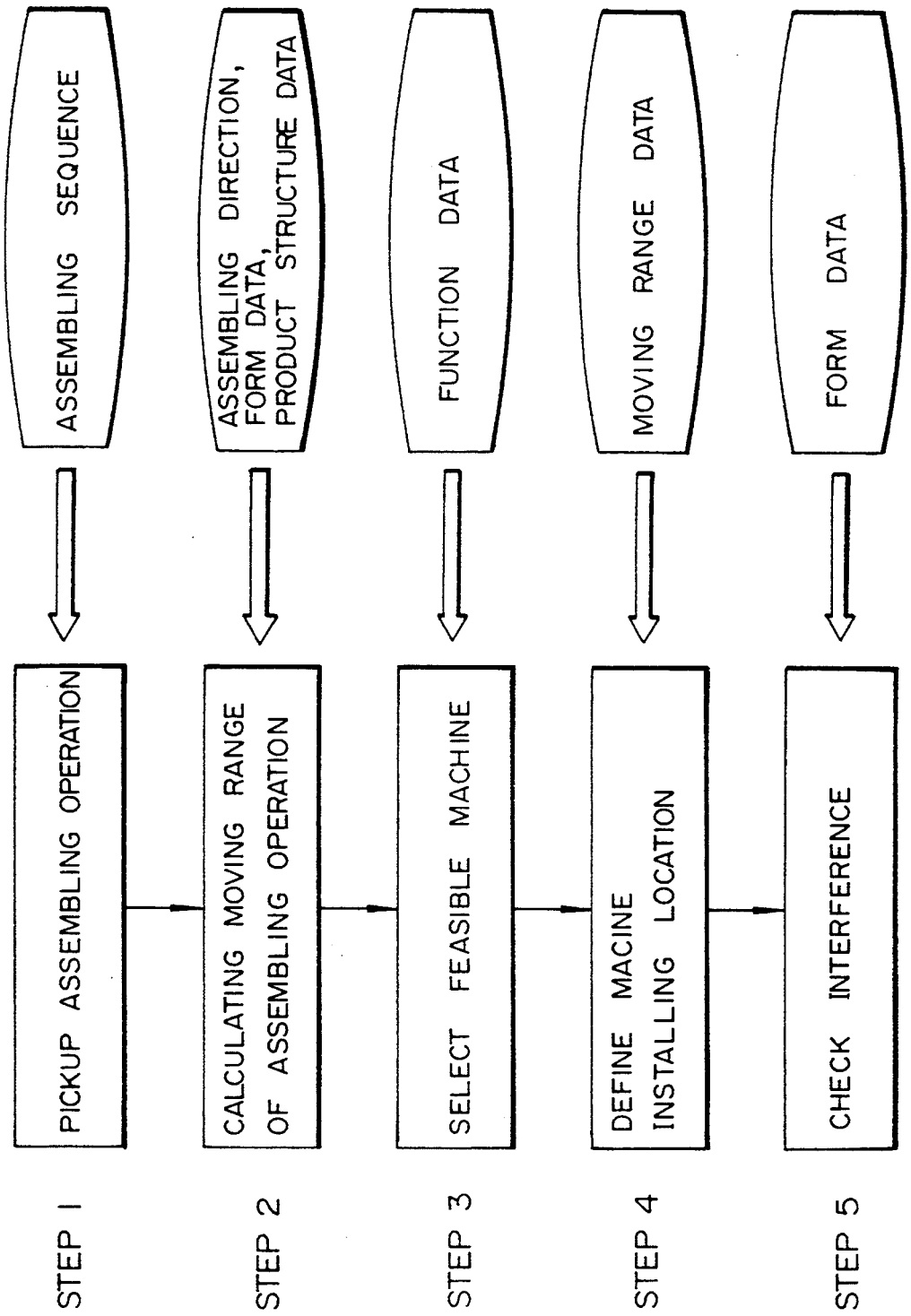

CUSTOM-MADE MANUFACTURING SYSTEM AND CUSTOM-MADE MANUFACTURING METHOD

BACKGROUND OF THE INVENTION

The present invention relates to a manufacturing system which is capable of receiving an order from a customer and manufacture the order. More particularly, the invention relates to an order manufacturing system and an order manufacturing method which is able to define a specification in keeping with the requirement of a customer, as is compatible with the efficiency of the manufacturing system itself and, further manufacture the orders issued by a customer based on the defined specification.

As the conventional system for flexibly changing the manufacturing method according to various kinds of products, the manufacturing system for implementing the proper manufacturing methods for various kinds of product has been proposed in JP-A-56-102455. This manufacturing system includes a modularized compound producing system, an information processing system for managing a production process and schedule, and a control system for controlling each device included in the compound production system based on the information supplied by the information processing system.

The conventional manufacturing system has been configured on the assumption that the specification of product to be manufactured is pre-defined and has been intended for efficient manufacturing of the product with pre-defined specification. In these days, however, each customer is likely to have his or her own need for product. Hence, the recent key point of the manufacturing system lies in that the product designed according to each customer's specification is allowed to be manufactured as efficiently as possible. In defining the specification of product, if the specification is defined merely on the requirement of the customer, some disadvantageous conditions may appear such as difficulty in producing the product and less efficient use of equipment, resulting in an increase in the product price too much. If the specification of the product does not meet the requirement of a customer, production is discontinued.

SUMMARY OF THE INVENTION

In order to overcome the foregoing disadvantages, it is therefore an object of the present invention to realize definition of the specification of the product with the properly adjusted function, price and due date for quick production of the product, in keeping the production department well-informed with the ordering department. The other object of the present invention is to provide an order manufacturing system which is capable of exchanging information between the ordering department and a designing department, and thereby designing product in a manner to meet the requirement of a customer.

In carrying out the object in a preferred mode, the order manufacturing system according to the present invention includes the ordering department for accepting an order of a product, the ordering department having means for inputting a specification required by a customer, means for holding design information about the product, means for holding manufacturing results of the product, means for holding status data regarding the production department, means for creating and showing a design of the product based on the information sent by the above means, and means for inputting a selective indication of the desired product. The design information used herein means the information created in a designing department and transmitted by a transmitting means. The status data of the production department used herein is transmitted from the production department by the transmitting means.

For product production based on the ordered specification, it is necessary to use means for transmitting the product specification to the production department, a production planning means for creating production information based on the product specification, and means for assembling and working the product based on the production information.

In the ordering department, when no design of product created and shown to a customer meet the requirement of the customer, for ordering and manufacturing the product according to the specification required by the customer, it is possible to use means for transmitting the specification of the product required by the customer to the designing department and means for designing the product according to the required specification and transmitting the design information to the ordering department. In order to create and show as many product designs as possible through the designing department, the frequently required product is precreated and stored in the ordering department by using means for transmitting the preferred specifications required by customers obtained in the ordering department to the designing department and means for designing the product by referencing the tendency of the required specifications.

In order for the order manufacturing system to reliably produce the ordered product, the designing department provides means for transmitting the information about the ordered feature to the production department and means for transmitting the design information to the production department in such a manner to carry out the whole design and production method for the specific product.

For defining the specification of the product, the design information about the product, the manufacturing results about the product and the status data about the production department are used. Hence, it is possible to presume the function, the price, and the due data of the product manufactured for the first time in a manner to allow the well-balanced specification to be defined. That is, customer satisfaction depends on the cost performance and whether or not the customer can obtain the product as early as possible. The present order manufacturing system is capable of precisely presuming various specifications in the light of the state of the production department and the results of the analogous product produced previously, thereby allowing the customer to define the optimum specification by comparing various specifications.

Though the ordered product has various specification, for defining several factors such as an optimum working and assembling sequence, machinery, and equipment layout, the production planning system is provided which provides a database for storing knowledge about product assembly based on the data of the feature of parts composing each product, the data about structure of a product, and functional performance of manufacturing equipment. The manufacturing equipment is allowed to be arranged by freely combining a positioning unit providing two or more horizontal conveying mechanisms and a posture positioning unit. Hence, based on the definition of the production planning system, the optimum equipment arrangement for a product specification is realized, resulting in allowing the product to be manufactured very efficiently.

The present order manufacturing system is capable of transmitting the specification required by a customer from the ordering department to the designing department or transmitting the design information from the designing department to the ordering department. If, therefore, the customer does not meet the existing design information, it is possible implement a special design fitted for the requirement. Further, by transmitting the customer-required specifications, collected in the ordering department, to the designing department, it is possible for the designing department to infer the preference of the customers and design components of the product according to the customer's requirement.

Moreover, by transmitting the status information of the feature of the production department included therein to the designing department, the designing department is capable of implementing such a custom design thereby guaranteeing more excellent productivity.

BRIEF DESCRIPTION OF THE DRAWINGS

FIG. 13 is a view showing detailed arrangement of a form transforming unit 1-5 shown in FIG. 2;

FIG. 14 is a view showing kinds of transformation indicating commands and input layer units used when a product is ordered in the order manufacturing system according to the present invention;

FIG. 18 is a view showing one example of structure of data stored in required specification storing unit 1-11;

FIG. 27 is a view showing input pattern items used in the cost and due data estimating unit 2-61 shown in FIG. 24;

FIG. 28 is a view showing an embodiment of the cost and due data estimating unit 2-61 shown in FIG. 24 employing a neural circuit network mode;

FIG. 30 is a view for illustrating the process done in a production planning system 3 and showing the relationship between an assembling method and an assembling direction;

FIG. 35 is a graph showing a coordinate system identification data;

FIG. 37 is a graph showing one example of knowledge about assembly;

FIG. 42 is a flowchart showing the procedure for defining an assembling sequence, machines/tools to be used, and a layout;

DESCRIPTION OF THE PREFERRED EMBODIMENTS

Hereinafter, an embodiment of the present invention will be described with reference to FIGS. 1 to 52.

Figure 1:
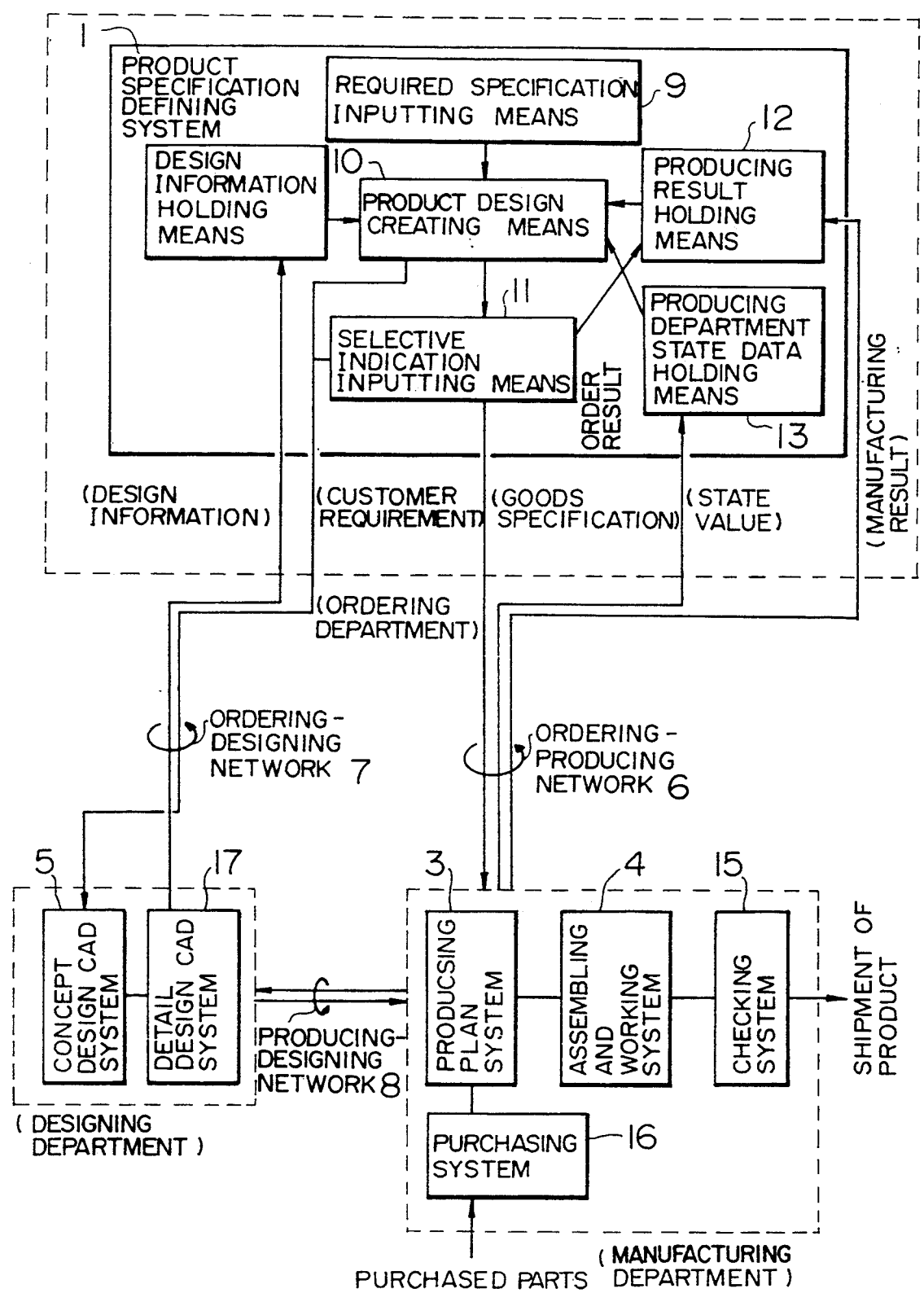
FIG. 1 is a diagram showing an order manufacturing system according to an embodiment of the present invention.

FIG. 1 is a block diagram showing arrangement of an order manufacturing system according to an embodiment of the present invention. In an ordering department, there is provided a product specification defining system 1 located at each order window. A producing department includes a production planning system 3, an assembling and working system 4, a checking system 15, and a purchase system 16. A designing department includes a concept design CAD system 5 and a detail design CAD system 17. The product specification defined in the ordering department is transmitted to the producing department through an ordering-to-producing network 6. The ordering-to-producing network 6 is used for transmitting the status data about the manufacturing equipment collected in the producing department to the ordering department. The status data used herein means the data about production capability, such as how much of a product can be processed, an operating state of the equipment, and the number of required workers in the production department. The customer-required specification input in the ordering department is transmitted to the designing department through an ordering-designing network 7. The ordering-designing network 7 is also used for transmitting the design information about the product created in the designing department. The information about the feature of the manufacturing equipment included in the production department is transmitted to the designing department through a production-design network 8. The production-design network 8 is also used for transmitting the design information about the product created in the designing department to the production department.

Figure 2:
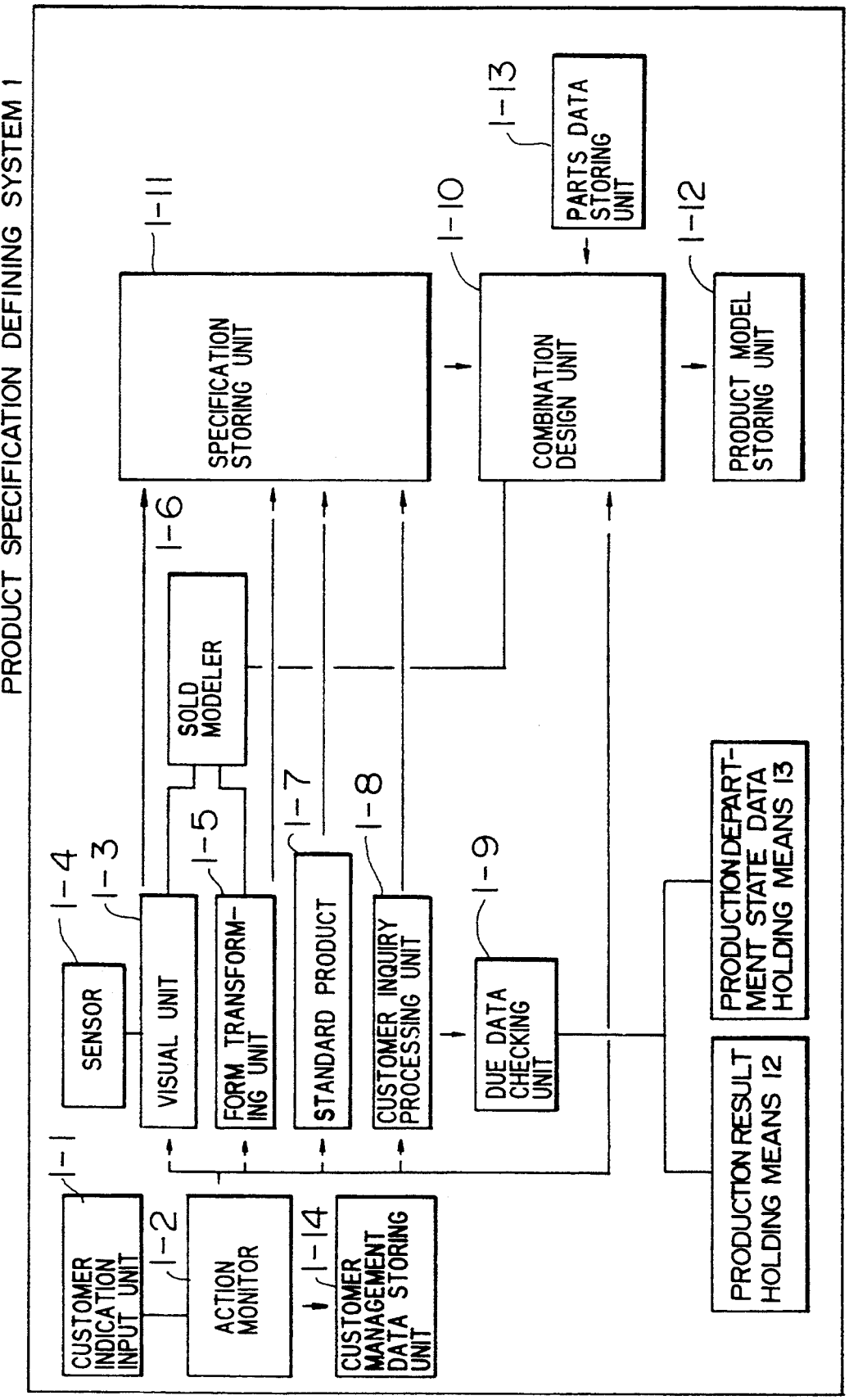
FIG. 2 is a block diagram showing detailed arrangement of a product specification defining system 1 included in the order manufacturing system shown in FIG. 1.

FIG. 2 is a block diagram showing one example of one implementation of the product specification defining system 1. 1-1 denotes a customer indication input unit for inputting various indications of a customer such as selection of the required specification inputting means, input of a required specification, selection of purchased product from displayed product designs, requirement of a detailed specification and an outer appearance of product, and an indication of a changed specification to the displayed product designs. 1-2 denotes an action monitor which interprets an indication of a customer input at the customer indication input unit 1-1 and states the module based on the indication. If the indication means selection of the required specification inputting means or selection of a changed specification item, the selected specification or item is displayed on the screen. In response to the requirement for detailed specification and an outer appearance of product, the required information is displayed on the screen. If the product to be purchased is selected, the selected product is stored in a customer management data storing unit 1-14. 1-3 denotes a visual unit in which a three-dimensional form and a color of a sample shown for inputting an outer appearance specification are input at a sensor 1-4, thereby allowing the outer appearance model of the product to be generated. 1-5 denotes a form transforming unit which accepts a form transforming indication against the outer appearance model created by the visual unit 1-3 or the outer appearance model of the standard product held in a product model generating unit 1-7 and changes the outer appearance model based on the indication. 1-6 denotes a sold modeler which is used when the visual unit 1-3 represents the three-dimensional form data input at the sensor 1-4 with a mathematical function and the form transforming unit 1-5 modifies the form model represented with the mathematical function. 1-7 denotes a standard product model generating unit which indicates the standard product models to the customers with no clear specifications of their own. 1-8 denotes a customer inquiry processing unit which accepts the customer-required specification represented with numerical values and types and inputs the customer-required specification into the required specification storing unit 1-11 or accepts the inquiry about the due data of a product design and starts a due data checking unit 1-9. The due data checking unit 1-9 serves to estimate the due data of the product model by using the data held in a manufacturing result holding means 12 and a production department state data holding means 13 in response to the inquiry about the due data of the product design input by a customer and shows the estimated due date to the customer. The foregoing visual unit 1-3, form transforming unit 1-5, standard product model generating unit 1-7, and custom inquiry processing unit 1-8 compose a required specification inputting means 9. The customer indication inputting means 1-1 and the action monitor 1-2 compose a selective indication inputting means 11. The input required specification is stored in the required specification storing unit 1-11. 1-10 denotes a combination design unit which designs the product based on the specification required by a customer and stores the designed product in a product model storing unit 1-12. The resulting design is not a rigid new design for the required specification, but a combination design having allowable parts to be used and an allowable working range. The required specification storing unit 1-11, the combination design unit 1-10, the product model storing unit 1-12, the customer management data storing unit 1-14, and the due data checking unit 1-9 compose a product design creating means 10. The combination design is formed by using the design information about the product stored in the parts data storing unit 1-13 and created by the designing department. The parts data storing unit 1-13 is a concrete implement of a design information holding means 14.

Figure 3:
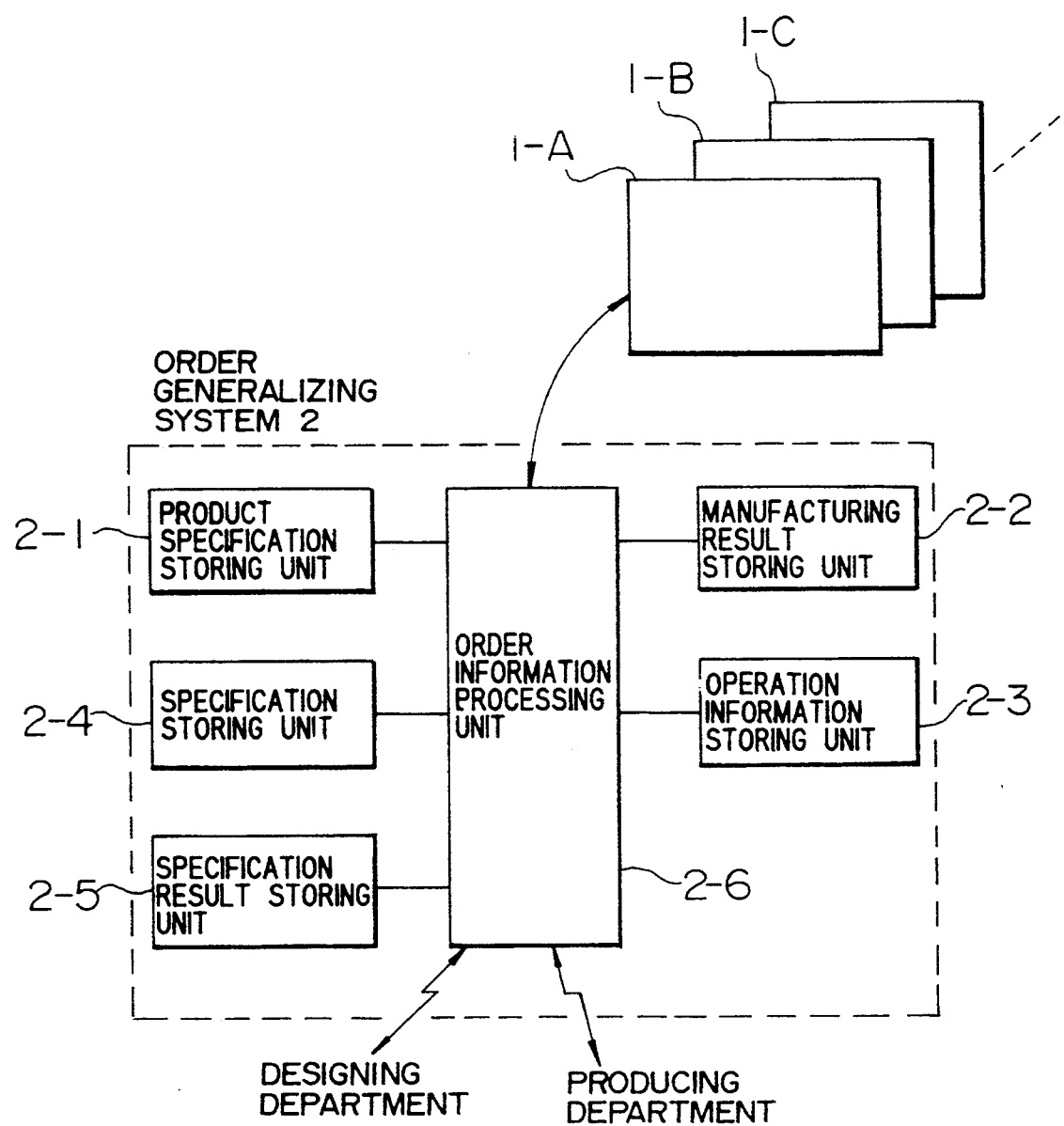
FIG. 3 is a block diagram showing detailed arrangement of an order generalizing system 2 included in the order manufacturing system shown in FIG. 1.

The foregoing description is concerned with the arrangement of the product specification defining system 1 for a single product. In general, two or more product specification defining systems 1 are installed in each branch office, for example. Hence, it is necessary to install a system for generalizing those product specification defining systems 1. FIG. 3 is a block diagram showing detailed arrangement of the order generalizing system 2. In FIG. 3, 1-A, 1-B and 1-C respectively denote product specification defining systems installed in the branch offices, for example. The installation of the order generalizing system 2 results in changing a function of estimating the due data about the product model from the product specification defining system 1 to the order generalizing system 2. That is, in response to the inquiry of the customer about the due data of the product model, the due date checking unit 1-9 included in the product specification defining system 1 sends the product model to the order generalizing system 2 for asking the estimated due data of the system 2. Then, the due data checking unit 1-9 receives the estimated result and indicates it to the customer. In this process, 2-1 denotes a product specification storing unit 2-1 which serves as a buffer for receiving the product specification created by the product specification defining system 1 and stored in the product model storing unit 1-12 and transmitting the product specification to the production department; 2-2 denotes a manufacturing result storing unit which serves to store the various specifications of the product ordered in the past and information regarding the cost and the duration required for producing each kind of product and which manufacturing equipment is used for each kind of product. The manufacturing result storing unit 2-2 is an actual implementation of the manufacturing result holding means 12. 2-3 denotes an operation information storing unit which serves to store the state data about the current manufacturing equipment transmitted by the production department. The operation information storing unit 2-3 is one actual implementation of the producing department state data holding means 13. 2-4 denotes a special required specification storing unit which is a buffer for transmitting to the designing department a special customer-required specification transmitted by the product specification defining system 1. The special customer-required specification means the specification which is not included in the product specifications stored in the product data storing unit 1-13. 2-5 denotes a required specification result storing unit which serves to hold all the customer-required specifications input in the product specification defining system 1. 2-6 denotes an order information processing unit which serves to process the foregoing data and has the following main functions of:

Receiving the product specification created in the product specification defining system 1 and transmitting the product specification to the production department, Estimating the cost and the duration required for producing the product according to the specification created by the product specification defining system 1 on the basis of the data about the specifications and the producing results of the product ordered in the past and the state data about the current manufacturing equipment, Transmitting to the designing department the specifications required by the customer which do not meet the specifications to be created and shown to the customer by the product specification defining system 1, Drawing the preferred customer requirements based on all the specifications required by past customers and transmitting the preferred requirements to the designing department, and Transmitting the information about the design of the product created in the designing department to each product specification defining system 1.

Figure 4:
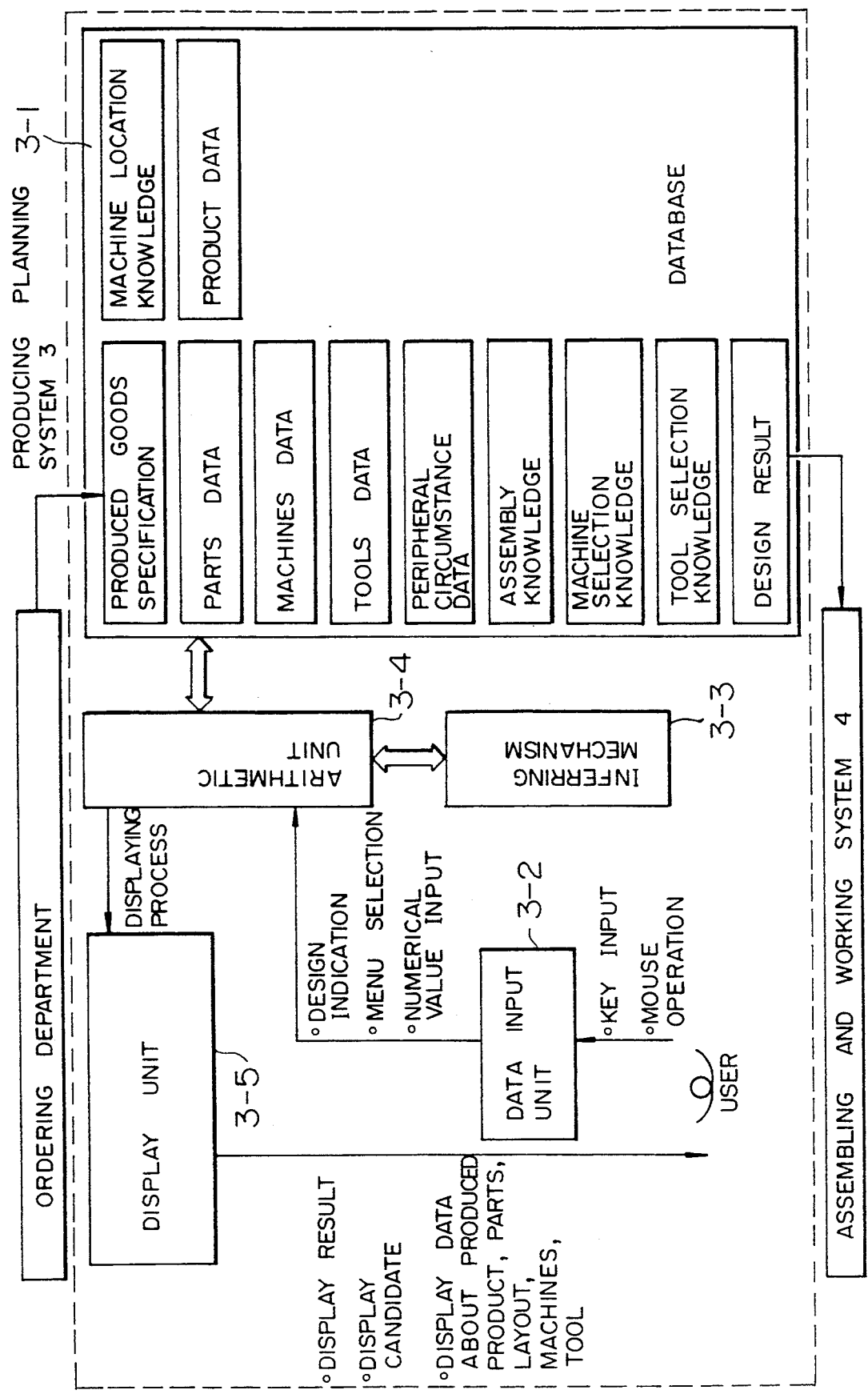
FIG. 4 is a diagram showing detailed arrangement of a production planning system 3 included in the order manufacturing system shown in FIG. 1.

FIG. 4 is a block diagram showing one example of arrangement of the production planning system 3. 3-1 denotes a database which serves to store various kinds of pieces of information shown in FIG. 4, such as feature data about parts composing one produced good, data about structure of one produced good, and knowledge about assembly based on the functional performance of the manufacturing equipment. 3-2 denotes a data input unit to which an operator can input an instruction in an interactive manner when designing the manufacturing process. 3-3 denotes a program which defines an optimum assembling sequence, machines to be used, and an installed equipment layout. 3-4 denotes an arithmetic unit which receives the instructions input in the data input unit 3-2 and serves to operate an inferring mechanism 3-3. 3-5 denotes a display unit which displays the result of designing the manufacturing process and the information used for designing the manufacturing process.

Figure 5:
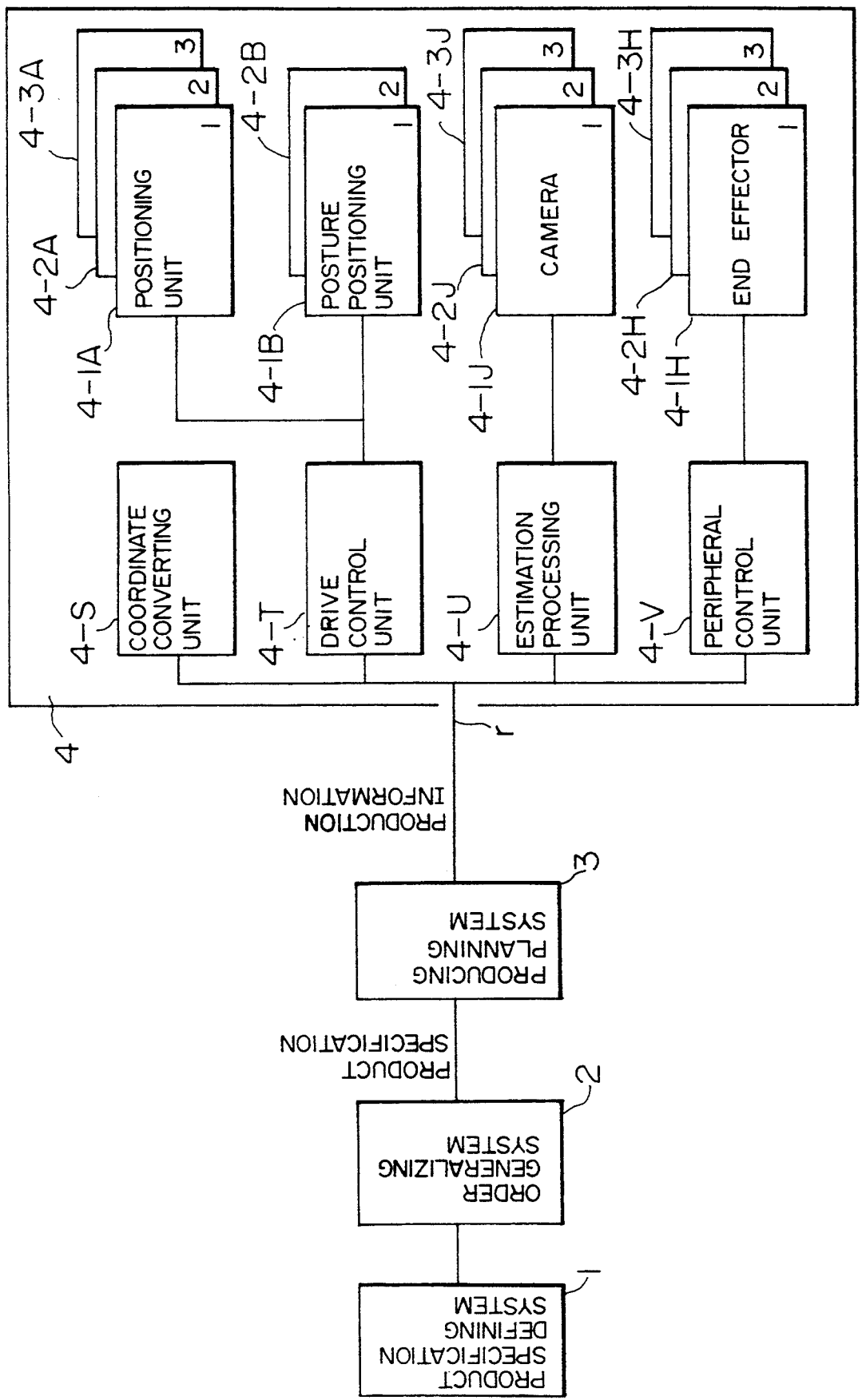
FIG. 5 is a diagram showing arrangement of an assembling and working system 4 included in the order manufacturing system shown in FIG. 1.

FIG. 5 is a block diagram showing detailed arrangement of the assembling and working system 4 which is composed of three positioning units and two posture positioning units. When the ordering department accepts a certain kind of product, the production planning system 3 operates to create the production information r based on the product specification and send the information r to the assembling and working system 4.

The assembling and working system 4 serves to work or assemble the parts based on the production information r. The positioning units 4-A and the posture positioning unit 4-B are arranged based on the production information r. 4-U denotes an estimation processing unit for estimating a relative position between both units 4-A and 4-B with a camera 4-J. Then, a coordinate converting unit 4-S serves to correct the relative position between both units 4-A and 4-B based on the information of the estimation processing unit 4-U. Based on the corrected result, a drive control unit 4-T serves to control the work of the positioning unit 4-A and the posture positioning unit 4-B depending on a predetermined working sequence and assembling sequence. At a time, a peripheral control unit 4-V serves to control work of an end effector 4-H. The coordinate converting unit 4-S, the drive control unit 4-T, the estimation processing unit 4-U, and the peripheral control unit 4-V are communicated through a common bus.

In turn, the description will be directed to how the present order manufacturing system works and carries out the processing.

At first, the product specification defining system 1 will be described.

Figure 6:
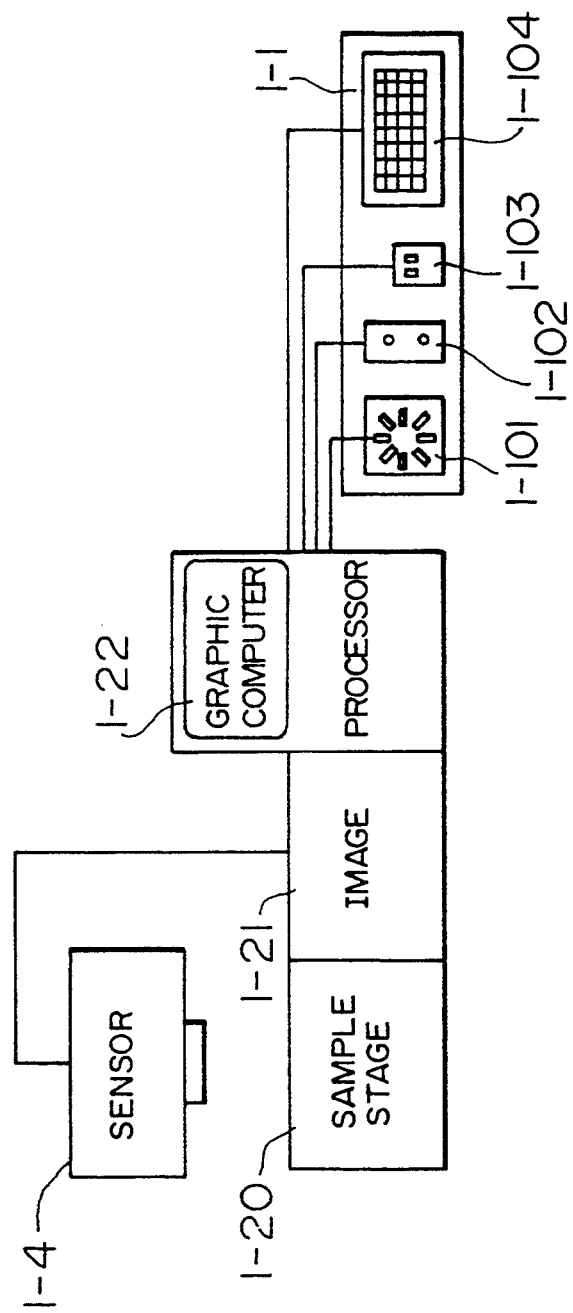
FIG. 6 is a view showing one example of hardware arrangement of the product specification defining system 1.

FIG. 6 is a view showing an example of hardware arrangement included in the product specification defining system 1. The customer indication input unit 1-1 is composed of an octal-direction switch 1-101, an up-down switch 1-102, a mouse 1-103, and a keyboard 1-104. The octal-directional switch 1-101 and the up-down switch 1-102 are used for selecting the required specification inputting means and indicating the changed specification against the product design shown on the display unit. The mouse 1-103 is used for selecting the proper product from the shown product designs and requesting the detailed specification and the outer appearance of the product. The keyboard 10104 is used for inputting numerical values and types about the required specification, customer names, and customer codes. 1-20 denotes a sample stage on which a sample is placed and providing the sensor 1-4. 1-21 denotes an image processor which holds some modules of the visual unit 1-3 for processing a color image, a density image, and a distance image input by the sensor 1-4. The visual unit 1-3 also has some modules held in a graphic computer 1-22. The graphic computer 1-22 is a computer having a graphic processing function and includes the action monitor 1-2 composed of parts of program, part of the visual unit 1-3, the form transforming unit 1-5, the standard product model generating unit 1-7, a solid modeller 1-6, the customer inquiry processing unit 1-8, the due data checking unit 1-9, the combination design unit 1-10, and storage units such as the required specification storing unit 1-11, the product model storing unit 1-12, the part data storing unit 1-13, and the customer management data storing unit 1-14.

Figure 7:
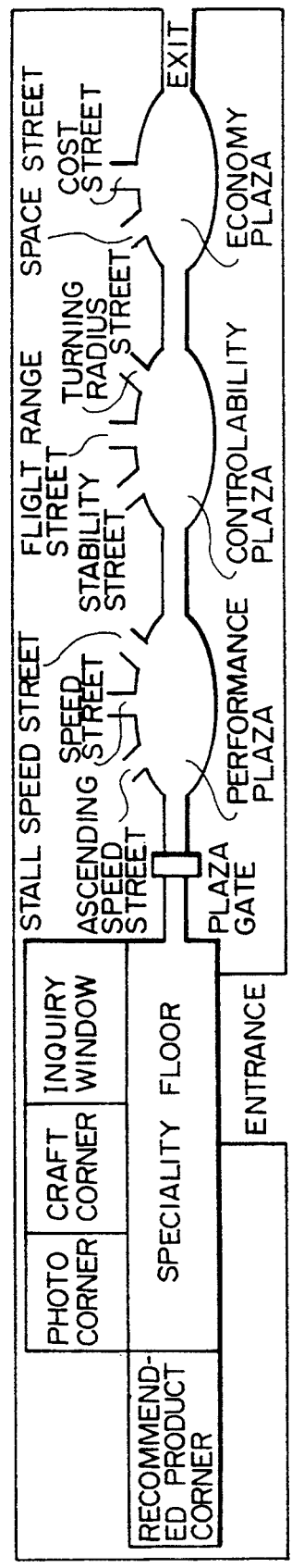
FIG. 7 is a view showing screen displayed when starting to operate the product specification defining system 1.

FIG. 7 is a view showing a screen appearing when the product specification defining system starts to work. On the upper portion of the screen are displayed a title and a background sketch of the ordering system. On the lower portion of the screen are displayed to types of the required specification inputting means and the types of the specification items to be changed against the displayed product designs in the form of a map for a shopping center.

Figure 8:
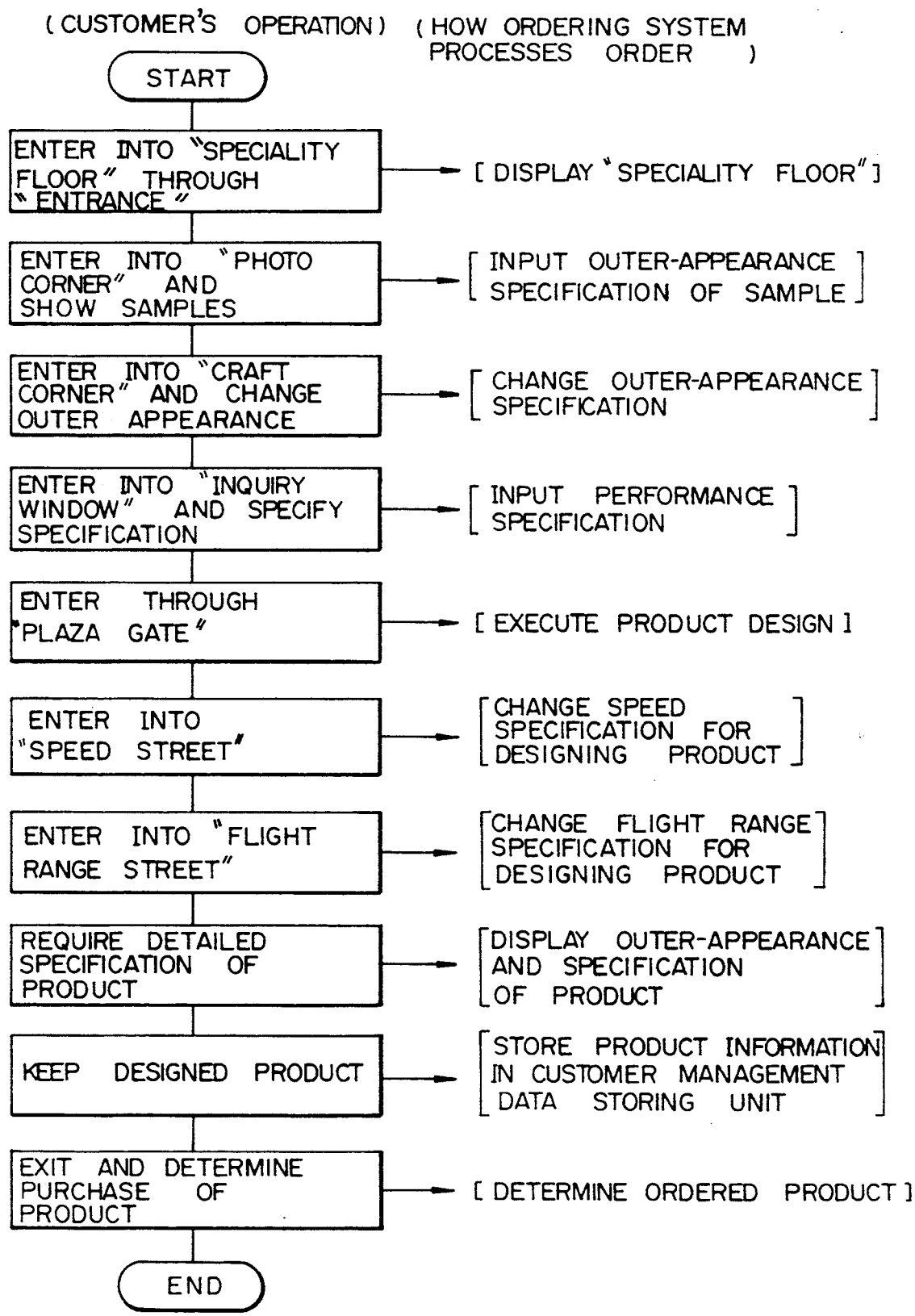
FIG. 8 is a flowchart showing how a customer operates the order manufacturing system according to the present invention.

FIG. 8 is a flowchart for illustrating how a customer operates the ordering system from the initial state as mentioned above to the end of ordering the product as taking an example of a toy plane as the product. To begin with, the octal-directional switch 1-101 is turned down toward the front side for indicating the start of the present ordering system. A marker indicating the customer is entered into a "speciality floor" through an "entrance". In the "speciality floor", the customer selects the required specification inputting means. As shown in FIG. 7, the map displays a "recommended product corner" at the left side, a "photo corner" at the upper left side, a "craft corner" at the upper side, and an "inquiry window" at the right side. With the octal-directional switch 1-101 being turned down to any one of the left, the upper left, the upper, and the upper left sides, the action monitor 1-2 receives the information about the turning-down direction at the customer indication input unit 1-1 and starts one of the standard product model generating unit 1-7, the visual unit 1-3, the form transforming unit 1-5, and the customer inquiry processing unit 1-8 depending on the turning-down direction of the octal-directional switch 1-101.

In case the customer wants to input the outer appearance of the product, the "photo corner" is selected. Then, the action monitor 1-2 moves the marker to the "photo corner" on the map and passes the control to the visual unit 1-3. The visual unit 1-3 receives a three-dimensional form and colors of a sample shown by the customer by the below-described method. Upon completion of the processing done by the visual unit 1-3, the marker returns to the "speciality floor" again. Next, in case the customer wants to change the specification of the outer appearance input on the sample, the "craft corner" is selected. The action monitor 1-2 moves the marker to the "craft corner" and passes the control to the form transforming unit 1-5. The form transforming unit 1-5 serves to change the original outer-appearance specification according to the customer's desire by using the below-indicated method. Upon completion of the processing done by the form transforming unit 1-5, the marker returns to the "speciality floor" again. Next, in case the customer wants to input the performance specification about the product, the "inquiry window" is selected. The action monitor 1-2 moves the marker to the "inquiry window" and passes the control to the customer inquiry processing unit 1-8. The customer inquiry processing unit 1-8 serves to input the specification about the performance or the like specified by the customer by using the below-indicated method. Upon completion of the processing done by the customer inquiry processing unit 1-8, the marker returns to the "speciality floor" again.

After the customer finishes the input of the specification desired by him or her, the customer turns down the octal-directional switch 1-101 to the right side for the purpose of moving the marker to a plaza gate. At a time, the action monitor 1-2 moves the marker to the "plaza gate" and passes the control to the combination design unit 1-10. The combination design unit 1-10 serves to design the product as referring to the data stored in the parts data storing unit 1-13 according to the requirement of the customer stored in the required specification storing unit 1-11 and store the resulting design in the product model storing unit 1-12.

Figure 9:
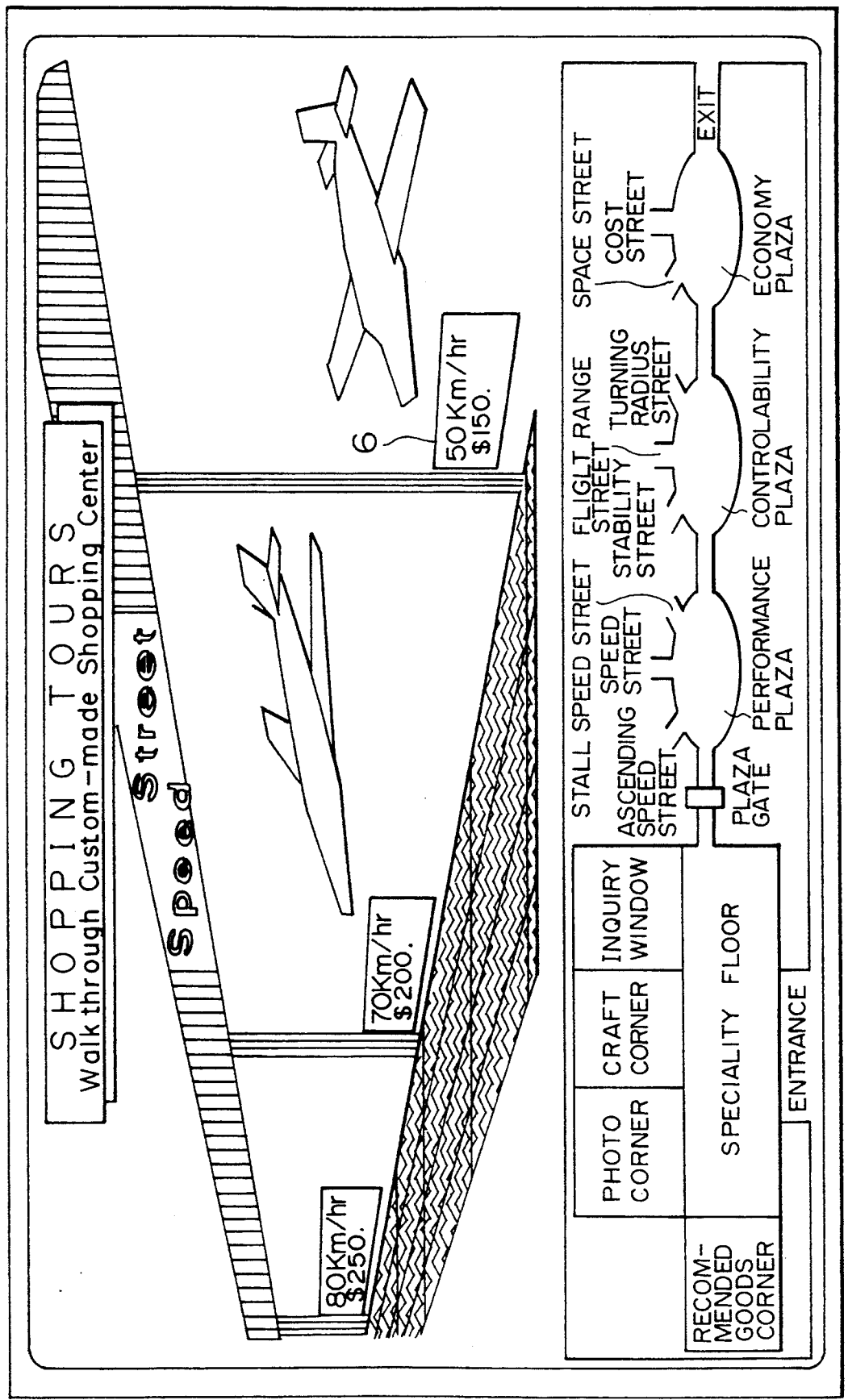
FIG. 9 is a view showing an example of a screen on which two or more products are displayed in the order manufacturing system according to the present invention.

In this state, in case the customer wants to know the designed product, the marker is moved from the "plaza gate" to the street corresponding to the desired specification item. Two or more streets are prepared and are crossed at a place called a plaza. In the embodiment shown in FIG. 7, there are prepared three plazas of "performance plaza", "controllability plaza", and "economy plaza", which are connected to "ascending speed street", "speed street", "stall speed street", "stability street", "flight range street", "turning radius street", "space street", and "cost street". In case the customer remarks the speed of the toy plane, with the octal-directional switch 1-101, the marker indicating the customer is moved from the "plaza gate" to the "performance plaza", and then to the "speed street". Depending on the movement of the switch 1-101 operated by the customer, the action monitor 102 serves to specify the "speed" item as the remarked specification and start the combination design unit 1-10. The combination design unit 1-10 serves to re-design the toy plane based on the values increased or decreased by a certain amount from the required specification value about the speed stored in the required specification storing unit 1-11 and store the resulting designs in the product model storing unit 1-12. Then, those resulting designs are displayed on the screen as shown in FIG. 9. At the middle portion, there is provided the toy plane with the performance of 70 km/hour stored in the required specification storing unit 1-11. At the back and the front portion based on the middle portion, there are respectively provided the toy plane with the performance of 80 km/hour and that with the performance of 50 km/hour. At this stage, in case the customer wants a toy plane with a faster speed, the customer should turn down the octal-directional switch in the upper side, resulting in allowing the action monitor 1-2 to remark the speed and specify the increase and start the combination design unit 1-10. Then, the combination design unit 1-10 serves to re-design the toy plane with the speed value larger than 80 km/hour by a constant amount and store the resulting design in the product model storing unit 1-12. On the screen, this new designed toy plane with the performance of 90 km/hour is ranged at the back of the proceeding toy plane with the performance of 70 km/hour. In case the customer wants a toy plane with a slower speed, on the other hand, the customer should turn down the octal-directional switch 1-101 to the lower side, resulting in allowing the action monitor 1-2 to remark the speed and specify the decrease and start the combination design unit 1-10. Then, the combination design unit 1-10 serves to re-design the toy plane with the speed value smaller than 50 km/hour by a constant amount and store the resulting design in the product model storing unit 1-12. The foregoing description is concerned with when the customer remarks the speed as a specification item. In case the customer remarks another specification item, likewise, with the octal-directional switch 1-100, the marker is allowed to enter into the street for the remarked specification item. It results in allowing various toy planes with serially changed specifications to be displayed on the screen. As a required specification in changing the street is the specification given before entering into the street. That is, assuming that the toy plane with a proper speed is displayed on the middle portion of the screen, when the marker is entered into the "flight range street", it is possible to estimate the resulting design holding the selected speed as well as the changed flight range.

Figure 10:
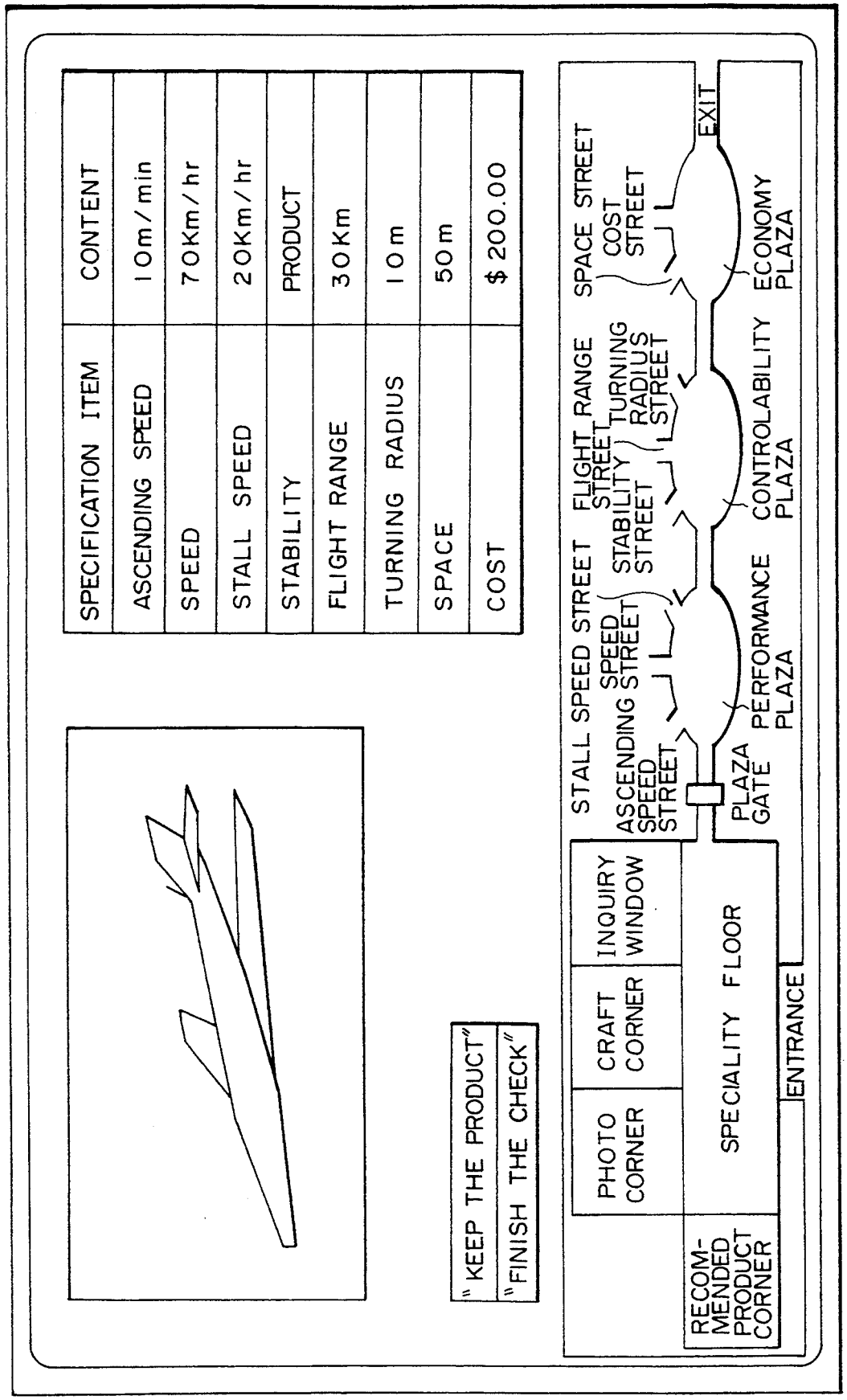
FIG. 10 is a view showing an example of a screen displaying a detailed specification of one good produced in the order manufacturing system according to the present invention.

In case the customer finds his or her favorite design and wants to know the detailed specification of the product, on the screen shown in FIG. 9, the customer should click the plate for the favorite design with the mouse 1-103. The plate indicates the value and the cost of the specification item for the street. The action monitor 1-2 detects the clicking and displays the information about the selected toy plane on the screen. FIG. 10 shows the contents of the information. On the left side of the screen is displayed the detailed outer appearance of the toy plane. This outer appearance image is a three-dimensional model so that the customer can view the design from various points of view. Specifically, with the octal-directional switch 1-101, the toy plane image is allowed to be rotated in several directions. On the right side of the screen is displayed the detailed specification of this toy plane. In case the customer wants to know more detailed information concerning each specification item, the customer should click the item with the mouse 1-103. With the item being clicked, the details of the item will be displayed. If the customer likes the toy plane as a result of checking the detailed specification, the customer should click a menu "keep the product" shown on the lower right side of the screen with the mouse 1-103. If not, the customer should click a menu "finish the check" with the mouse 1-103. The action monitor 1-2 detects the clicking and if the menu "keep the product" is clicked, stores in the customer management data storing unit 1-14 the information about the selected toy plane stored in the product model storing unit 1-12. Even if either menus is clicked, there appears the screen shown in FIG. 9 given before entering into the screen for checking the detailed specification. At this stage, if the customer decides to purchase the toy plane, with the octal-directional switch 1-101, the customer should move the marker to the "exit". When the marker passes out of the "exit", it means that the toy plane has been ordered. Then, the product (toy plane) specification is transmitted through the order generalizing system 2 to the production department at which the ordered product is manufactured.

The foregoing description has indicated on the screen various titles such as the entrance, the speciality floor, the recommended product corner, the photo corner, the craft corner, the inquiry window, the plaza gate, the performance plaza, the controllability plaza, the economy plaza, the ascending speed street, the speed street, the stall speed street, the stability street, the flight range street, the turning radius street, the space street, the cost street, and the exit. Those titles are used so that the customer can easily understand the present ordering system. The titles may be changed depending on the subject product. In essence, what is required for the titles is that they are fitted for the means for inputting the required specification of the product and the changed specification items for the product design.

Figure 11:
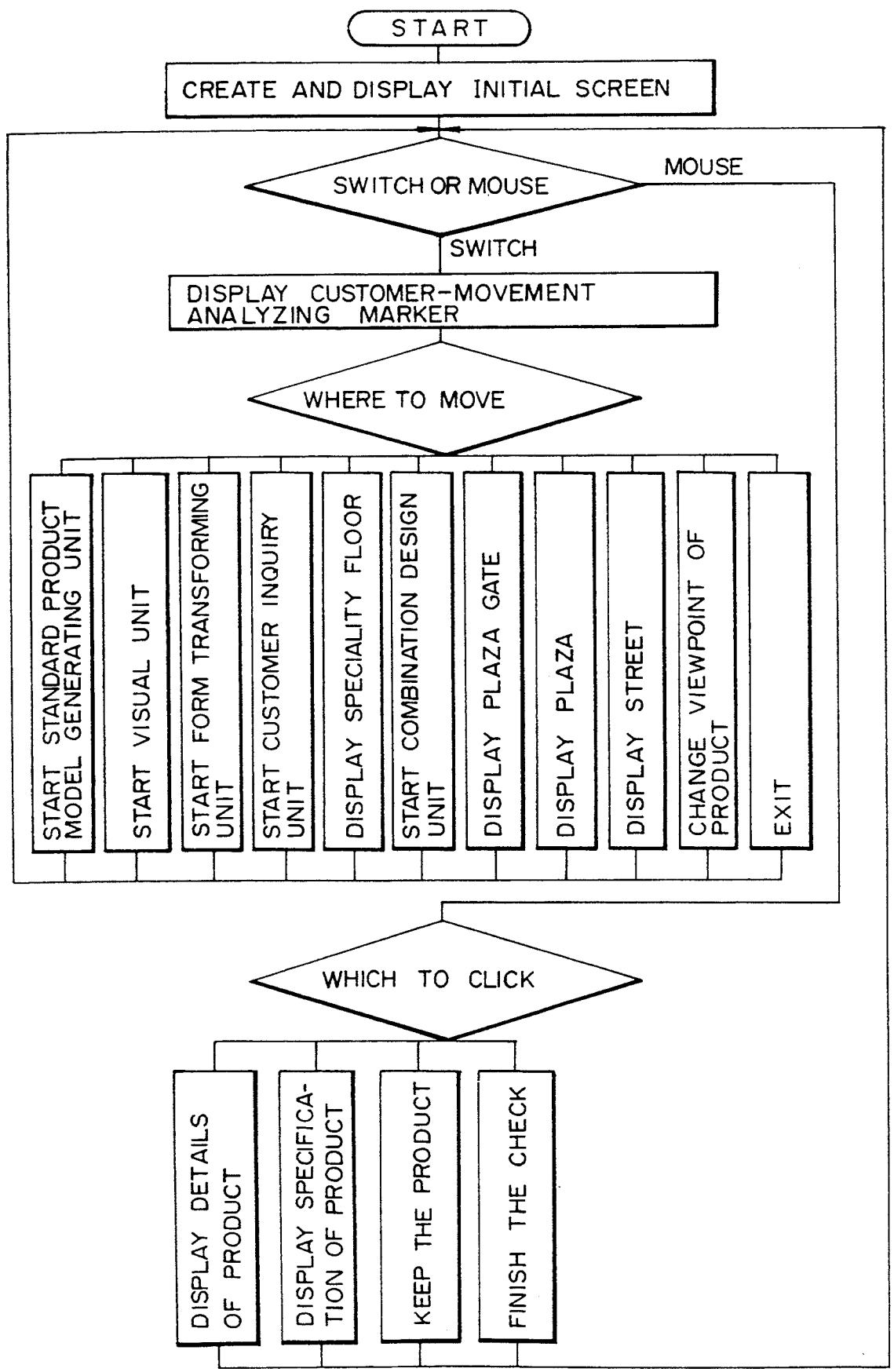
FIG. 11 is a flowchart showing the flow of an action monitor 1-2 shown in FIG. 2.

FIG. 11 is a flowchart for illustrating how the action monitor 1-2 works depending on the operation flow of the customer.

Figure 12:
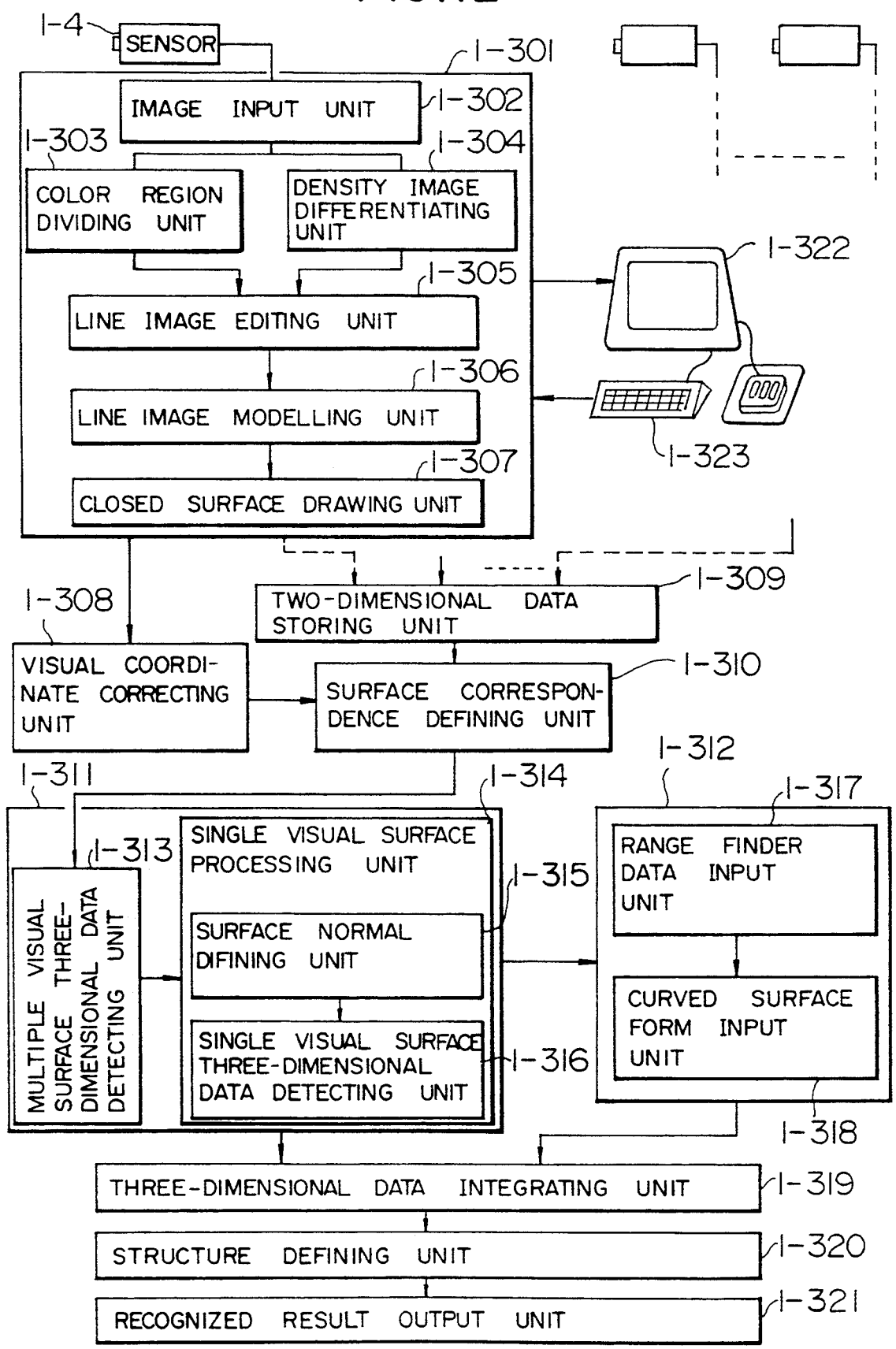
FIG. 12 is a block diagram showing detailed arrangement of visual unit 1-3 shown in FIG. 2.

FIG. 12 is a block diagram showing arrangement of the visual unit 1-3. As shown, 1-301 denotes a color image recognition unit which serves to recognize a form color of each surface composing an object from one color image. 1-302 denotes an image input unit which serves to output a color image data of an object photographed by the camera 1-4. The color image data, in general, consists of three primary colors of red (R), green (G), and blue (B). 1-303 denotes a color region dividing unit which serves to convert the data into hue and chroma data and divide the image into right areas based on the hue and chroma data. On the other hand, the data output at the image input unit 1-302 is also sent to a density image differentiating unit 1-304. The density image differentiating unit 1-304 serves to convert the data into brightness data and differentiate the brightness data for drawing edge supplementary stations. The processed result, that is, the line data of the color region dividing unit 1-303 and the density image differentiating unit 1-304, is edited and modified in a line image editing unit 1-305. The line data is approximated to a line, a circular arc, an elliptic arc, and a quadratic curve and is represented with parameters in a line image modeling unit 1-306. The line image is cut out as a surface of an object in a closed surface drawing unit 1-307. 1-308 denotes a visual coordinate correcting unit which serves to obtain the relation between the location on the image and the location on the three-dimensional space. The line image data created in the color image recognizing unit 1-301 is stored in a two-dimensional data storing unit 1-309. If two or more images are processed in the color image recognizing unit 1-301, a surface correspondence defining unit 1-310 serves to correspond each surface on an image with that on another image. A surface processing unit 1-311 serves to detect a three-dimensional coordinate of the surface of the object in the sequence of the line images whose surface correspondences are obtained. In case two or more images provide the corresponding pieces of two-dimensional data, a multiple visual surface three-dimensional data detecting unit 1-313 serves to detect three-dimensional coordinate values from the pieces of two-dimensional data. In case just one image provides two-dimensional data, a surface normal defining unit 1-315 of a single visual surface processing unit 1-314 serves to define a normal of the surface and a single visual surface three-dimensional data detecting unit 1-316 serves to detect the three-dimensional coordinate value. The three-dimensional data of a curved surface is obtained in a free curved surface processing unit 1-312 in which a range finger input unit 1-317 receives the range data and a curved surface form input unit 1-318 treats the range data. These pieces of two-dimensional data are generalized in the three-dimensional data integrating unit 1-319. It results in allowing the three-dimensional data to be calculated. Then, a structure defining unit 1-320 serves to define the structure of an input object model based on the three-dimensional data. Then, the resulting structure is stored in a recognized result output unit 1-321 and is displayed at any point of view. The foregoing operations are displayed on the display 1-322 and are carried out through the command input unit 1-323 in an interactive manner with an operator.

FIG. 13 is a view showing arrangement of the form transforming unit 1-5. The form transforming unit 1-5 comprises three hierarchical units of an input layer 1-501, a middle layer 1-502, and a form parameter layer 1-503, a command analyzing unit 1-504, and a learning mechanism 1-505. The form parameter layer is connected to the required specification storing unit 1-11 so that the outer-appearance specification of the product is changed by controlling the output of the form parameter layer. The types of the transformation indications used herein include an indication about a concrete form of an individual component like "to give a long main wing of a toy plane", an indication about the overall concrete form like "to make the toy plane slender", and an indication about the sensitive point of view like "make the toy plane stylish". An example of the transformation indicating command is shown in FIG. 14.

The input layer 1-501 is provided to correspond with the sensitive indication command and the feature amount representing the current form as shown in FIG. 14. The form parameter layer 1-503 is provided to correspond with the components of the product and output a form parameter and a form of each component, for example, a mathematical function defining an X-, Y- and Z-direction expansion or shrinkage based on the current form. The output corresponds to the form data stored in the required specification storing unit 1-11. The command analyzing unit 1-504 is connected to the required specification storing unit 1-11.

In inputting an indication about transformation such as "to give a long main wing" belonging to an individual form indication command, the command analyzing unit 1-504 serves to interpret the indication so that the parameter about a main swing form stored in the required specification storing unit 1-11 is expanded in the longitudinal direction by a certain amount. If the indication does not have an ambiguous expression of "to give a long main wing" but a qualitative expression of a length magnification, the parameter regarding the main wing form is changed on the basis of the indicated length magnification. In inputting the indication about transformation like "make the form longer" belonging to the overall form indicating command, the command analyzing unit 1-504 interprets the indication so that the parameter about the form of each component stored in the required specification storing unit 1-11 is expanded in the longitudinal direction by a certain amount. It results in making all the components of the body, the main wing, the tail wing longer, thereby making the overall toy plane longer.

The foregoing description is concerned with the command analyzing unit 1-504 which serves to directly change the form parameter stored in the required specification storing unit 1-11. Then, the description will be directed to the sensitive indication command. In inputting the sensitive indication command like "to make the toy plane stylish", the command analyzing unit 1-504 serves to give a constant value to an input unit 1-5011 corresponding to "stylish". The input unit 1-501 serves to output a function value corresponding to the input value. The function value is multiplied by a weight coefficient of the middle layer and the resulting value is input to each unit included in the middle layer 1-502. The input unit representing the current form feature amount receives various feature amounts from the form data stored in the required specification storing unit 1-11. Hence, when the sensitive indication command like "to make the form stylish" is input, it is possible to properly transform the form depending on the current form. Each unit included in the middle layer 1-502 to which the foregoing resulting value is input serves to output the function value shown in FIG. 13. The function value is multiplied by a weight coefficient of a form parameter layer and the resulting value is input to each unit included in the form parameter layer 1-503. Each unit of the form parameter layer 1-503 serves to output the function value shown in FIG. 13 and changed the data stored in the required specification storing unit 1-11, resulting in allowing the form parameter to be converted in response to the sensitive indication command.

Figure 15:
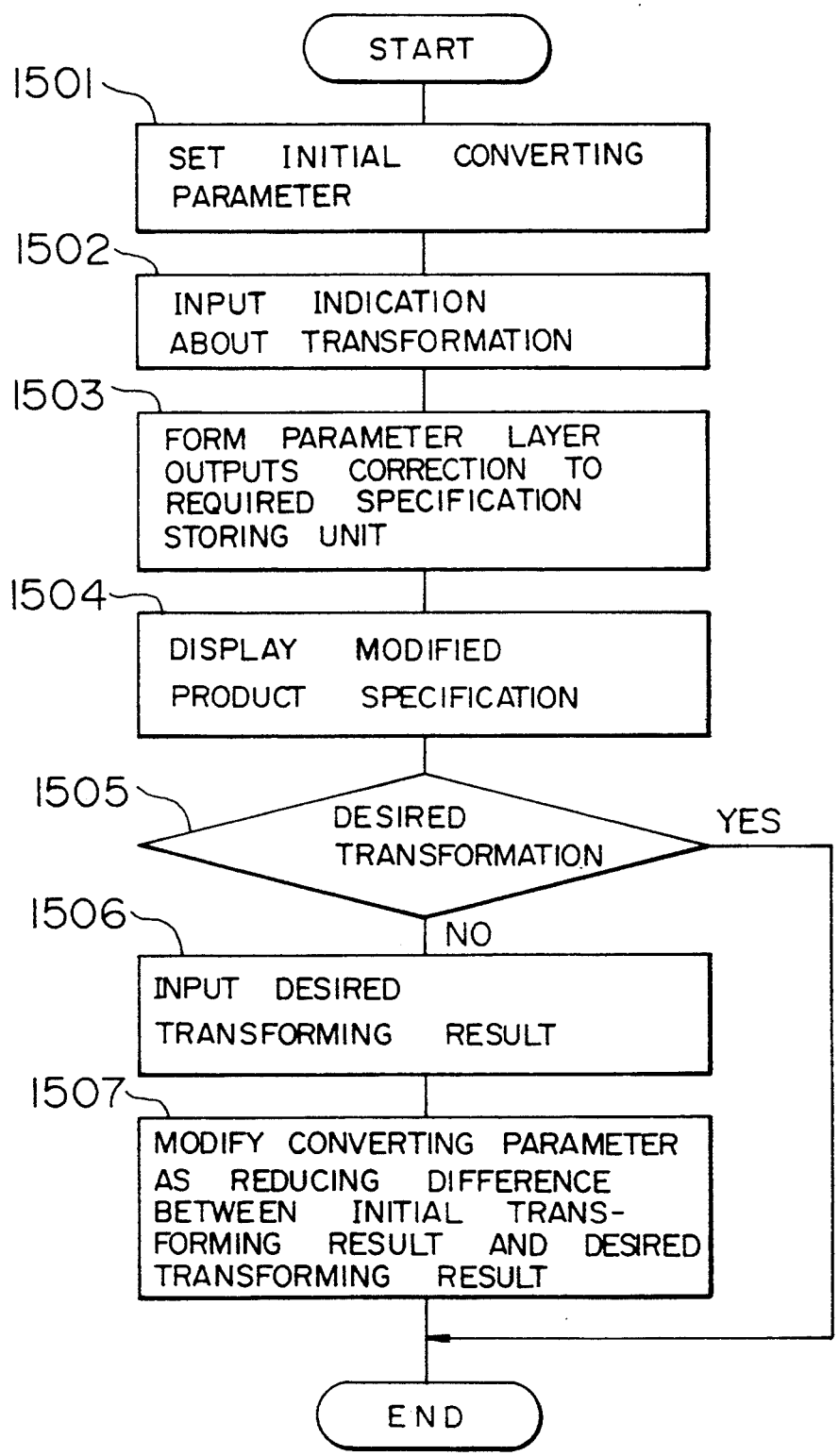
FIG. 15 is a flowchart showing the procedure of defining a weight coefficient used for converting a sensitivity indicating command into a form parameter.

In order to properly convert the sensitive indication command into the form parameter, it is necessary to properly define weight coefficients of the middle layer and the form parameter layer. FIG. 15 shows how to define these weight coefficients. To begin with, a certain weight coefficient is set (1501). If a proper weight coefficient can be estimated, the estimated value may be used. If not, a random number may be used. Then, any sensitive indication command is input (1502). The sensitive indication is converted with the set weight coefficient. Then, the form parameter layer 1-503 modifies the data stored in the required specification storing unit 1-11 (1503) and displays the modified result (1504). If the result matches to the desired indication about transformation, the result is used (1505). Since the initial weight coefficient is not properly defined, it may not be suited to the desired indication about transformation. If it is not suited, the desired transforming result is input (1506). That is, with an individual form indication command and an overall form indication command, the form of the converted image is modified according to the customer's desire. The difference between the desired result and the converted result based on the initial weight coefficient is obtained so that the weight coefficient is modified for reducing the difference (1507). It means that the weight coefficient is modified by reducing the difference between the processed result about the sensitive transforming indication and the desired result. It results in making it possible to carry out the learning function of the content given on the sensitive indication about transformation.

Figure 16:
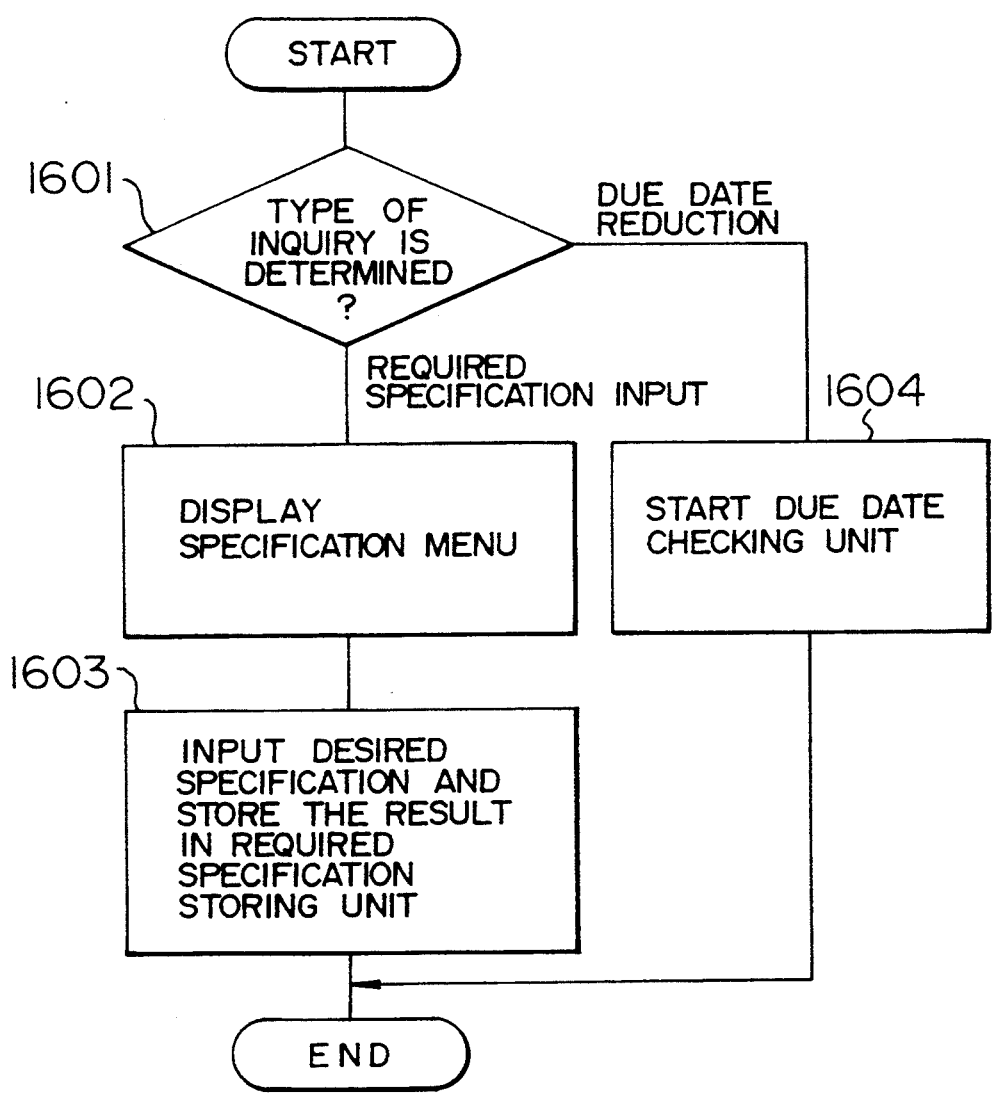
FIG. 16 is a flowchart showing the operating flow of customer inquiry processing unit 1-8 shown in FIG. 2.

FIG. 16 is a flowchart for showing how the customer inquiry processing unit 1-8 works. The content of the customer inquiry mainly concerns with the inquiry of searching the product meeting the specification required by the customer or reducing the due data. To begin with, the type of inquiry is determined (1601). If the customer inquires to search the product meeting his or her desired specification, the specification menus are displayed (1602) so that the customer can specify the specification items and input the numerical values and types in each item and the resulting specification is stored in the required specification storing unit 1-11 (1603). If the customer inquires to reduce the due data, the process goes to the due data checking unit 1-9 (to be described later) (1604). If two or more inquiries are input, the foregoing process is repeated.

Figure 17:
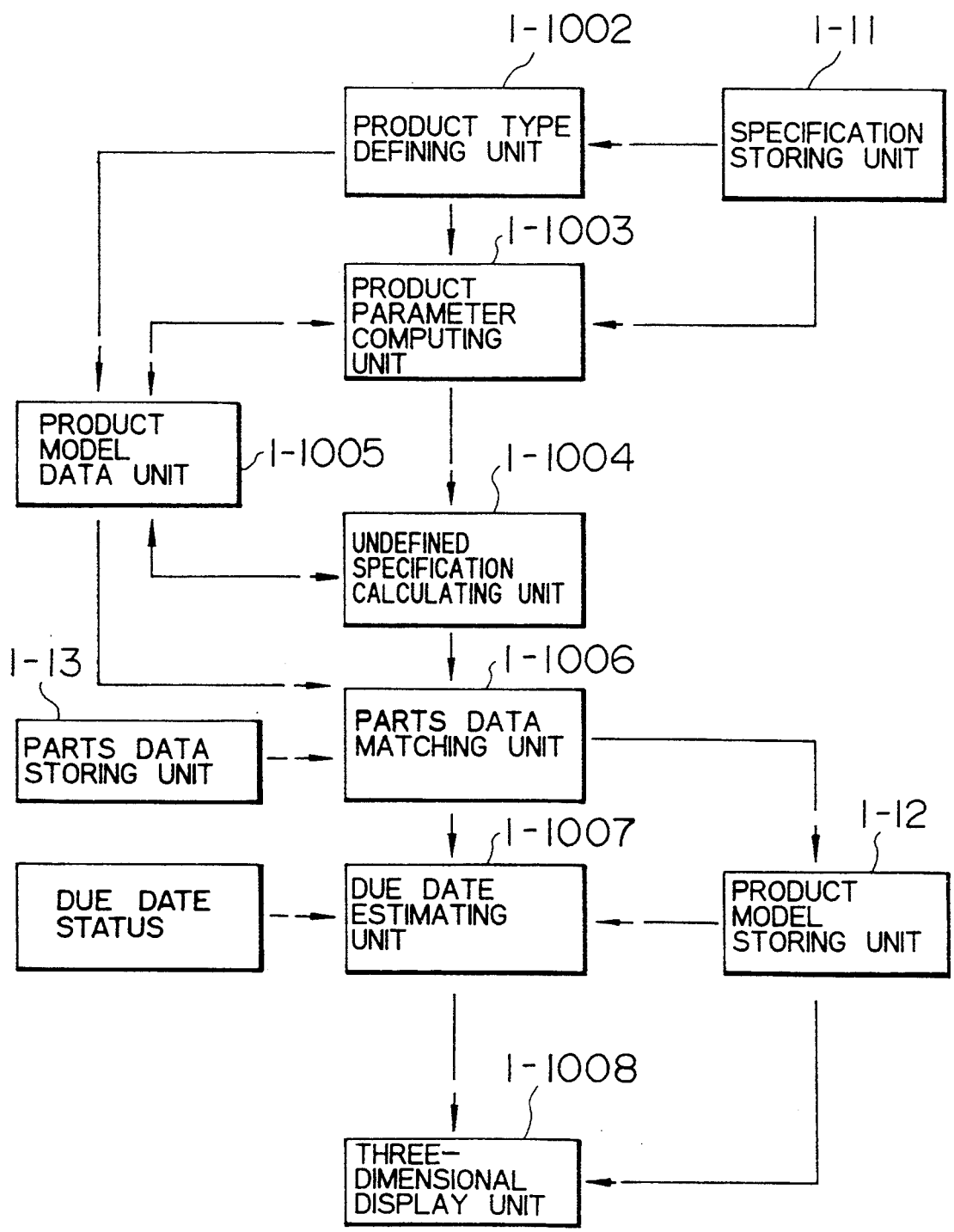
FIG. 17 is a block diagram showing detailed arrangement of combination design unit 1-10 shown in FIG. 2.

FIG. 17 is a diagram showing an arrangement of the combination design unit 1-10. The required specification storing unit 1-11 holds the required specification for the product desired by the customer. 1-1002 denotes a product type defining unit which serves to pick up a specified type out of the required specification, if any, and store the specified type in a product model data unit 1-1005. If the required specification includes no specified type, the product type defining unit 1-1002 serves to pick up the type of the product out of the other required specification with a fuzzy rule base, define the type of the product, and store the result in a product model data unit 1-1005.

After the type of the product is defined, a product parameter computing unit 1-1003 serves to define the fine dimensions and parameters of the toy plane based on the type of the product (toy plane) stored in the product model data unit 1-1005. The calculation of the parameters is performed by the calculating routine and the fuzzy rule base. The dimensions and parameters of the toy plane calculated by using all the data stored in the required specification storing unit 1-11 are checked for irreconcilable points by the rule base. If the irreconcilable points are found between the parameters, the data resulting from the calculation based on those parameters is modified into a default value and is stored in the product model data unit 1-1005.

The customer often does not specify all the specification items for one product. An undefined specification calculating unit 1-1004 serves to perform the processing of the specification items included in the predetermined specification items, left undefined by the customer, with the rule base and store the default values in the product model data unit 1-1005. It results in supplementing the undefined specification and completing the product model.

Upon completion of the product model meeting the specification required by the customer, the product model is transmitted to a parts data matching unit 1-1006 which serves to check the matching of the product model to the parts data. The parts-data matching unit 1-1006 serves to select the similar parts to those required for producing the product from the parts data storing unit 1-13. The specification of all the parts is defined on the data stored in the product model data unit 1-1005. The dimensions and the parameters of the actually produced product are obtained by combining the defined parts and are stored in the product model storing unit 1-12. Then, a cost and due data estimating unit 1-1007 serves to estimate the cost of the product based on the cost of each selected parts stored in the parts data storing unit 1-13 and store the estimated cost in the product model storing unit 1-12. Further, the cost and due data estimating unit 1-1007 serves to obtain an average due data based one the supply state of each part stored in the parts data storing unit 1-13 and store the resulting due data in the product model storing unit 1-12. The estimation of the cost is carried out by adding the costs of all the parts and multiplying a constant by the resulting cost. The estimation of the due data is carried out by searching the longest duration out of the waiting times required for supplying the parts and adding an allowable time to the longest duration. A three-dimensional display unit 1-1008 serves to display the outer appearance of the product stored in the product model storing unit 1-12 a computer graphics manner.

FIG. 18 shows a screen on which there appears one example of the data structure stored in the required specification storing unit 1-11. As shown, the data structure consists of the specification items and their contents. The specification items include the function and performance items indicating ascending speed, speed, stall speed, stability, flight range, turning radius, space, and cost and the outer appearance items. The content of the specification representing the function and performance is a numerical value, a code representing a type, or a word. As the numerical value, a clear value or a vague value used with "about" or "more than" may be used. The outer appearance specification is represented with a set of surfaces and curved surfaces for each component and form parameters derived from the selected form.

Figure 19:
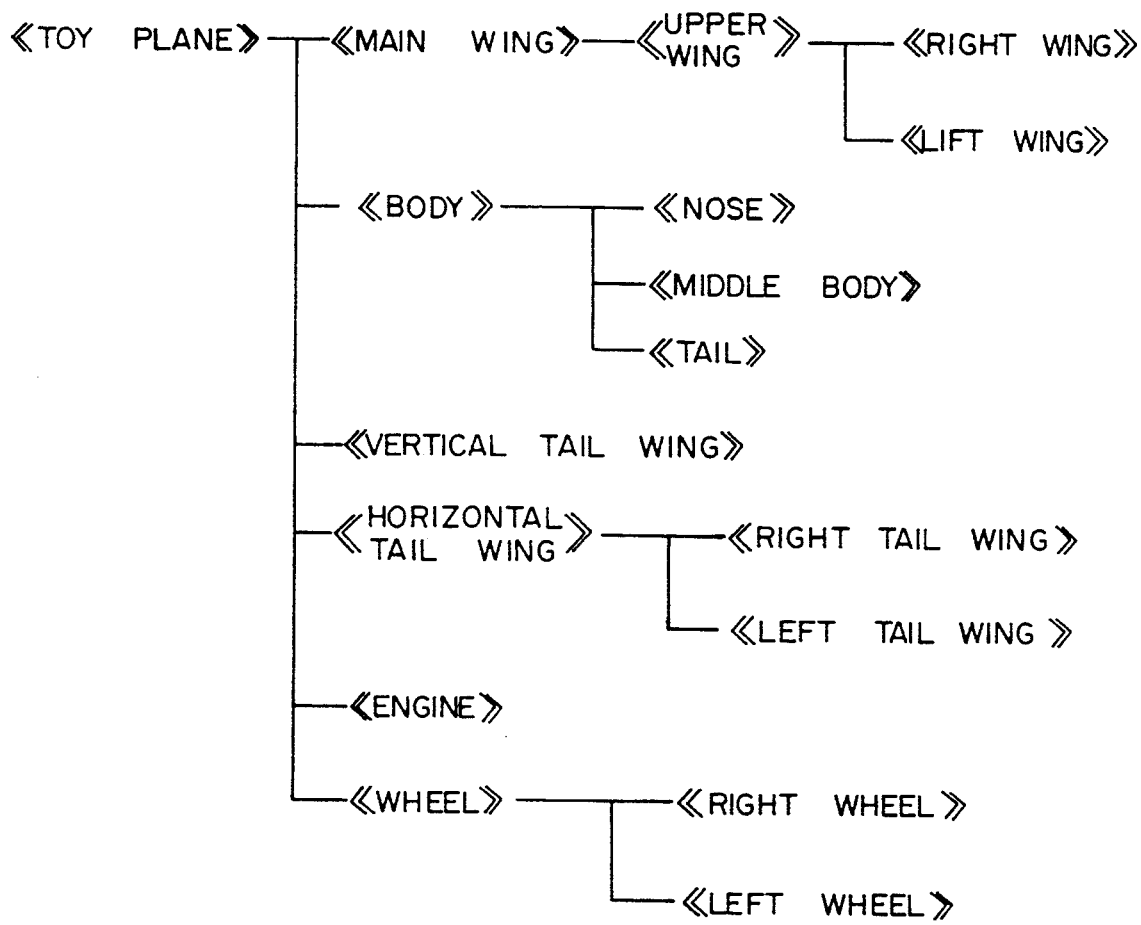
FIG. 19 is a view showing one example of structure of data stored in product model storing unit 1-12 shown in FIG. 2.

FIG. 19 is a view showing one example of data structure stored in the product model storing unit 1-12. The product model is a toy plane as mentioned above. The product model represents how "components" of the product are related in a hierarchical manner. As shown in FIG. 19, the data indicating each "component" includes a flag indicating whether or not the subject component is used, the number of parts stored in the parts data storing unit 1-13, parameters about allowable variable factors of each part, form defining data represented with a set of surfaces and curved surfaces, a coordinate data indicating the relation between the subject component and another component, an index indicating the lower-rank components of the subject component if the subject component is made of two or more components, and the like.

Figure 20:
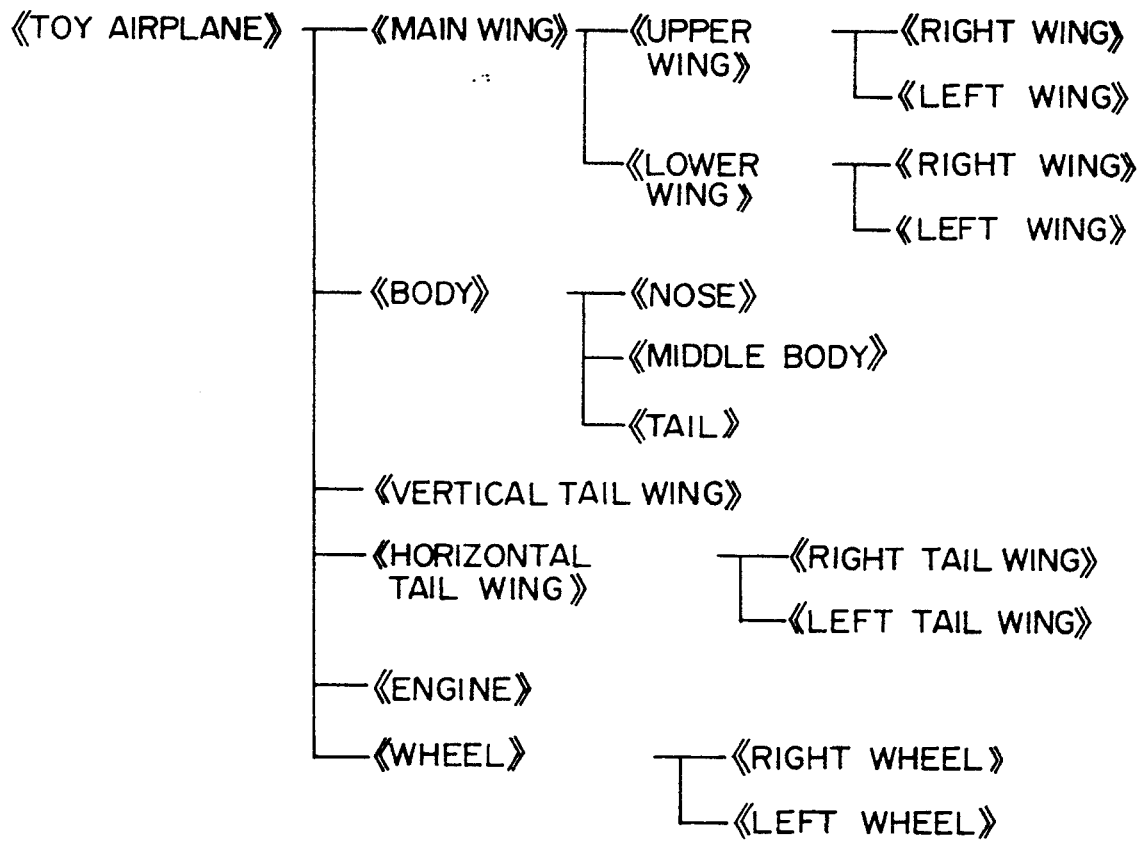
FIG. 20 is a view showing one example of structure of data stored in parts data storing unit 1-13 shown in FIG. 2.

FIG. 20 is a view showing one example of data structure stored in the parts data storing unit 1-13. This is the part data for the toy plane. The part data holds the data indicating the parts which comprise the toy plane in a hierarchical manner. The data indicating each part, as shown in FIG. 20, includes parts managing data and individual part data. The parts managing data is prepared at each class of parts like "main wing" or "nose" and holds an established number of types belonging to each class and the number of the part data about each type. The individual part data includes various attributes of parts of each type, various constraining conditions, supplying states, costs, lower-rank component induces, and the like. The attribute includes various functions, a material, a strength, and the like. The constraining conditions include an upper and a lower limit of dimensions and a working accuracy. The supplying state and the cost are used for estimating the supplying state and the cost in the cost and due data estimating unit 1-1007. The data about the supplying state is variable depending on the state of the producing department, so that the order generalizing system 2 updates the data about the supplying state and the updated result is transmitted to each product specification defining system 1.

Figure 21:
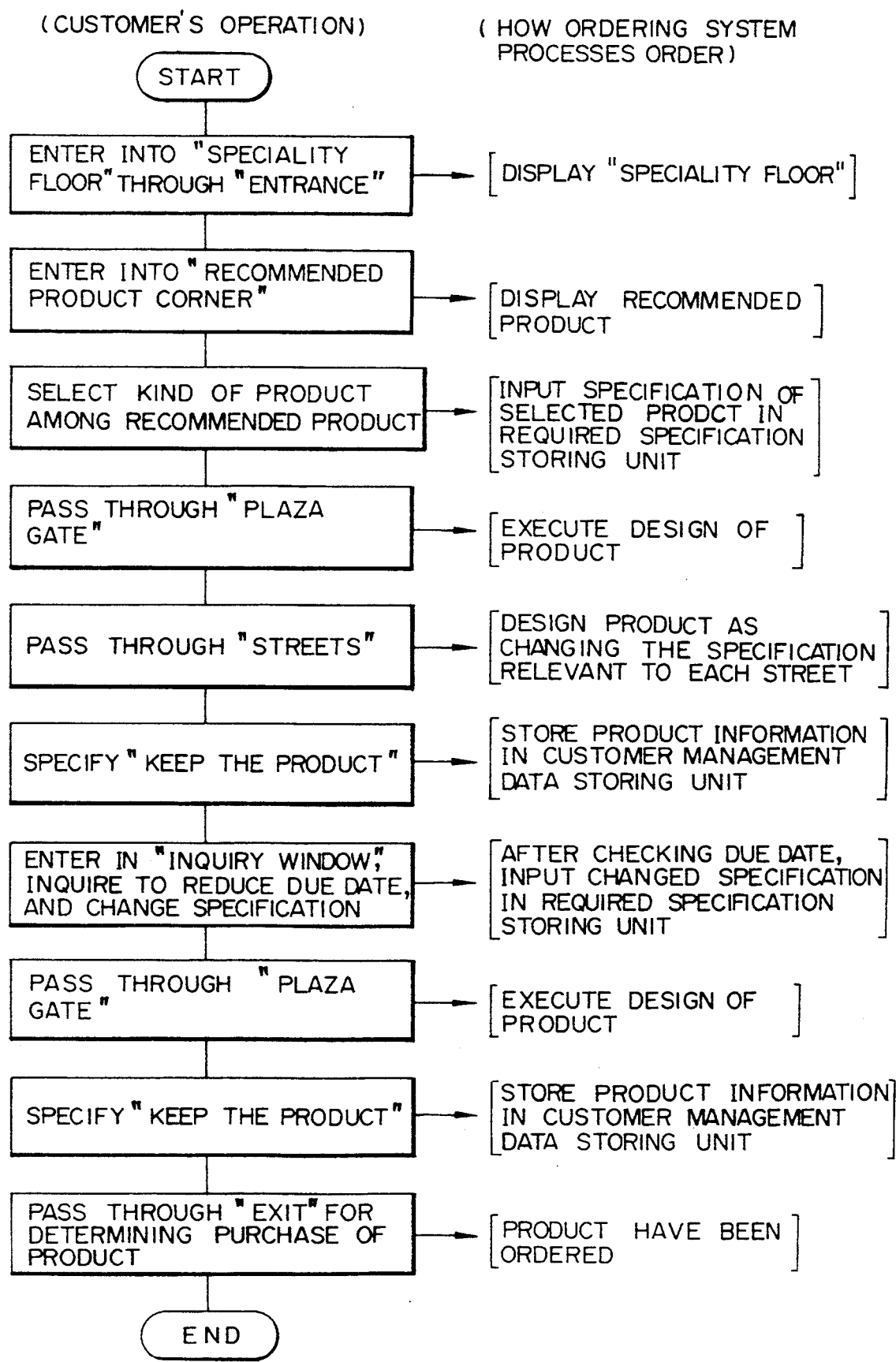
FIG. 21 is a flowchart showing how a customer operates the order manufacturing system according to the present invention.

FIG. 21 is a flowchart for illustrating the other steps the customer takes in purchasing the product with the ordering system of the present invention. To begin with, like the flow chart shown in FIG. 8, a maker indicating the customer enters into the "speciality floor" through the "entrance". If the customer has no clear required specification, with the octal-directional switch 1-101 being turned down in the left side, the marker goes to the "recommended product corner". The action monitor 1-2 reads the information through the customer indication input unit 1-1. Then, the action monitor 1-2 serves to display the marker on the place of the "recommended product corner" and start the standard product model generating unit 1-7. The standard product model generating unit 1-7 shows the recommended product to the customer by using the below-indicated method so that the customer can input a selective indication. If the customer finds the kind of product meeting the required specification among the recommended product, the marker passes through the "plaza gate" and exits from the "entrance", when the product has been ordered. On the other hand, if the customer finds the somewhat favorite kind of product but wants to slightly change the specification of the product, the most approximate kind of product is selected among the recommended product. Then, the marker goes to the "plaza gate". Like the flow chart shown in FIG. 8, the combination design unit 1-10 serves to design the product based on the specification of the product selected at the "recommended product corner" and display the product on the street. Later, the marker passes through each street so that the product is estimated as changing the specification. Assume that the customer finds the favorite product but the due date data is later than the desired date. After clicking the menus of "keep the product" with the mouse 1-103, the marker passes through the "plaza gate" and goes to the "inquiry window" of the "speciality floor" so that the customer can inquire to reduce the due date data. Then, the due date checking unit 1-9 shows the required specification for reducing the due data to the customer as communicating with the order generating system 2. If the customer recognizes the changed specification, the changed specification is stored in the required specification storing unit 1-11, when the process for inquiring the due data is terminated. Next, when the marker passes through the "plaza gate", the combination design unit 1-10 serves to design the product based on the changed specification. It results in being able to indicate to the customer the kind of product having the due data meeting the desire of the customer.

Figure 22:
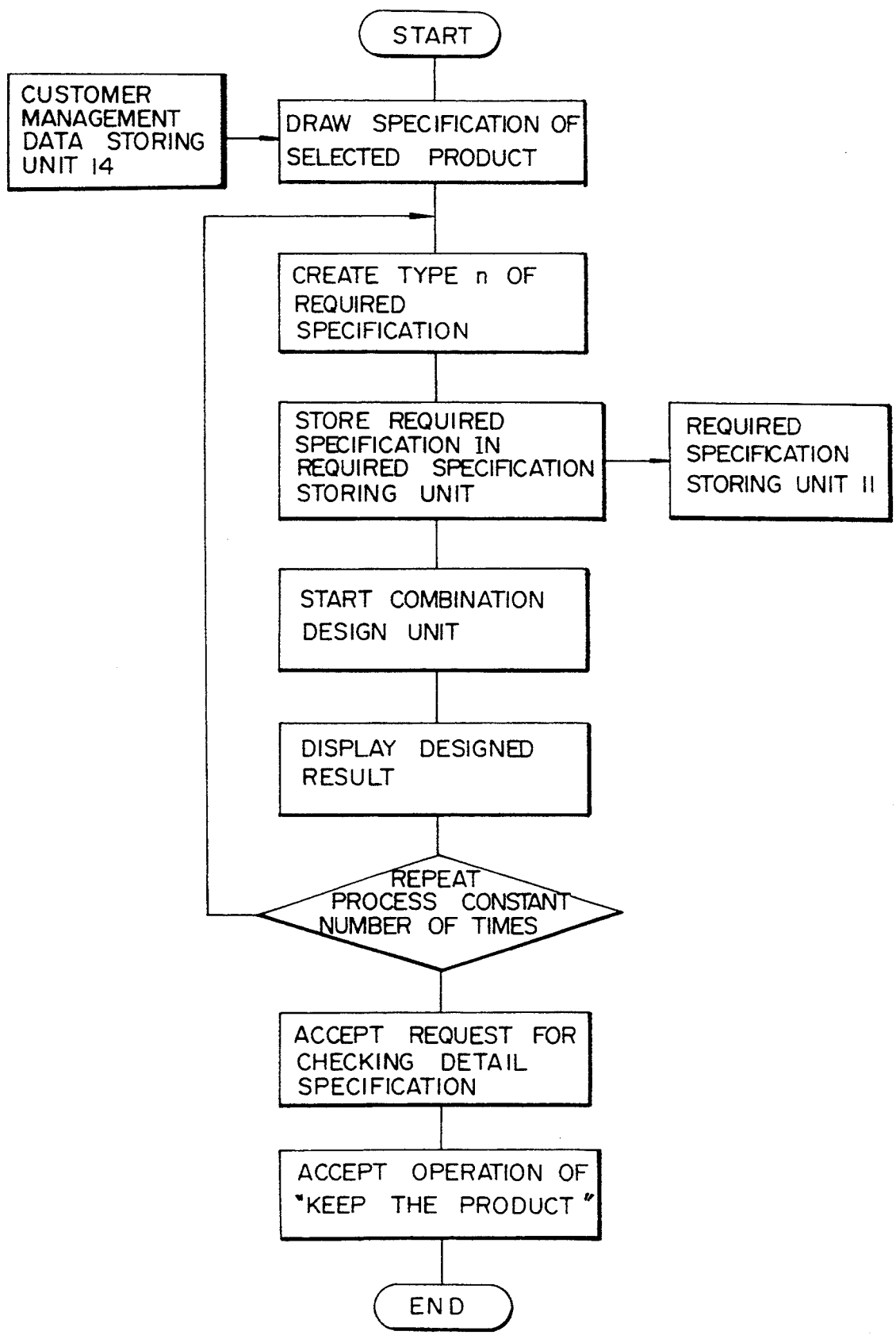
FIG. 22 is a flowchart showing how standard product model generating units 1-7 shown in FIG. 2 operates.

FIG. 22 is a flowchart for illustrating how the standard product model generating unit 1-7 works. The standard product model generating unit 1-7 accepts the frequently ordered specifications from the order generalizing system 2 and stores the specifications in the required specification storing unit 1-11. The standard product model generating unit 1-7 serves to start the combination design unit 1-10 and to display the designed result on the place of the "recommended product corner". It results in allowing the kinds of the product frequently ordered in these days to be displayed. If the customer wants to check the detail specification of the product, the customer clicks the plate of the desired product with the mouse 1-103. It results in the detailed outer appearance and specification of the product being shown to the customer like the product shown in the streets. Then, the standard product model generating unit 1-7 accepts the operation of "terminating the check" or "keep the product".

Figure 23:
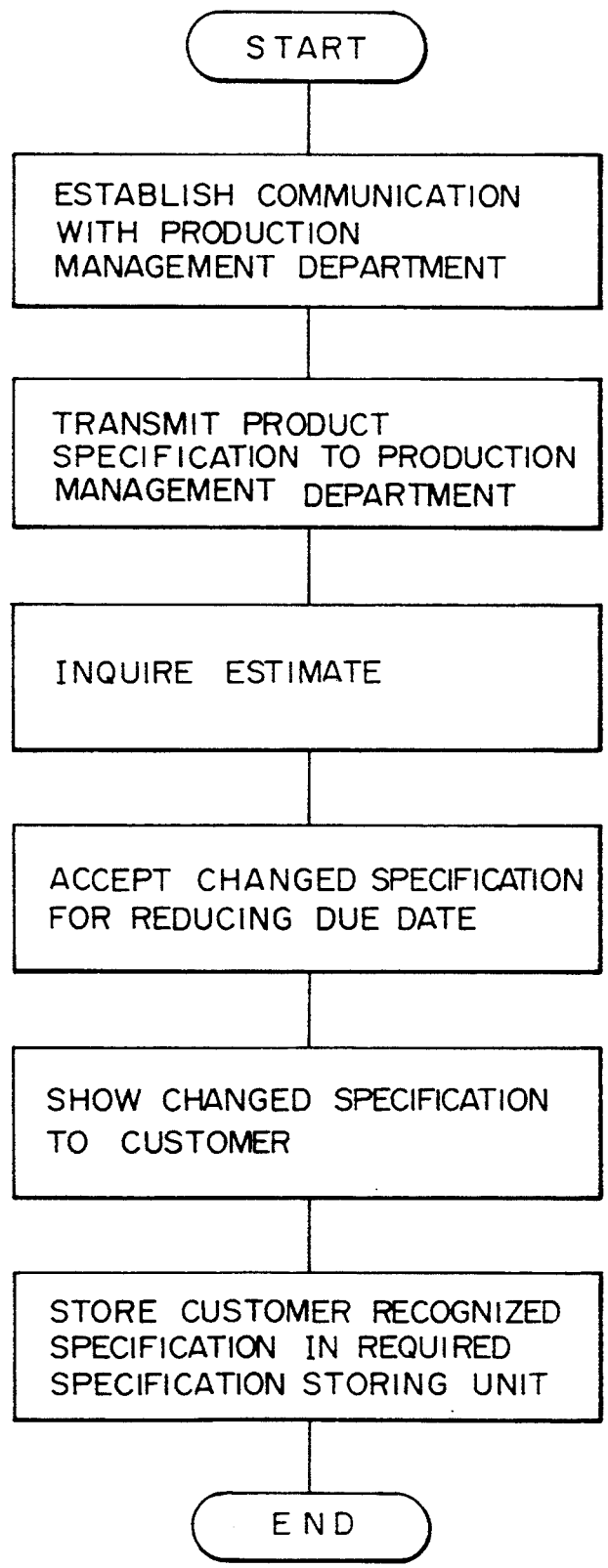
FIG. 23 is a flowchart showing how due data checking unit 1-9 shown in FIG. 2 operates.

FIG. 23 is a flowchart for illustrating how the due data checking unit 1-9 works. To begin with, the due data checking unit 1-9 serves to establish the communication with the order generalizing system 2. Then, the specification of the product inquired by the customer is transmitted to the order generalizing system 2 for inquiring the detailed estimation of the due date. The estimated response is shown to the customer. If the customer wants an earlier due date, the due date checking unit 1-9 serves to inquire the order generalizing system 2 of which specification item becomes an obstacle to reducing the due date and how to change the specification for reducing the due date. After obtaining the response, the due date checking unit 1-9 asks the customer whether or not the changed specification is allowed. If yes, the changed specification is stored in the required specification storing unit 1-11, when the process for inquiring the due date is terminated.

In turn, the description will be directed to how the order generalizing system 2 works.

The order generalizing system 2 has several functions. Of these functions, it is possible to implement the function of transmitting a product specification from the product specification defining system 1 to the production department, the function of transmitting the customer-required specification from the product specification defining system 1 to the designing department, and the function of transmitting the design information from the designing department to the product specification defining system 1 through a normal data transmitting means. The feature of the order generalizing system 2 is the functions of estimating the cost and the duration consumed in producing the product according to the specification created by the product specification defining system 1 and of drawing the tendency for the customer requirement as considering the specifications frequently required by customers. How to realize the functions will be described below.

At first, how to estimate the production cost and the duration required for the product will be described. The cost and the duration are substantially constant if the same product is consistently manufactured. The present order manufacturing system has a capability of defining the specification of the product individually according to the requirement of the customer. Hence, the cost and the duration required for production vary for each individual product. The estimation of the variable cost and duration will be carried out at the two levels.

At a first level, as mentioned above, the cost due date estimating unit 1-1007 of the product specification defining system 1 performs the estimation based on the data regarding the cost and the supplying state of each part stored in the parts data storing unit 1-13. The data regarding the part cost is estimated on the information indicating the feature of the manufacturing equipment by means of the designing department. The feature of the product equipment is transmitted from the production department. The data about the supplying state of the parts is created in the production department, is accepted in the order generalizing system 2, and is transmitted to each product specification defining system 1. The data about the supplying state of the parts is variable day by day and is periodically updated. At this stage, the estimation is rough. At the next stage, more detailed estimation will be realized.

Figure 24:
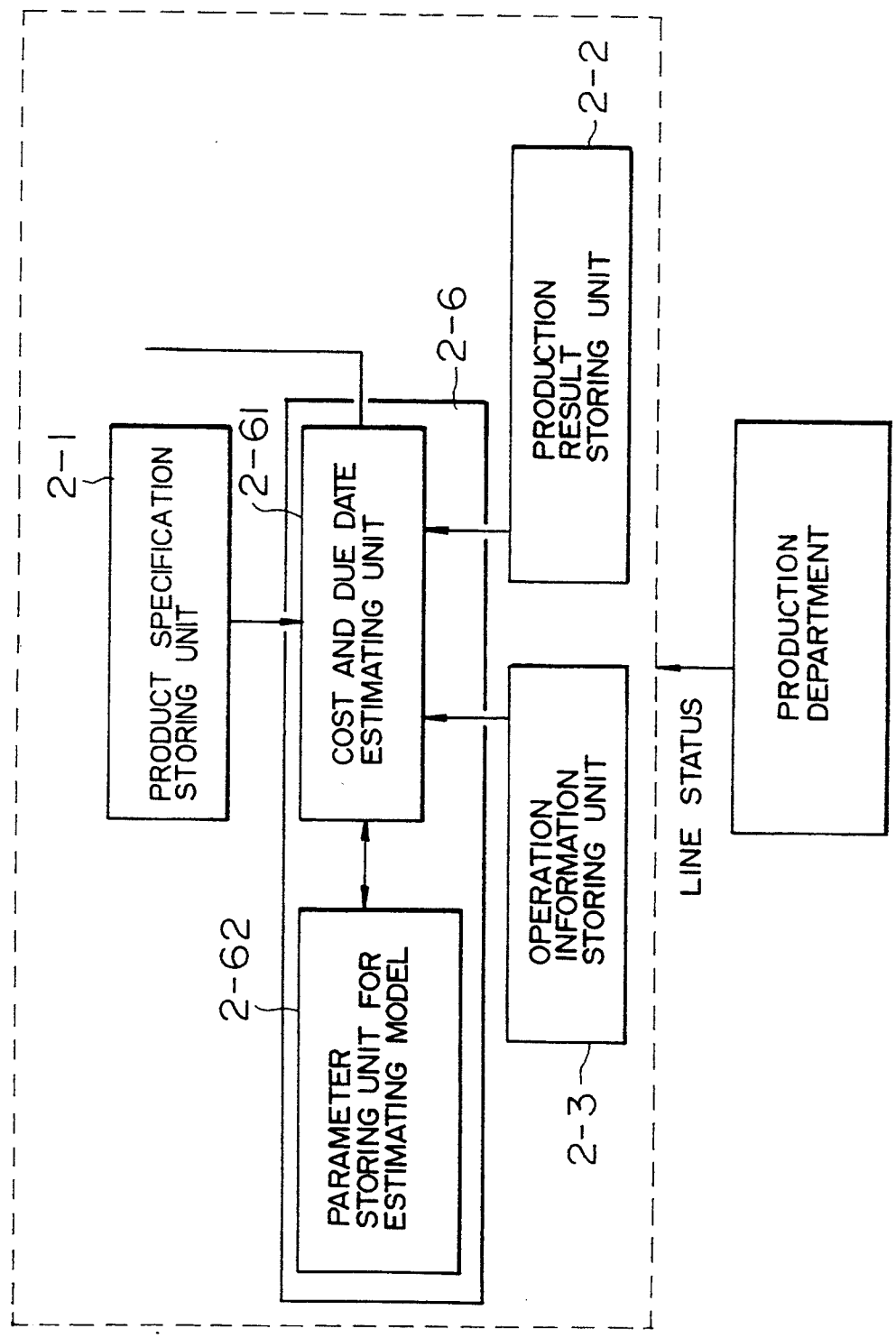
FIG. 24 is a block diagram showing the module structure for carrying out the second level estimate done in the order generalizing system.

The estimation at the next level is carried out as mentioned below in the order generalizing system 2 in response to the request of the due date data checking unit 1-9 of the product specification defining system 1. The structure of the module for performing this estimation is shown in FIG. 24. The order information processing unit 2-6 includes a cost and due date estimating unit 2-61 with a pattern learning function and an estimated model parameter storing unit 2-62. For estimating the due date of the current product specification stored in the product specification storing unit 2-1, the order information processing unit 2-6 employs the state data of the current manufacturing equipment stored in the operation information storing unit 203 and transmitted from the producing department, the specifications of the product ordered in the past and stored in the manufacturing estimate storing unit 2-2, the cost and the duration required for the production of the product, and the results of the state data about the manufacturing equipment at each manufacturing time. The estimating result is sent back to the product specification defining system 1.

The model parameter on which the pattern conversion is carried out is stored in the estimated model parameter storing unit 2-62. This parameter learns so that the previous estimation data is made closer to the data about the cost and the duration required for actually producing the product and is always updated to the optimum value. It results in making it possible to immediately estimate the cost of the product specification by considering the status of the manufacturing line.

Next, the description will be directed to the arrangement of the cost and due date estimating unit 2-61 using the pattern conversion.

Figure 25:
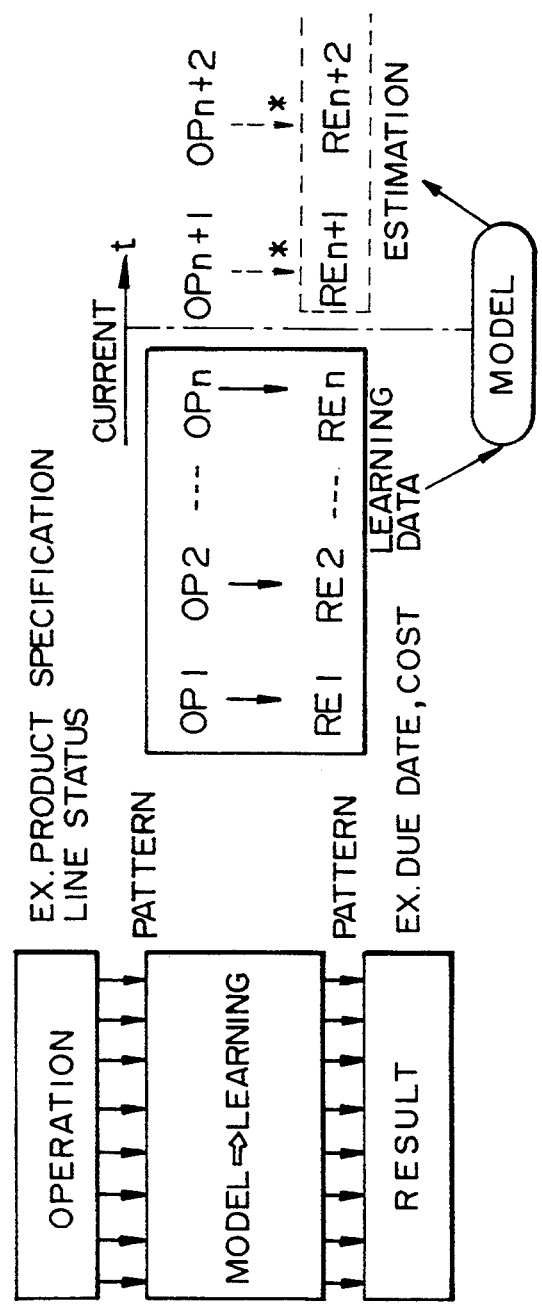
FIG. 25 is a view showing the concept of the estimating method done in cost and due data estimating unit 2-61 of FIG. 24 using pattern conversion.

FIG. 25 is a conceptual view showing how the cost and due date estimating unit 2-61, using the pattern conversion shown in FIG. 24 to carry out the estimation. As shown, the relation between the factors such as a product specification and a line status and the cost and the due date is grasped as the pattern-converting relation between the operation and its result. The parameter of the pattern-converting model is defined with the foregoing previous relation as the learning data. The cost and the due date based on the new product specification and the line status are estimated by using the learned pattern conversion model.

Figure 26:
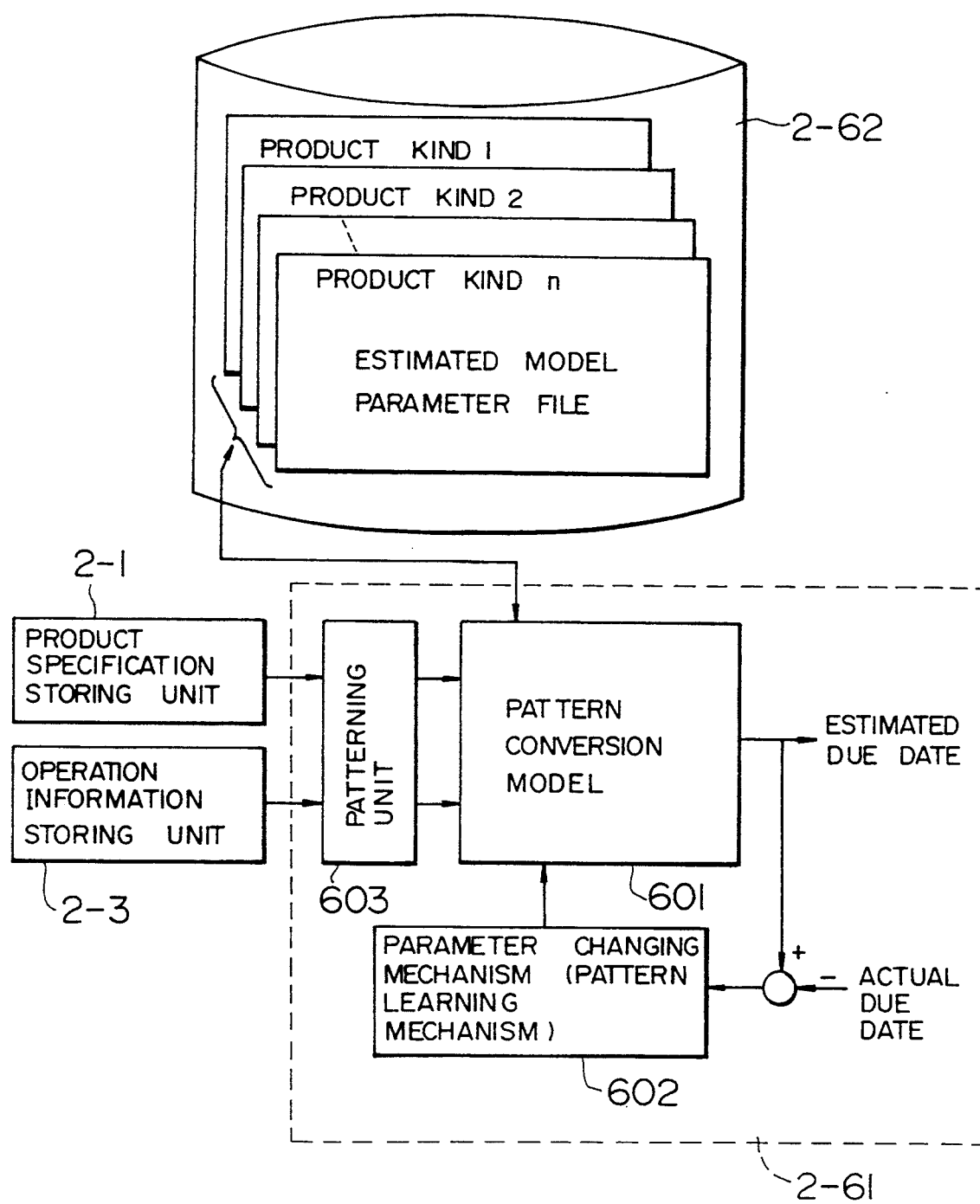
FIG. 26 is a view showing detailed arrangement of cost and due data estimating unit 2-61 shown in FIG. 24.

The detailed arrangement of the cost and due data estimating unit 2-61 based on this concept is shown in FIG. 26. As shown, the estimated model parameter storing unit 2-62 serves to store a parameter file about the estimated model corresponding to each product kind. The parameter file is used as the parameters of a pattern conversion model 2-601 in the cost and due date estimating unit 2-61. The data stored in the product specification storing unit 2-1 and the operation information storing unit 2-3 are worked so that the data is more likely to be input to the pattern conversion model 2-601.

The data is converted into the estimated cost and due date in the pattern conversion model 2-601. The estimated value is compared with the actual result of the cost and the due date. Based on the compared result, a parameter conversion mechanism (pattern learning mechanism) 2-602 modifies the pattern conversion model 2-601 so that the output cost and due date are made closer to the actual values. The present arrangement realizes the flexible cost and due date estimating unit 2-61 which considers the line status or the like for the estimation in a pattern learning manner.

The input pattern items required for the cost and due date estimating unit 2-61 are shown in FIG. 27. FIG. 27 is an explanatory view showing the input pattern items prepared in the cost and due date estimating unit 2-61 shown in FIG. 24 (FIG. 26). As shown, the input pattern items include an item relevant to the product specification (cars), an item relevant to the line status, an item relevant to the selling strategy, an item relevant to the design, and the like. Those items are converted into input patterns in a manner that the continuous-amount item is represented by an analog value between 0 and 1, the discrete-amount item is represented by two values of 0 and 1, and the time-variable item is represented by the combination of the values between 0 and 1 formed by changing the values sampled at several time points. As mentioned above, by grasping the input as patterns and incorporating the estimated values of the cost and the due date into the patterns, it is possible to more accurately estimate the cost and the due date than those based on the complicated product design and the manufacturing simulation from a macro point of view.

FIG. 28 is a view showing arrangement of the cost and due date estimating unit 2-61 shown in FIG. 24 (FIG. 26) using a neural circuit network model. The theory of the neural circuit network will be detailed in Rumelhart D. E., McClelland J. L. and The PDP Research group, 1986, parallel destributer Processing: MIT Press. The cost and due date estimating unit 2-61 is composed of an input layer 2-611 consisting of cells for receiving the input information, a feature drawing layer 2-612 consisting of cells for compressing the input information, a middle layer 2-613, and an output layer 2-614 for outputting the final estimated cost and due date. If the actual cost and due date are grasped after the manufacturing is terminated, the final estimated cost and due date is compared with the actual cost and due date. Based on the compared result, the parameter changing mechanism 2-602 serves to change a weight parameter between both layers and learn the conversion model so that a more precisely estimated cost and due date are obtained. The present arrangement makes it possible to realize the pattern conversion and its learning.

Then, the description will be directed to how to draw the tendency of the preferred customer requirements. The data regarding the tendency of the preferred customer requirements is used in the product specification defining system 1 and the designing department. In the product specification defining system 1, the standard product model creating unit 1-7 uses the tendency data for creating the recommended product model required by many customers. The designing department serves to design the product in a manner to increase the product variation and the freedom about the specification required by many customers. If the orders for the product having ten variations are focused on the variations Nos. 2 and 3, by defining the values around the specifications of Nos. 2 and 3 for increasing the variations therearound, it is possible to prepare more suitable product for the customers. The tendency data about the customer requirements used in the designing department is transmitted to the concept design CAD system 5 in which a designer performs the design based on the data.

Figure 29A:
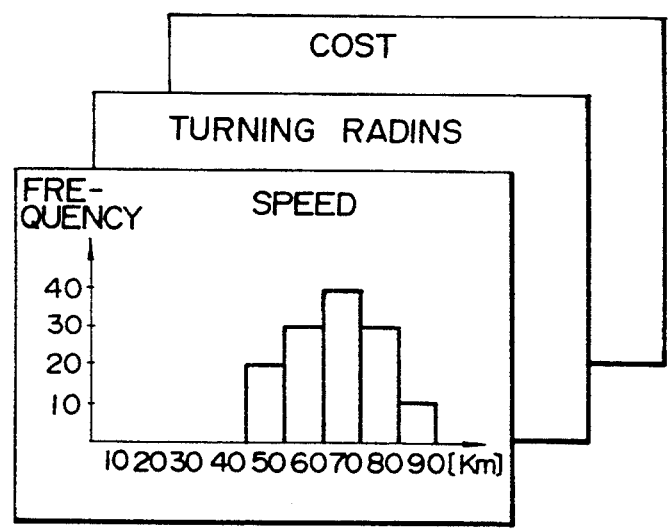
FIGS. 29A and 29B are views showing an example of tendency data about customers' preferred requirements output to the designing department.
Figure 29B:
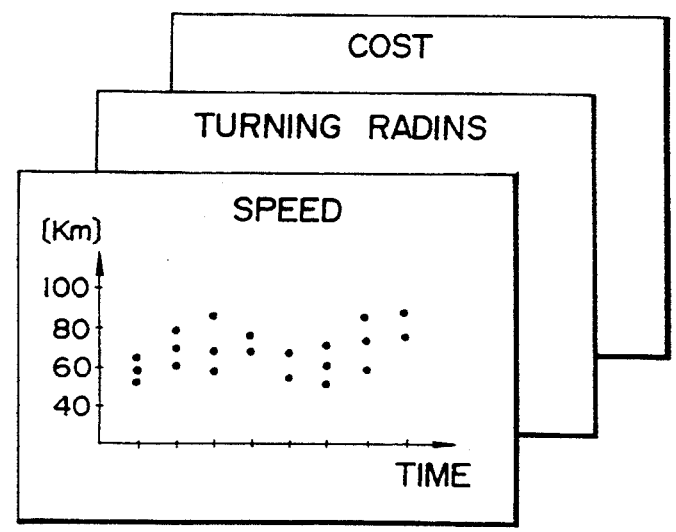

As shown in FIGS. 29A and 29B, the data about the customer requirement tendency is mainly divided into two types, that is, frequency distribution of the required specification values taken for each data item stored in the required specification storing unit 1-11 and time-series frequency of the required specification values. Both types of the tendency data can be created by averaging the data about the customer requirement specification of individual ordered product transmitted from the product specification defining system 1 by using the normal statistical processing.

In turn, the description will be directed to the process of the production planning system 3 with reference to FIGS. 33 to 44.

Figure 31:
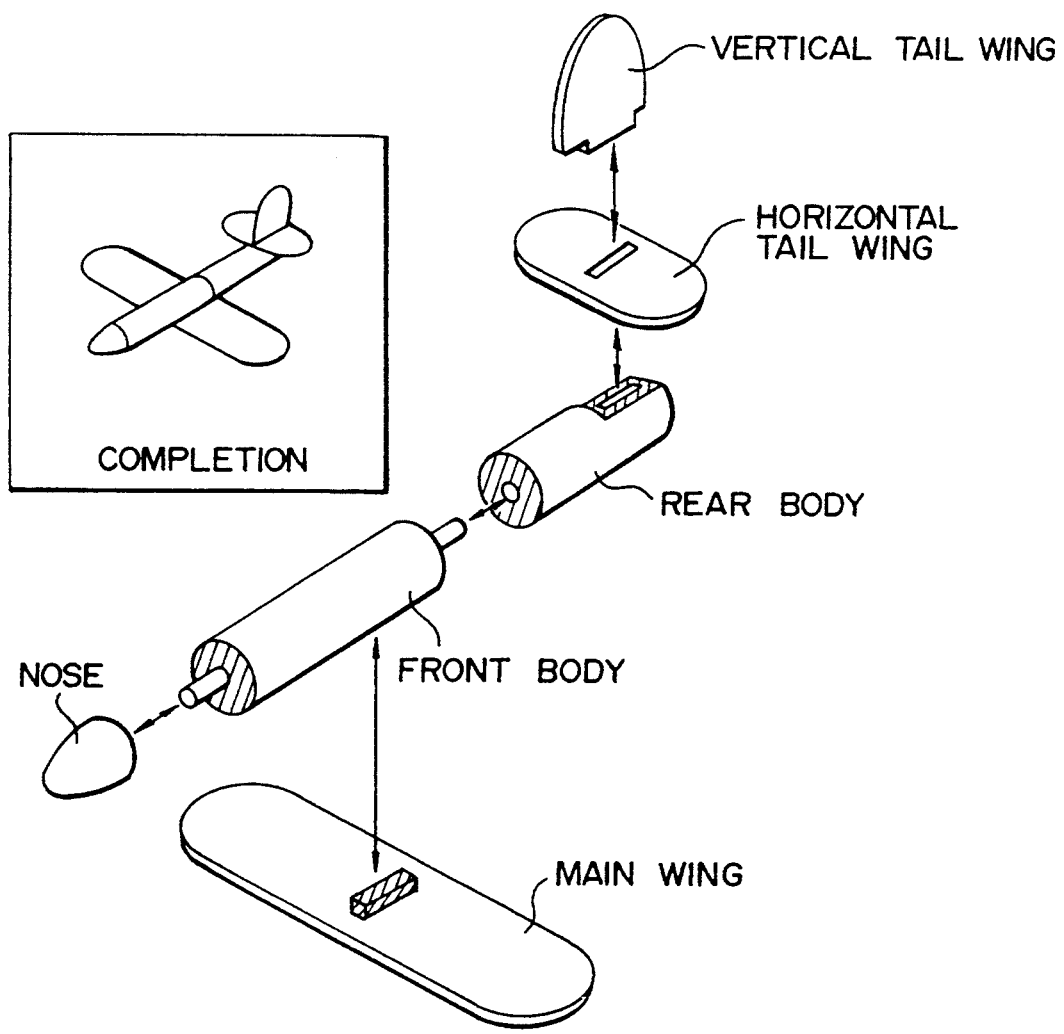
FIG. 31 is a view for illustrating the process done in the production planning system 3 and showing a toy plane as an example of product to be assembled.
Figure 32B:
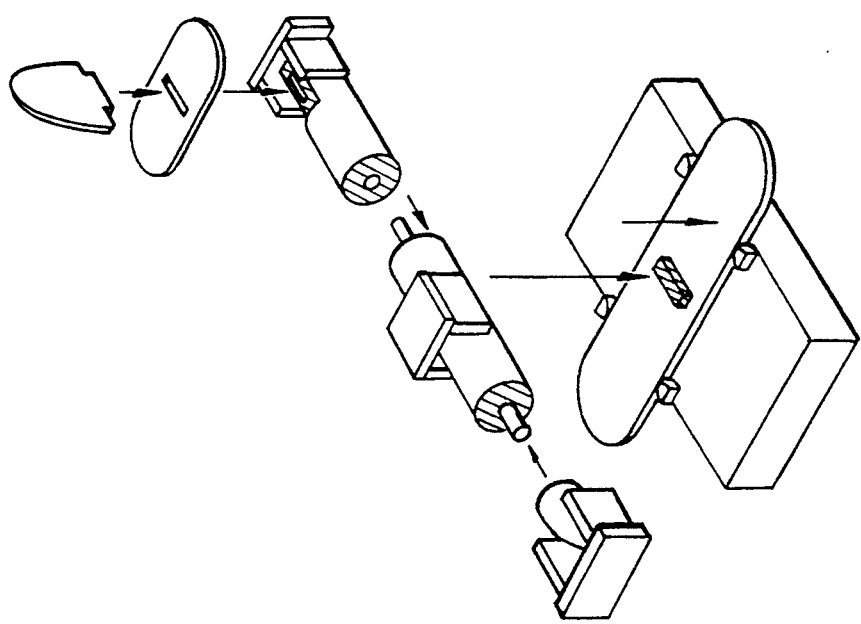
FIGS. 32A and 32B are views showing variations of the assembling method for the toy plane.
Figure 32A:
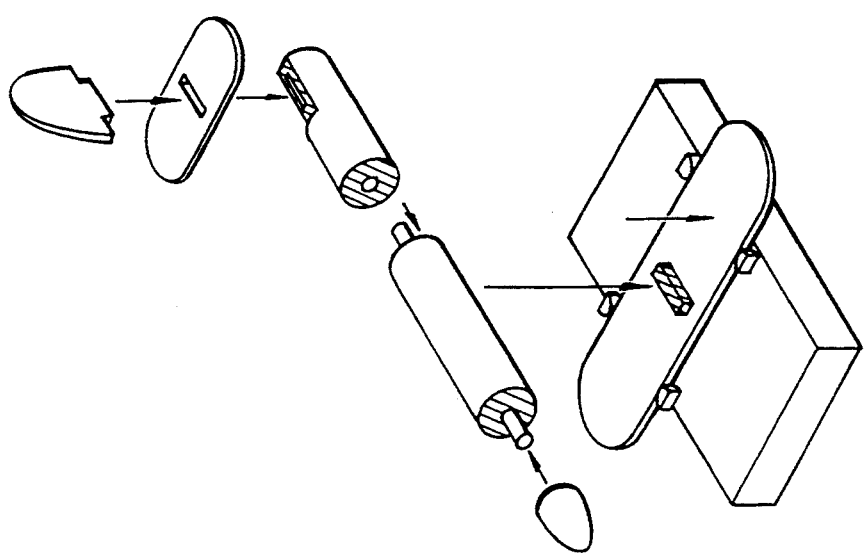

Assume that, as an example, the toy plane shown in FIG. 31 is assembled. How to assemble the toy plane may employ several methods in addition to the method shown in FIGS. 32A and 32B. In order to select the suitable assembling method for actually working from the several assembling methods, it is necessary to employ the feature data about parts, the data about position relation between parts, and the assembly knowledge.

To illustrate how to define the assembling direction, consider the parts A and B shown in FIG. 30. The part A has three holes and the part B has four holes and one rot. To define the assembling direction of such parts, the assembly knowledge is used. As an example of the assembly knowledge, there exists a method referred to as an assembly estimating method (see NIKKEI MECHANICAL 1989.3.21 pp. 38 to 59). This method demonstrates that the easiest assembly is, in general, the assembling operation from the top to the bottom. According to the present embodiment, there is disclosed a method for automatically defining the assembling direction of the product based on the knowledge of "the easiest assembly is the assembling operation from the upper to the lower".

As shown in FIG. 30, if the assembling methods ( ↓ : from the upper to the lower, ↵ : horizontal) for a single part A are summed up, the assembling method 1 has more assembling operations in the direction of ↓ . Hence, the present invention employs the assembling method 1. If each product is made of the parts A and B, the assembling method 1 is not the most approximate. That is, as shown in the assembling methods 3 and 4, from a viewpoint of an overall product, the assembling method 4 is the most approximate. In the assembling method 4, the part A is assembled in the direction which is not used when the single part A is assembled. It means that it is necessary to sum up the characteristic points such as holes and lots of each part in the assembled state in order to define the optimum assembling direction.

Figure 33A:
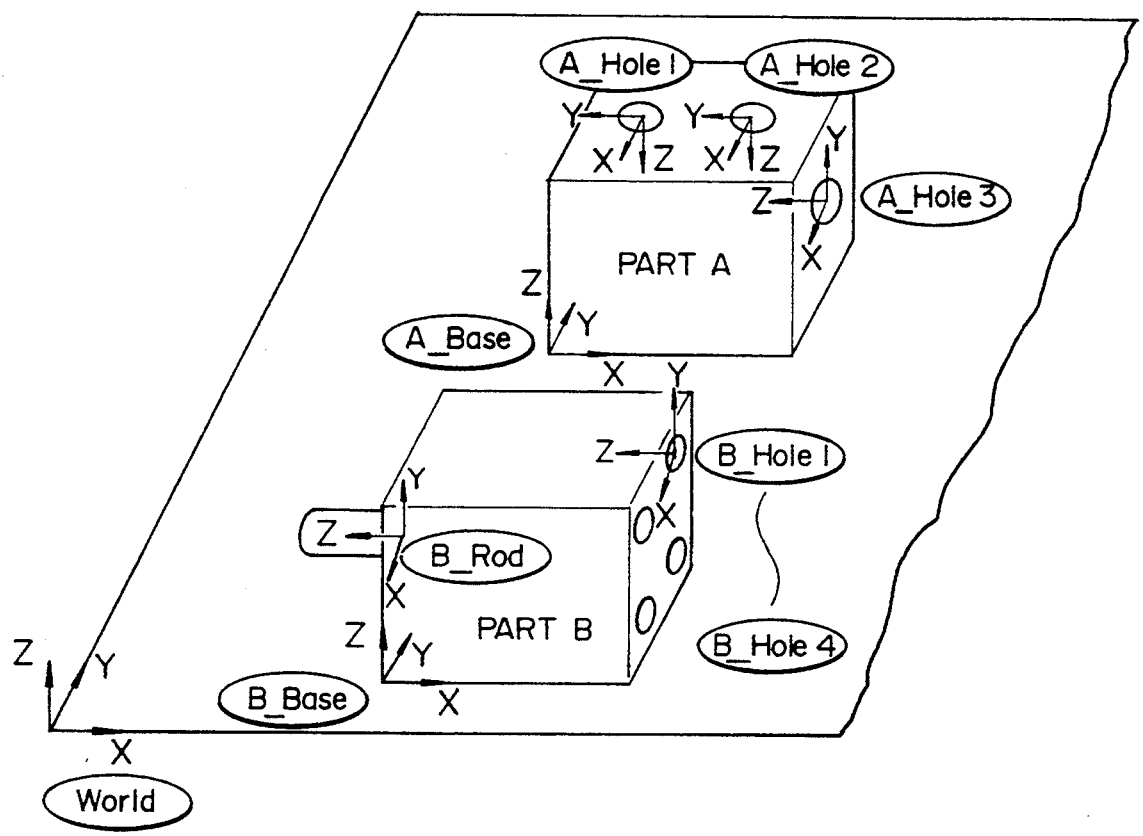
FIGS. 33A and 33B are views showing an example of data structure about parts used for defining the optimum assembling direction from a view of one whole product.

The present invention uses the data shown in FIG. 33 as the feature data about the parts used for automating the foregoing operation. As shown in FIG. 33A, A-Hole 1-A Hole 3 denotes a base coordinate system of the part A which represents the position and the posture of the hole against the A-Base. Likewise, the A-Base represents the reference position and posture of the part A against the world coordinate system. Assuming that the origin position vector of the A-Hole1 against the A-Base is P, the unit vector in the X-, Y-, and Z-axis direction is l, m, n, the A-Hole 1 is derived as follows:

$$A\text{-}Hole1 = \begin{vmatrix} lx & mx & nx & Px \\ ly & my & ny & Py \\ lz & mz & nz & Pz \\ 0 & 0 & 0 & 1 \end{vmatrix}$$

wherein $$l = \begin{vmatrix} lx \\ ly \\ lz \end{vmatrix}, m = \begin{vmatrix} mx \\ my \\ mz \end{vmatrix}, n = \begin{vmatrix} nx \\ ny \\ nz \end{vmatrix}, P = \begin{vmatrix} Px \\ Py \\ Pz \end{vmatrix}$$

Figure 33B:
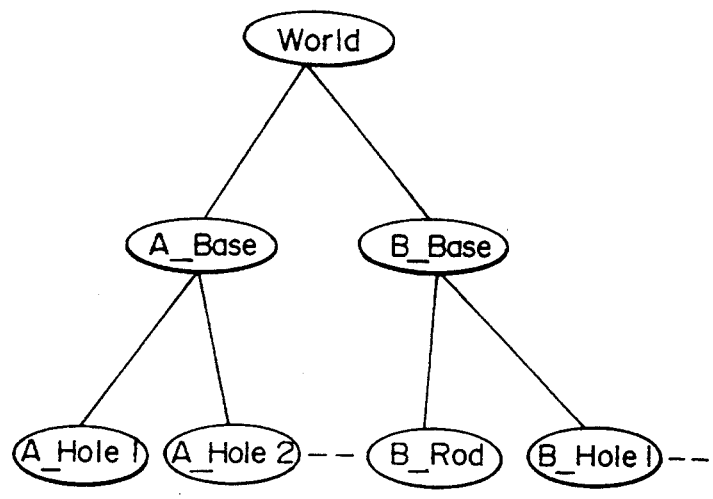

This is true to the part B. The connecting relation of these pieces of data can be represented as shown in FIG. 33B. FIG. 34A shows the product, each of which is made of the parts A and B. The position relation data between the parts can be represented as shown in FIG. 34B with help of the representation shown in FIG. 33B.

As the data for indicating the assembling direction, the Z-axis direction of each characteristic point coordinate system is used. With this method, it is possible to add the number of the parts having the Z-axis of the characteristic point coordinate system directed from the upper to the lower, that is, the reverse direction to the Z-axis direction of the world coordinate system. That is, (i) The coordinate system of each feature point of each part is represented as a relative coordinate based on the reference coordinate. By moving or rotating each part (that is, moving or rotating the reference coordinate system), the position and the posture of each feature point on the world coordinate are obtained by multiplying the reference coordinate by the relative coordinate changing matrix for each feature point.

Figure 34B:
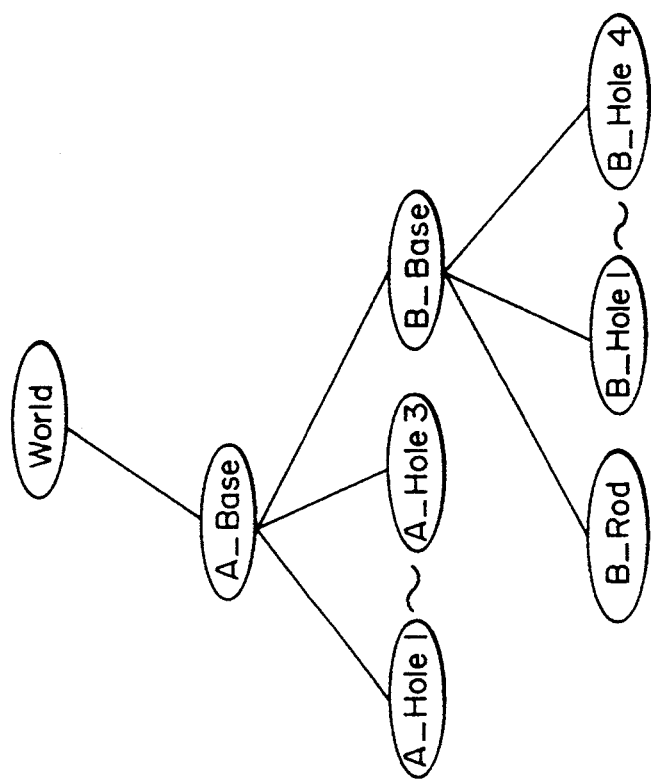
FIGS. 34A and 34B are views showing one example of data structure about a product assembled by parts A and B.
Figure 34A:
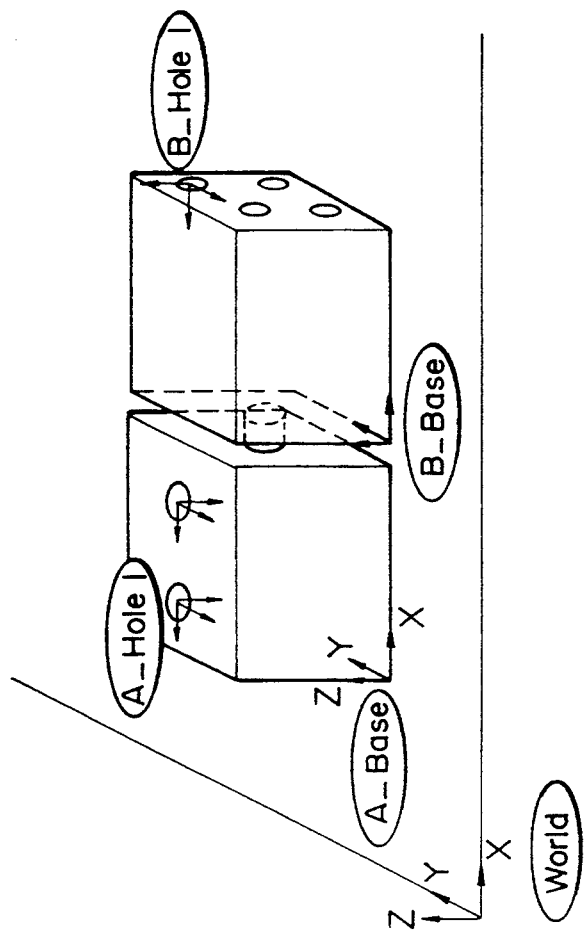

(ii) The positional relation among the parts composing each product can be obtained by connecting the relative coordinate systems of a reference point and a feature point of each part in a tree-structure manner as shown in FIG. 34B. Hence, it will be understood from FIG. 34A that the movement or rotation of the part A requires the operation (i) about the feature point coordinate (A-Hole1-B-Hole3) of the part A connected to the reference coordinate A-Base of the part A, the reference coordinate of the part B, and the feature point coordinate (B-Rod, B-Hole 1-A-Hole 4) of the part B.

(iii) In order to consider various assembling directions for each kind of product, for example, it is necessary to carry out the operation (ii) relevant to each 90° rotation of each product around the X-axis of the reference coordinate system of the part A (that is, four assembling directions are considered) around the X axis and sum up the number of the resulting Z axes of the feature points having the reverse direction to the Z axis of the world coordinate system.

(iv) The actual assembling direction of the product selects the direction which has the maximum number of the Z axis of the feature points reversely directed to the Z axis of the world coordinate system among the assembling directions obtained as a result of the operation (iii). The assembling direction of the product enables the product to be defined according to the foregoing process.

When counting the Z-axis directions of the feature points in the operation (iii), it is necessary to discriminate the Z axis of the coordinate system reference point from that of the feature point. This requirement is met to add the data shown in FIG. 35 to the part feature data. The data shown in FIG. 35 is composed of a title of the coordinate and a flag (0: reference coordinate, 1: feature coordinate) determining if the coordinate is a reference coordinate or a feature coordinate. When tracing the tree structure for checking the Z-axis direction of each coordinate in the operation (iii), it is determined if the coordinate being operated is the reference coordinate or the feature-point coordinate based on the data shown in FIG. 35. If it is the feature-point coordinate, the Z-axis direction is to be checked.

Figure 36:
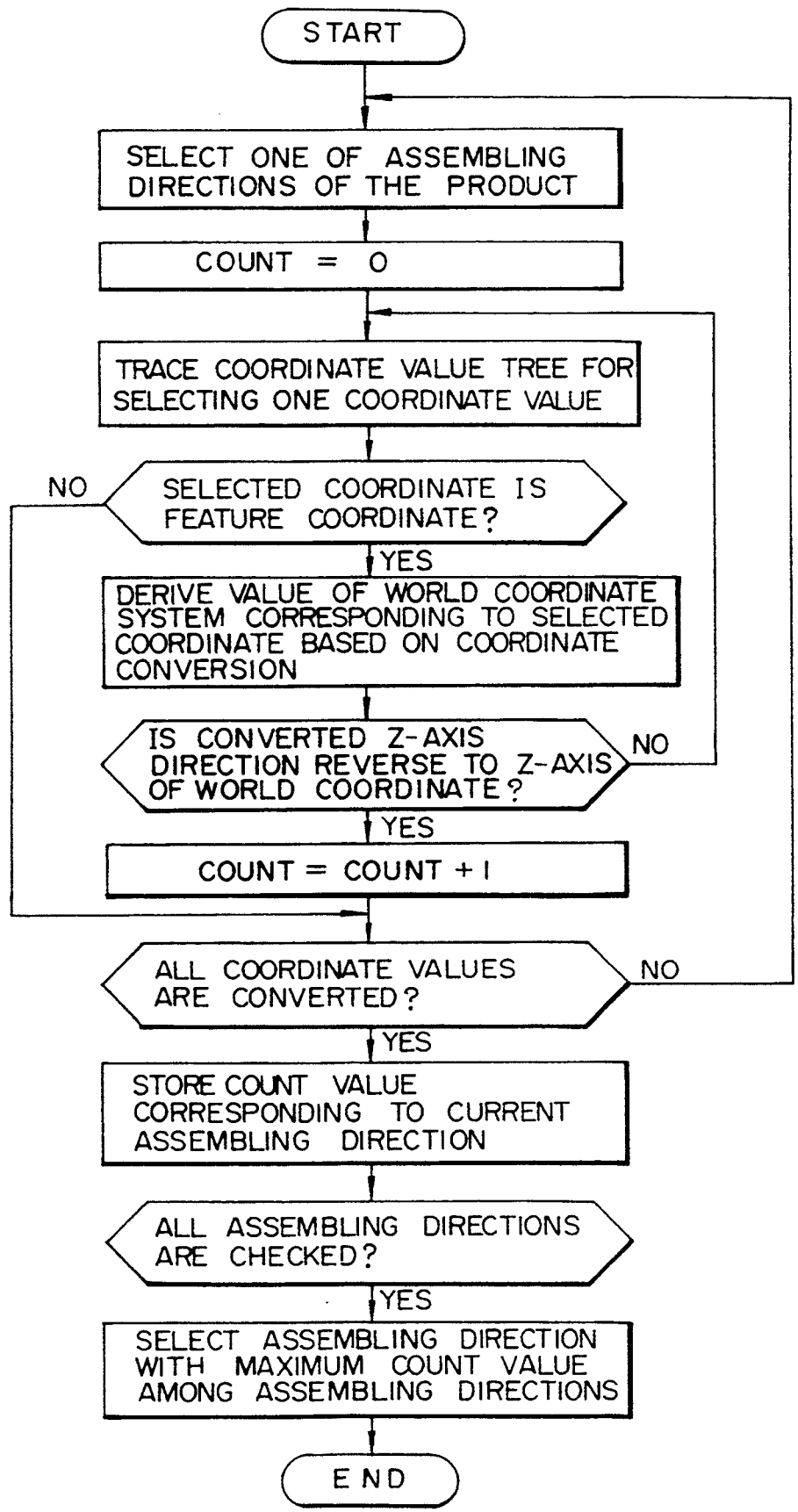
FIG. 36 is a flowchart showing the process for defining the assembling direction.

This process will be shown in FIG. 36.

The foregoing description is concerned with the method for defining the assembling direction on the basis of only one assembling knowledge that the easiest assembly is the assembly of the parts from the top to the bottom. The data shown in FIG. 37 can be also used as the assembling knowledge. The data shown in FIG. 37 contains various assembling directions and the corresponding difficulties in which smaller values indicate easier assembly. As is apparent from FIG. 36, the present embodiment makes it possible to obtain the assembling direction of the feature points of each part composing each product. (For example, as an example, there is described the Z-axis direction of the coordinate system showing a hole.) Hence, it is determined which type of the assembling directions shown in FIG. 37 corresponds to the resulting assembling direction of the feature point and the corresponding difficulty to the determined assembling direction shown in FIG. 37 is added to the resulting assembling direction of the feature point, resulting in obtaining the total assembling difficulty. The assembling direction of the product employs the assembling direction with the least total difficulty.

Next, the description will be directed to how a user interacts with the system. That is, assuming that the assembling direction of the product is defined on the foregoing operation, the following conditions may appear.

(1) Two or more solutions have the same "times of assembly from the upper to the lower" and difficulty.

(2) The second reasonable solution is employed, because of other factors rather than the assembling directions such as no machine prepared for any operation.

Figure 38A:
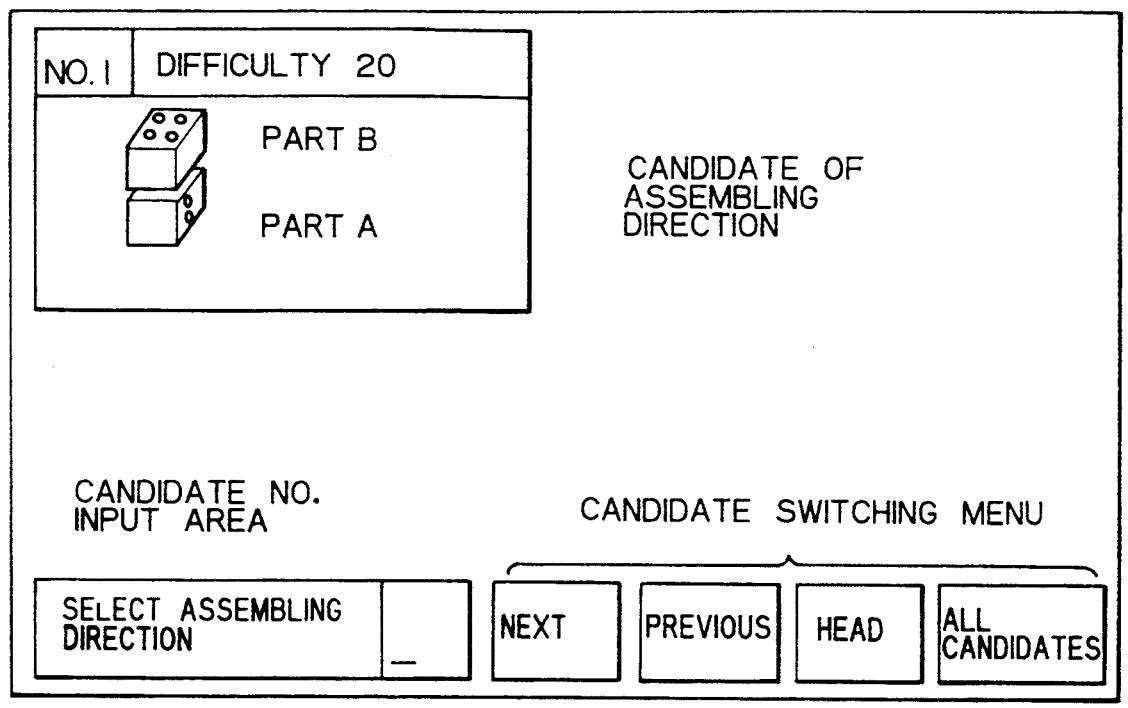
FIGS. 38A, 38B, 38C, and 38D are views showing one example of a screen on which the assembling process is designed in an interactive manner with a user.
Figure 38B:
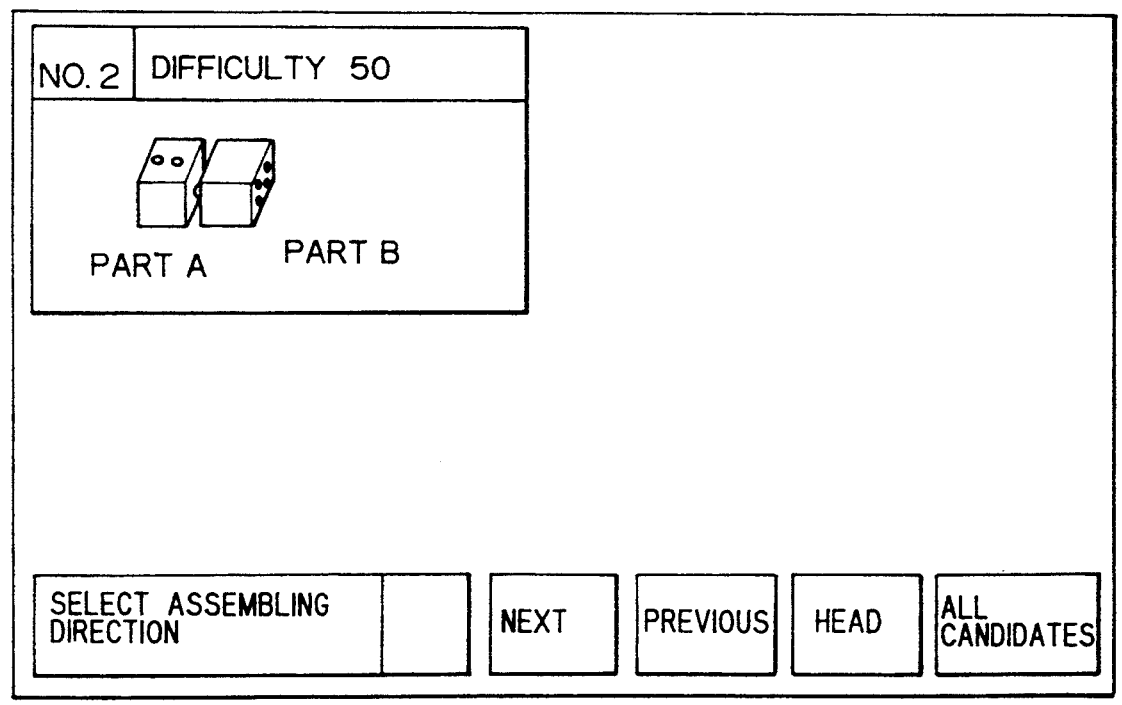
Figures 38C, 38D:
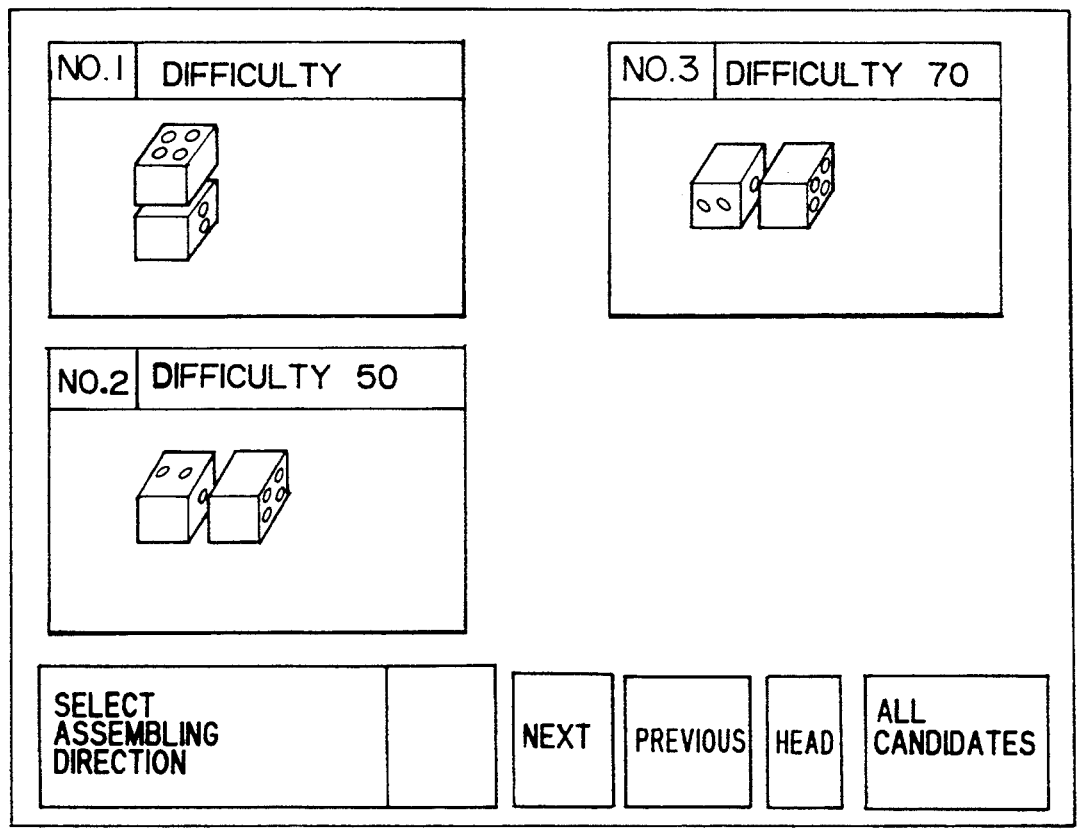
Figure 39A:
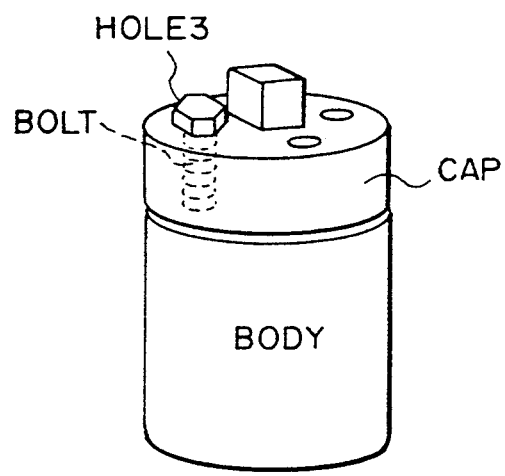
FIGS. 39A and 39B are views showing the assembling operation.
Figure 39B:
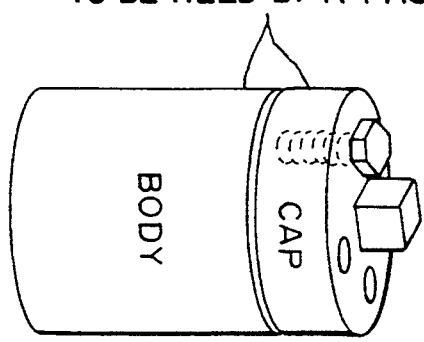

To cope with the conditions (1) and (2), the present invention provides an interactive system as shown in FIGS. 38A, 38B, and 38C which respectively illustrate the screens of the display unit. Each screen includes an area for an assembling-direction candidate, a candidate number, an input area, and candidate switching menus. The candidate is allowed to be displayed as follows.

(i) It is displayed in a three-dimensional manner, (ii) It is displayed with the data such as difficulty for supporting a user's decision, and (iii) It is displayed with a priority such as the sequence of less difficulties.

The candidate switching menus have the functions of;
Next: Next candidate is displayed,
Previous: Previous candidate is displayed,
Head: First candidate is displayed,
All candidates: All candidates are displayed.
The candidate is switched on the screen with the mouse being clicked on the candidate. The candidate number and the input area are used for the area for selecting one of the candidates by inputting the candidate number from the keyboard, for example. With the foregoing inputting means, it is possible to select a candidate among two or more candidates according to a user's desire in order to cope with the conditions (1) and (2). Each screen shown in FIG. 38 displays the following state.

(FIG. 38A) Initial State: One candidate determined as an optimum on the system's determination is displayed.

(FIG. 38B) As a result of selecting the "Next" menus, the second priority candidate is displayed.

(FIG. 38C) All the candidates are displayed.

(FIG. 39D) All the candidates are displayed with the priority ranks (NO.) and the reasons (Difficulty) in the form of the table. Select a proper one on the table, and the selected candidate is displayed in a three-dimensional manner.

The method for defining the assembling direction of the product has been described. The defined direction may be used for defining the optimum location. That is, considering the assembling operation, before assembling the parts, it is necessary to bring the parts from the place where they are located. In case the locating direction of each part is the same as the assembling direction of the part itself, the actions such as changing the part posture or re-handing the part are suppressed to a minimum, resulting in a reduced number of steps required for assembling each product. Hence, the locating direction (posture) of the parts employs the direction of the parts used in assembling the product.

The foregoing embodiment has concerned with the method for defining the assembling direction of the product and the parts based on the assembly knowledge. It may be possible to employ the method for assembling the parts from the bottom to the top according to the assembling direction. Considering the actual assembly, however, some parts are required to rotate or slide after being inserted in one direction or to be held when assembling each product. For example, considering the assembly shown in FIG. 39, if the assembly is done in the direction shown in FIG. 39A, a cap is placed on a body and then a bolt is fastened. If the assembly is done in the direction shown in FIG. 39B, the body and the cap have to be held together when the bolt is fastened.

Figure 40:
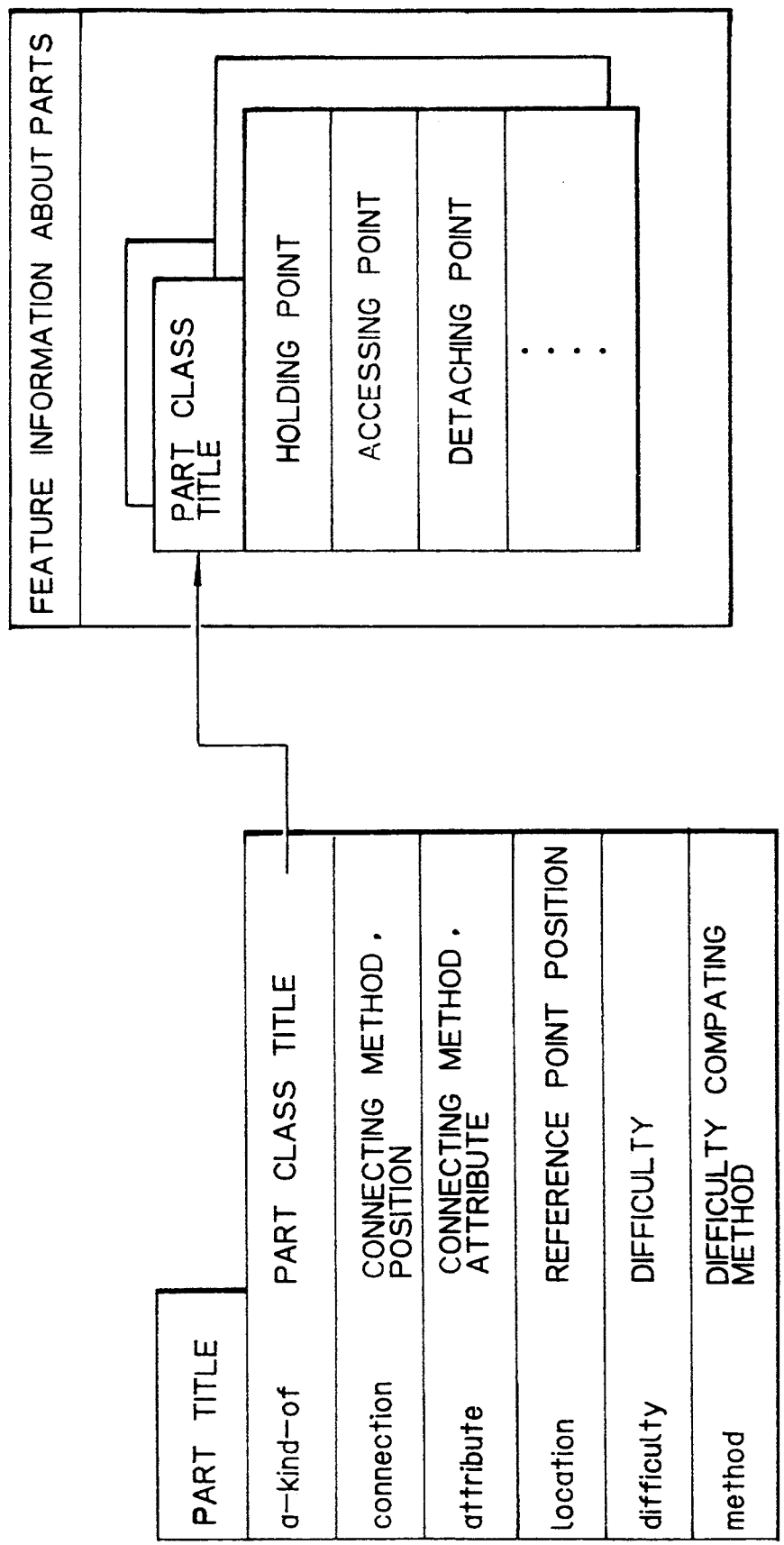
FIG. 40 is a graph showing structure data about the product.

In order to define the assembling sequence as considered in the aforementioned case, it is necessary to prepare the data about the product structure including the data about the positional relation and the detail attribute of the assembling work (rotation after being inserted, being held in assembly, and the like). One example of the product structure data is shown in FIG. 40. Each part includes the data (left hand of FIG. 40) indicated by the part title. The feature data of a part can be obtained by referrencing the data (right hand of FIG. 40) indicated by a part class title. The difficulty included in the data represents the difficulty described in the foregoing embodiment. Each time the assembling direction is changed, the difficulty is automatically updated by using the difficulty computing method.

The product structure can be represented by connecting the data about each part in a tree-structure manner as shown in FIGS. 33 and 34B.

Then, the description will be directed to how to define the assembling sequence based on the foregoing data.

Using the connecting method attribute, in case some parts are required to be rotated or to slide after being inserted, a high difficulty is added in calculating the difficulty. The difficulty calculation is equal to the below-indicated calculations.

i) Adding calculation of the number of the assembling directions from the top to the bottom, and ii) Addition of difficulty set according to each type of assembling direction.

By considering the attribute of the connecting method, more detailed determination is made possible.

The foregoing embodiment is concerned with the method for defining the assembling sequence as considering the detail attribute of the assembling operation. Considering the interference caused between the parts and the movable range of the machines, more detailed checking is required for obtaining a possible assembling sequence.

Figure 41A:
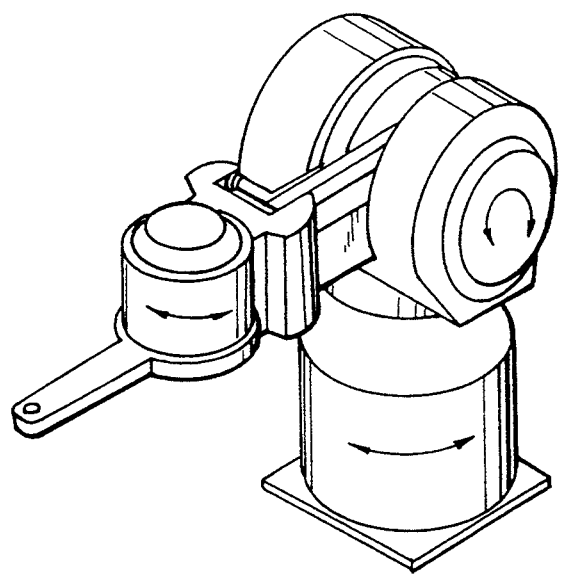
FIGS. 41A, 41B and 41C are views showing how a robot is moved on a working bench in the assembling operation.
Figure 41B:
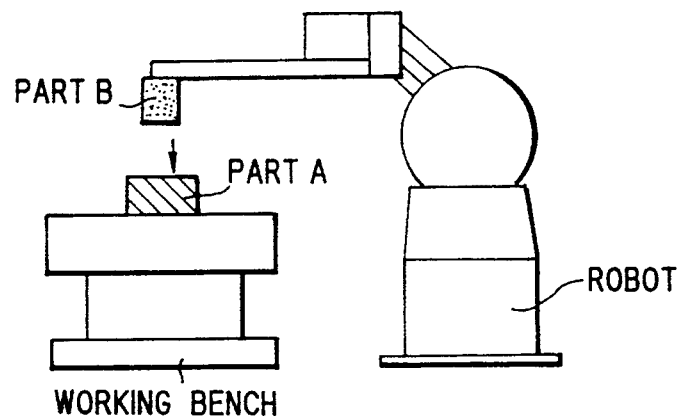
Figure 41C:
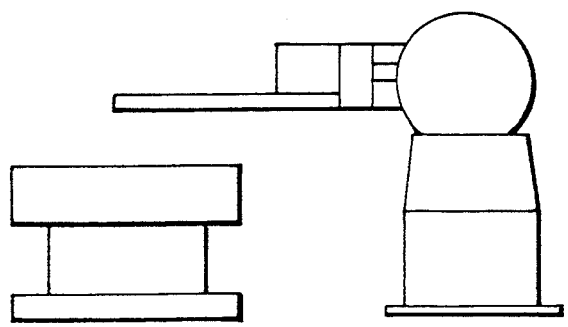
Figure 43:
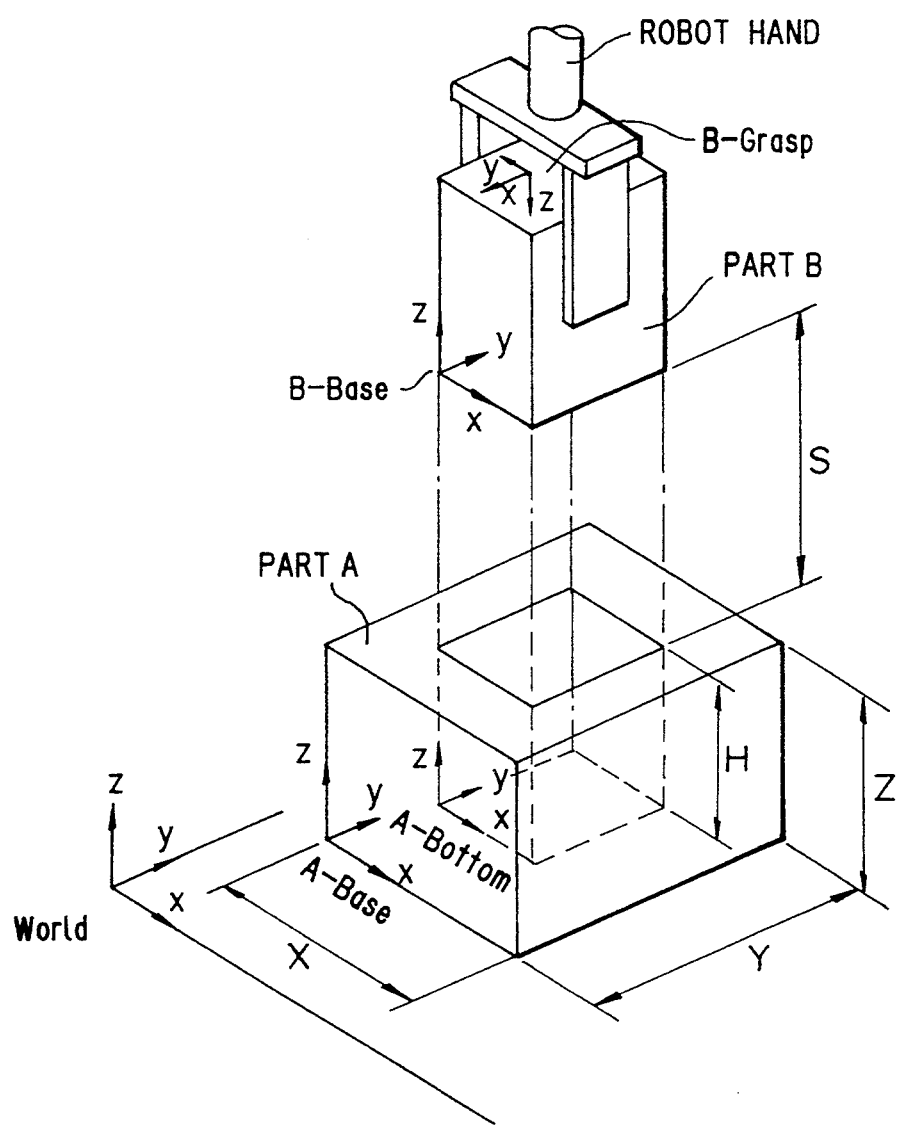
FIG. 43 is a view for describing how parts are inserted.

For example, assume that the robot shown in FIG. 41A operates to do the assembling operation shown in FIG. 41B. The operating range of the robot as shown in FIG. 41C expands so that the hand reaches the center of the working bench. However, it is not enough. When the part A is inserted into the part B as shown in FIG. 41B, it is necessary to linearly move the hand in the range indicated by an arrow. For the purpose, the robot has to be installed at the location shown in FIG. 41B in the light of the operating range of the robot. For checking the assembly feasibility as mentioned above, it is necessary to prepare:

i) the function data about the used machines and tools and the peripheral circumstances such as whether or not the robot is allowed to move linearly, and ii) the form data about the parts, the machinery, the tools, and the peripheral circumstances for checking the interference.

Then, the description will be directed to how to check the feasibility of the assembling sequence obtained in the embodiment based on the data i) and ii) and the relation among several pieces of data with reference to FIG. 42. Then, each step of FIG. 42 will be described.

Step 1

One assembling operation is picked up according to the assembling sequence defined in the embodiment.

Step 2

The operating range of the assembling operation is calculated. The operating range used herein means the range as shown in FIG. 41B, which will be obtained by the below-indicated method, for example. The detail of the part inserting operation shown in FIG. 41B will be indicated in FIG. 43 in which:

X, Y, Z, H: form dimension of each part of the part A,

S: Leisure distance given immediately before assembling the parts A and B,

A-Base, B-Base: reference coordinates of the parts A and B,

A-Bottom: feature coordinate of a hole of the part A,

B-Grasp: holding point of the part B.

Under the foregoing condition, for inserting the part B into the part A, it is necessary to move the part B, i) form the relation between the location and the posture shown in the A-Bottom and the B-Base on the world coordinate system, ii) in the minus direction of the Z-axis in the world coordinate system, and iii) only by the distance (S+H).

wherein the relation (i) between the location and the posture is obtained from the product structure data, the direction (ii) is obtained from the assembling direction, and the distance (iii) is obtained from the form data.

Step 3

With the function data included in the machine/tool data shown in FIG. 4, the machine/tool which is capable of doing the operation indicated in the (Step 2) is selected.

Step 4

With the operating range data of the selected machine/tool, the machine is installed to the location at which the operation shown in the (Step 2) is made possible.

Step 5

At the installation location defined at the (Step 4), it is checked if the selected machine/tool interferes with another machine or the peripheral circumstances based on the form data.

By repeating the foregoing operation for each assembling operation, it is possible to define the assembling sequence, and the layout of the used machine/tool.

In selecting the machine/tool of the (Step 3) of this embodiment and defining the layout of the (Step 4), two or more solutions may be derived.

As a method for selecting one of those solutions, as shown in FIG. 38, there is considered the method of displaying the information for aiding a user's decision on the display unit and determining the proper solution in an interactive manner. For example, in selecting the machine/tool, it is considered to display the usage frequency and the working ratio together with the candidate solutions for aiding the user's decision.

Figure 44:
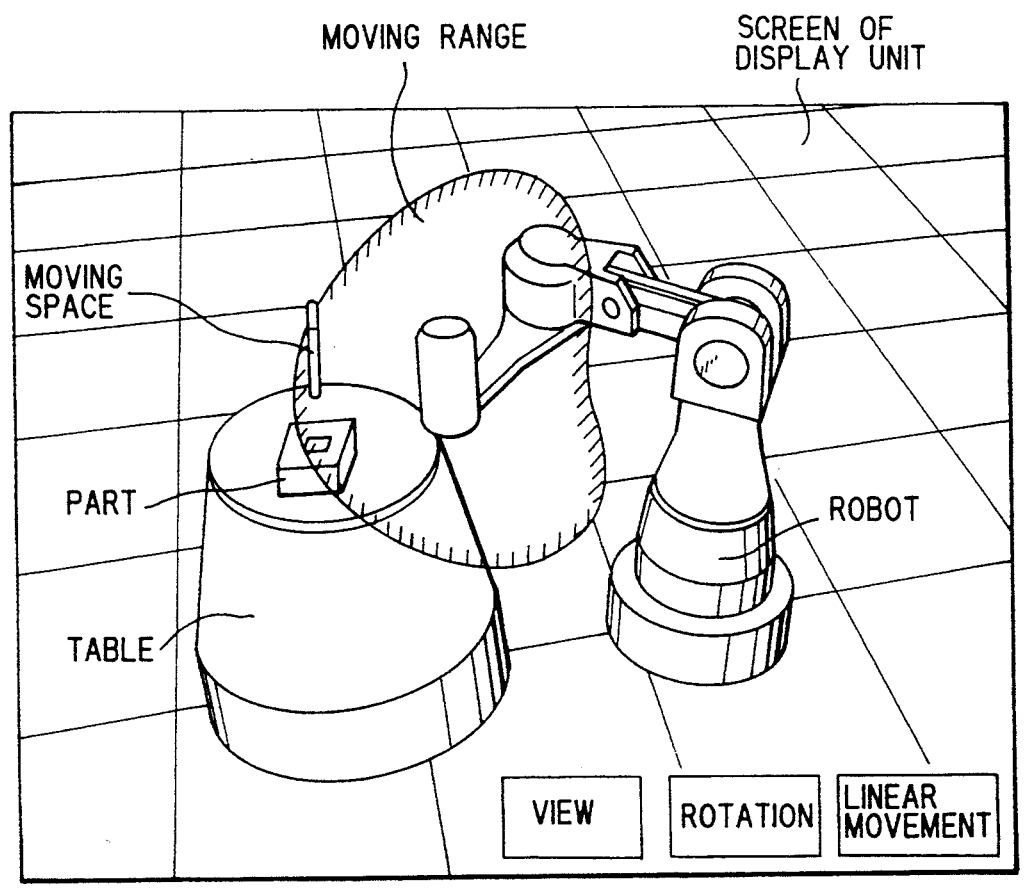
FIG. 44 is a view showing one example of a screen for defining a layout in an interactive manner.

In defining the layout, as shown in FIG. 44, the user may process in an interactive manner while viewing the screen.

FIG. 44 shows the assembling operation with the robot. In this figure, in addition to the robot, the table, and the parts, the operating range and the moving interval of the robot are displayed in a three-dimensional manner. The user can change the installation location of the robot with an input means such while a mouse as viewing the screen.

With the change of the installation location of the robot, the operating range is changed accordingly. For checking if any robot-installed apparatus is capable of doing any assembling operation, it is necessary to calculate the inclusive relation between the operating range and the moving interval and separate the displaying manner of the operating range from that of the area outside of the operating range (according to the color or luminance variation, for example).

This method can be realized in each assembling operation or can be used for checking the assembling interval relevant to the assembling operation of the overall product.

The menus shown in the right lower part of FIG. 44 are provided to support the change of view and the rotation and linear movement of the graphics, which are operated with the mouse being clicked.

For automatically selecting the machine/tool or defining the layout, there is prepared the method which employs the machine/tool selection knowledge and the machine location knowledge. The method will be described below.

The system includes the database which stores the machine selection knowledge, the tool selection knowledge, and the machine location knowledge as shown in FIG. 4. In addition, an inferring mechanism is provided for carrying out the inference with these knowledges.

The process executed in the system is the same as the process shown in FIG. 42. At the (Step 3) and the (Step 4), those knowledges and the inferring mechanism are used. At the (Step 3), the steps are taken of inputting the moving interval and the function data obtained at the (Step 2) and automatically defined the used machine/tool based on the knowledge about the using times of the machine, the working ratio, and the times of replacing the working steps. At the (Step 4), the steps are taken of inputting the moving interval obtained at the (Step 4) and the operating range data of the used machine/tool defined at the (Step 3) and automatically defining the layout based on the knowledge about the distribution of the operating range, the moving distance/time, and the like.

The production planning created as mentioned above is transmitted as the production information to the assembling and working system 4.

How the assembling and working system 4 operates to process will be described with reference to FIGS. 44 to 51.

Figure 45:
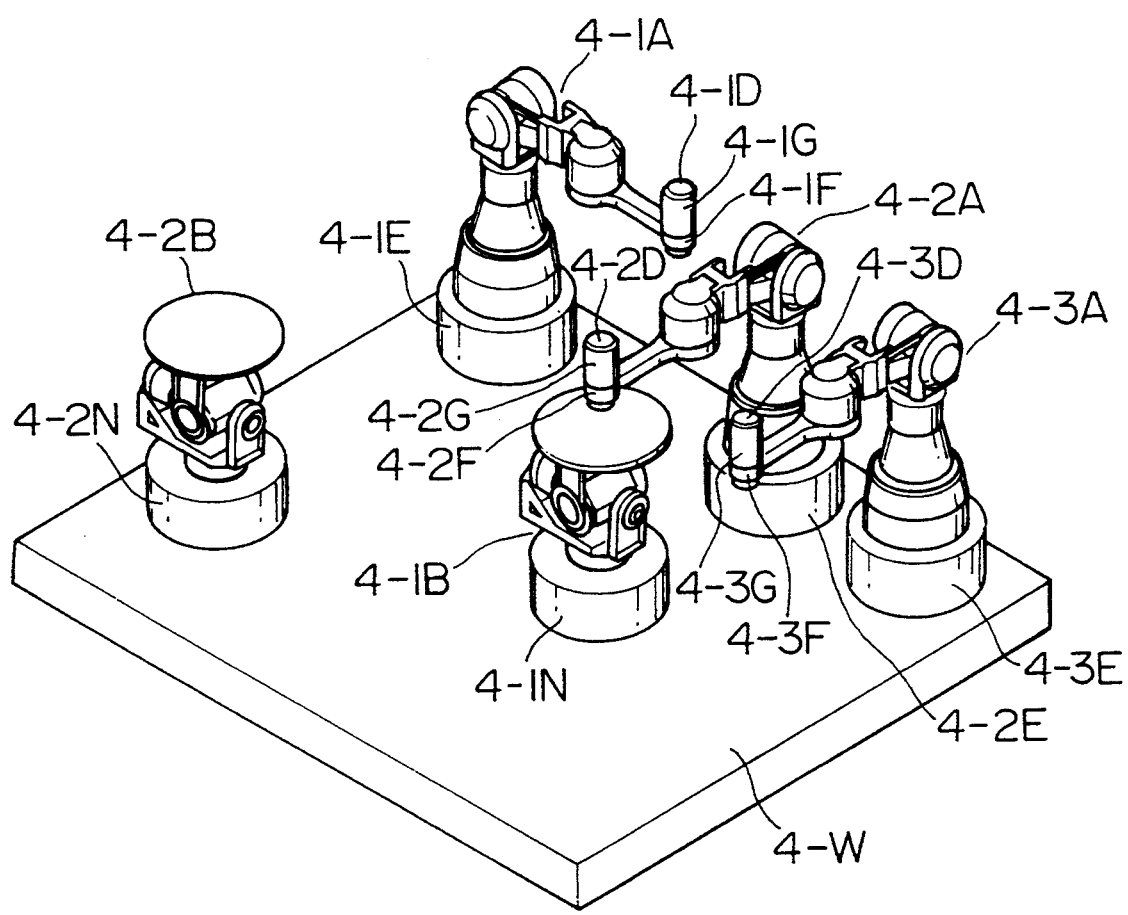
FIG. 45 is a perspective view showing an embodiment of a working or assembling apparatus having the combination of one positioning unit and one posture positioning unit.
Figure 46:
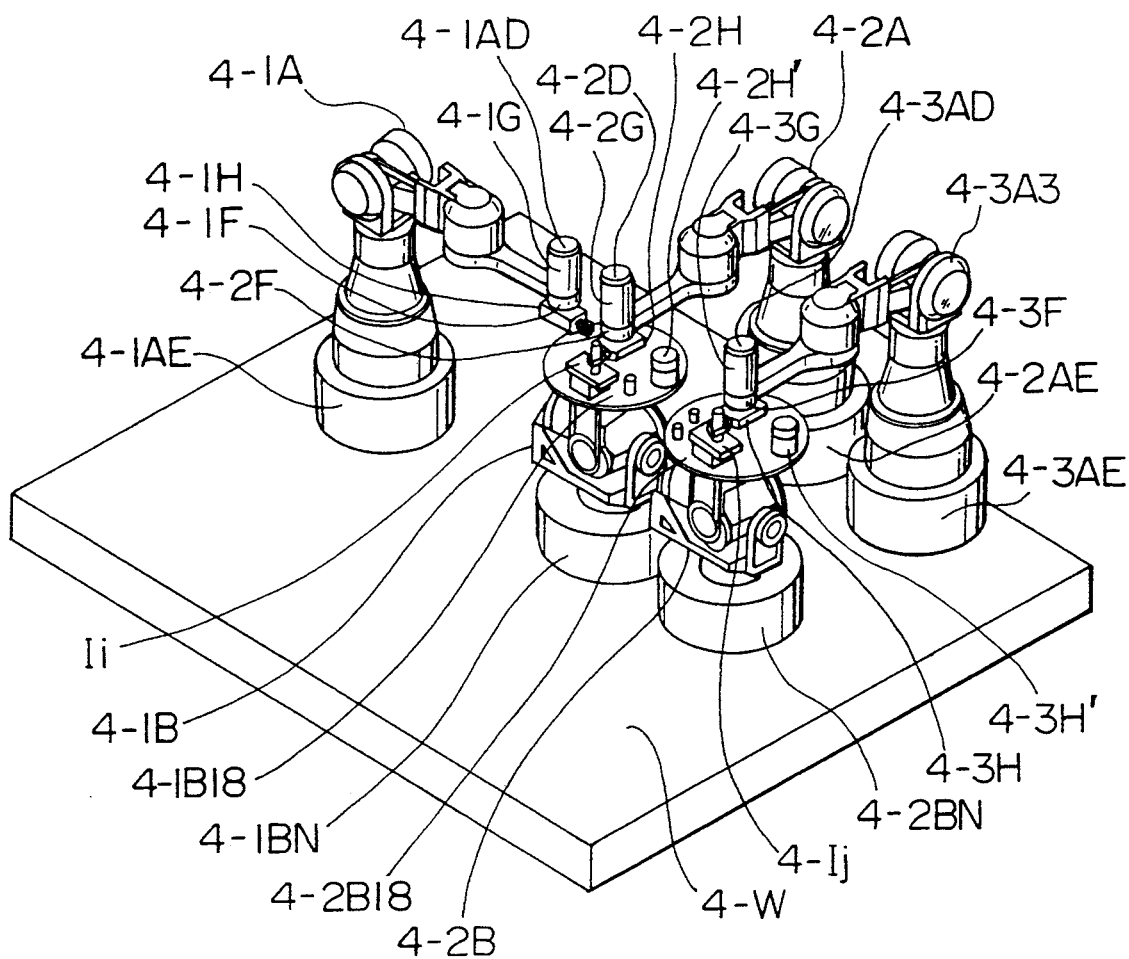
FIG. 46 is a perspective view showing another embodiment of a working or assembling apparatus having the combination of a working or assembling apparatus having the combination of three positioning units and two posture positioning units.
Figure 47:
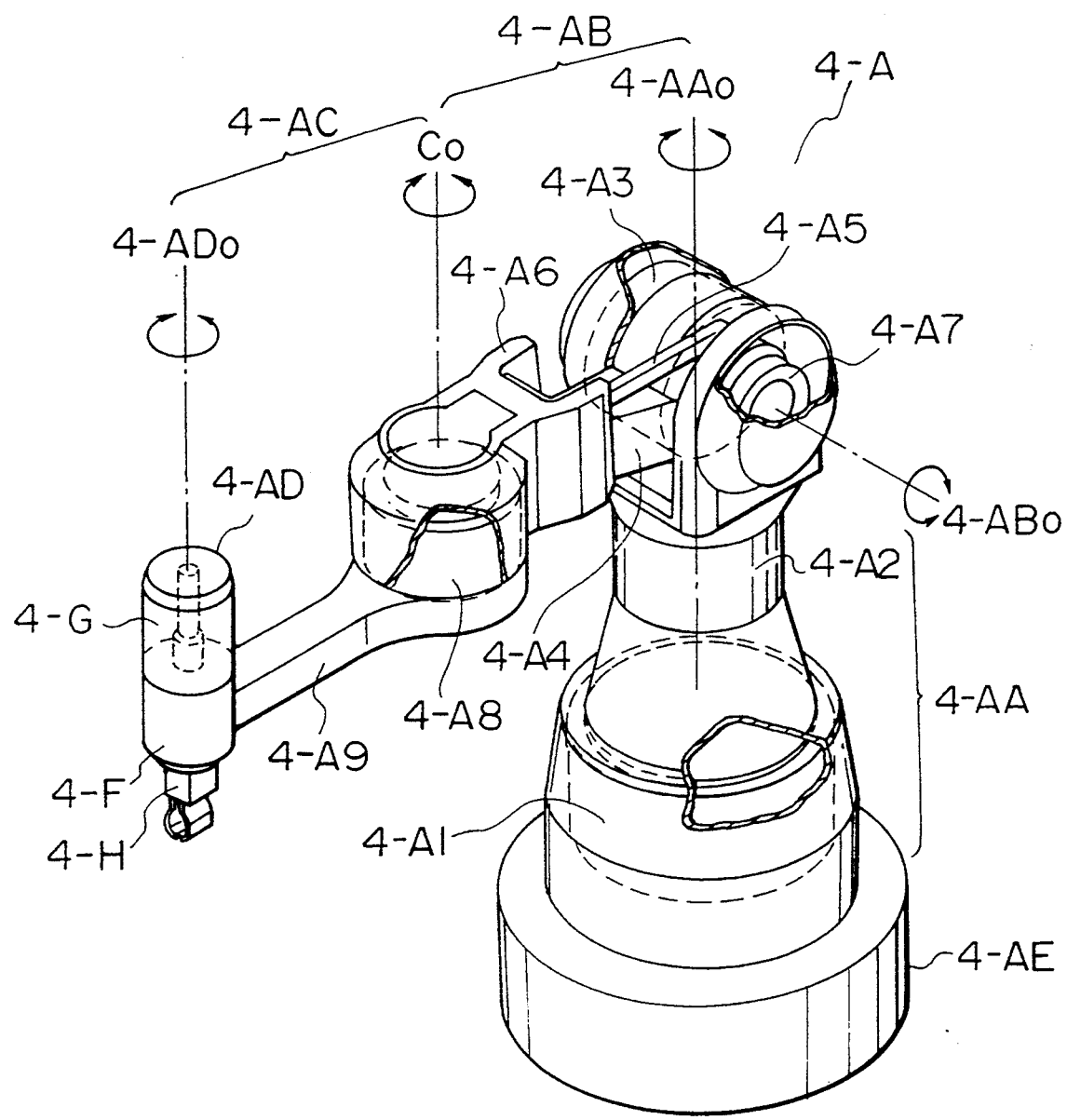
FIG. 47 is a perspective view showing the positioning unit shown in FIGS. 45 and 46.
Figure 48:
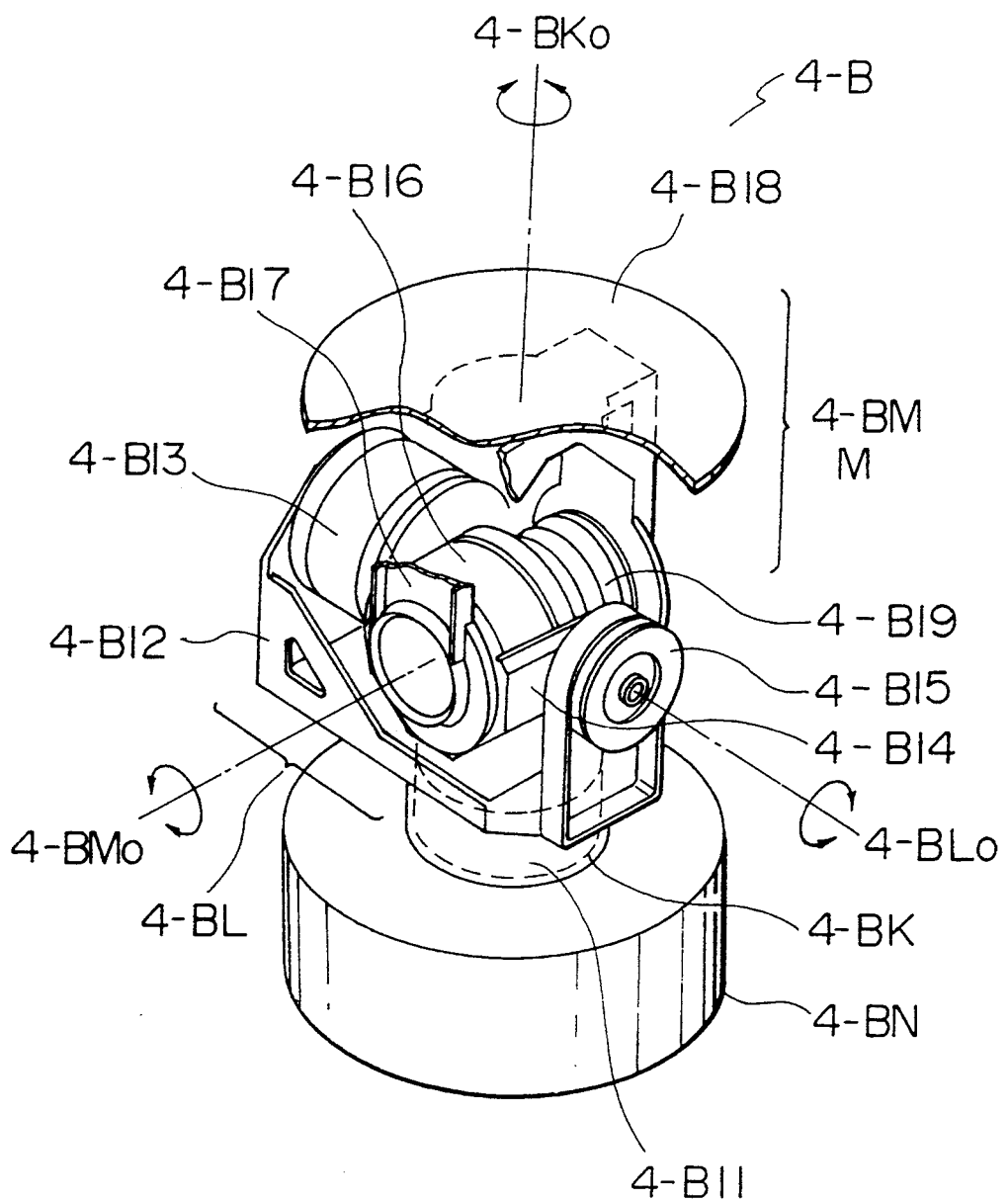
FIG. 48 is a perspective view showing the posture positioning unit shown in FIGS. 45 and 46.
Figure 49:
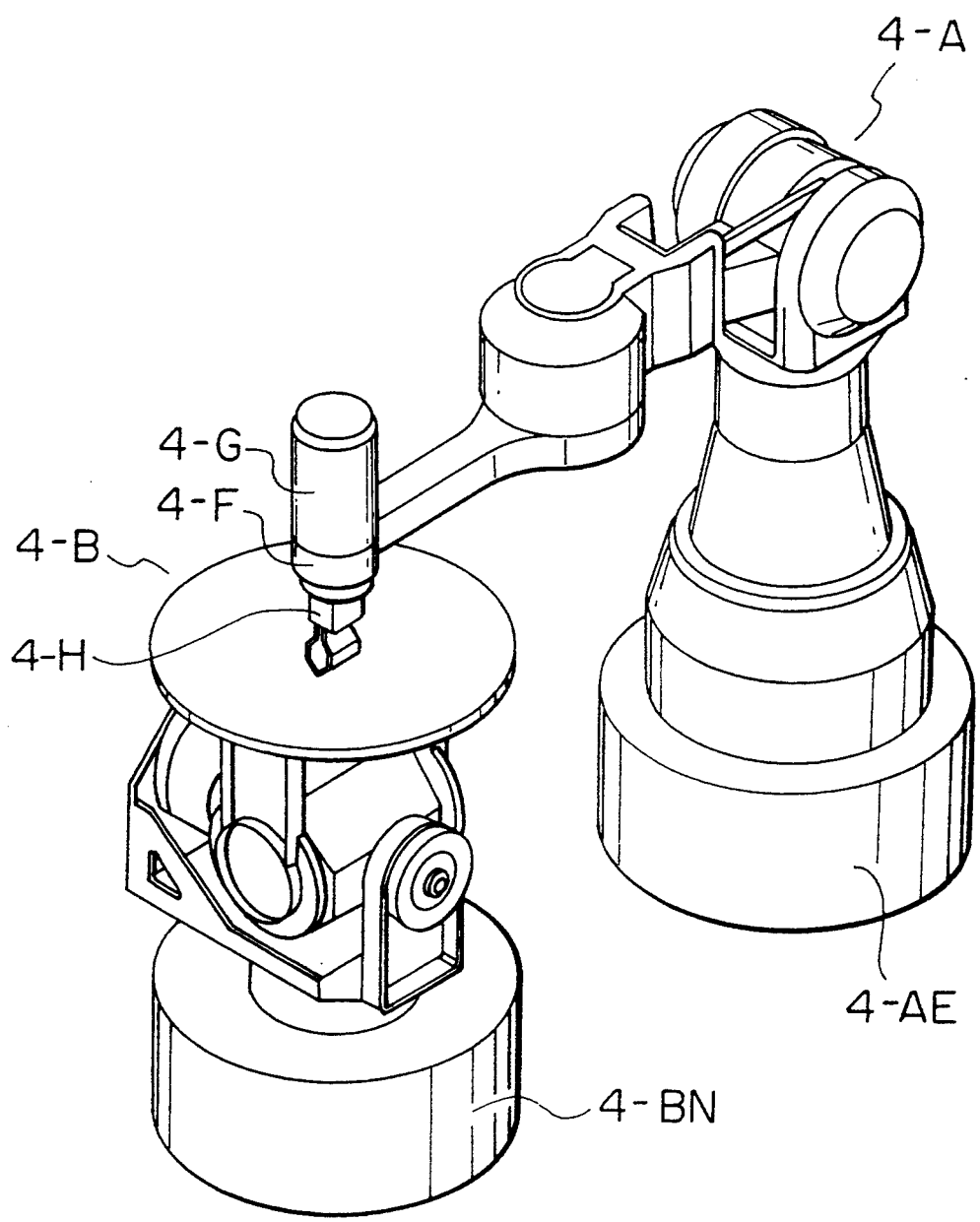
FIG. 49 is a perspective view showing a mechanism having the combination of the positioning unit shown in FIG. 47 and the posture positioning unit shown in FIG. 48.
Figure 50:
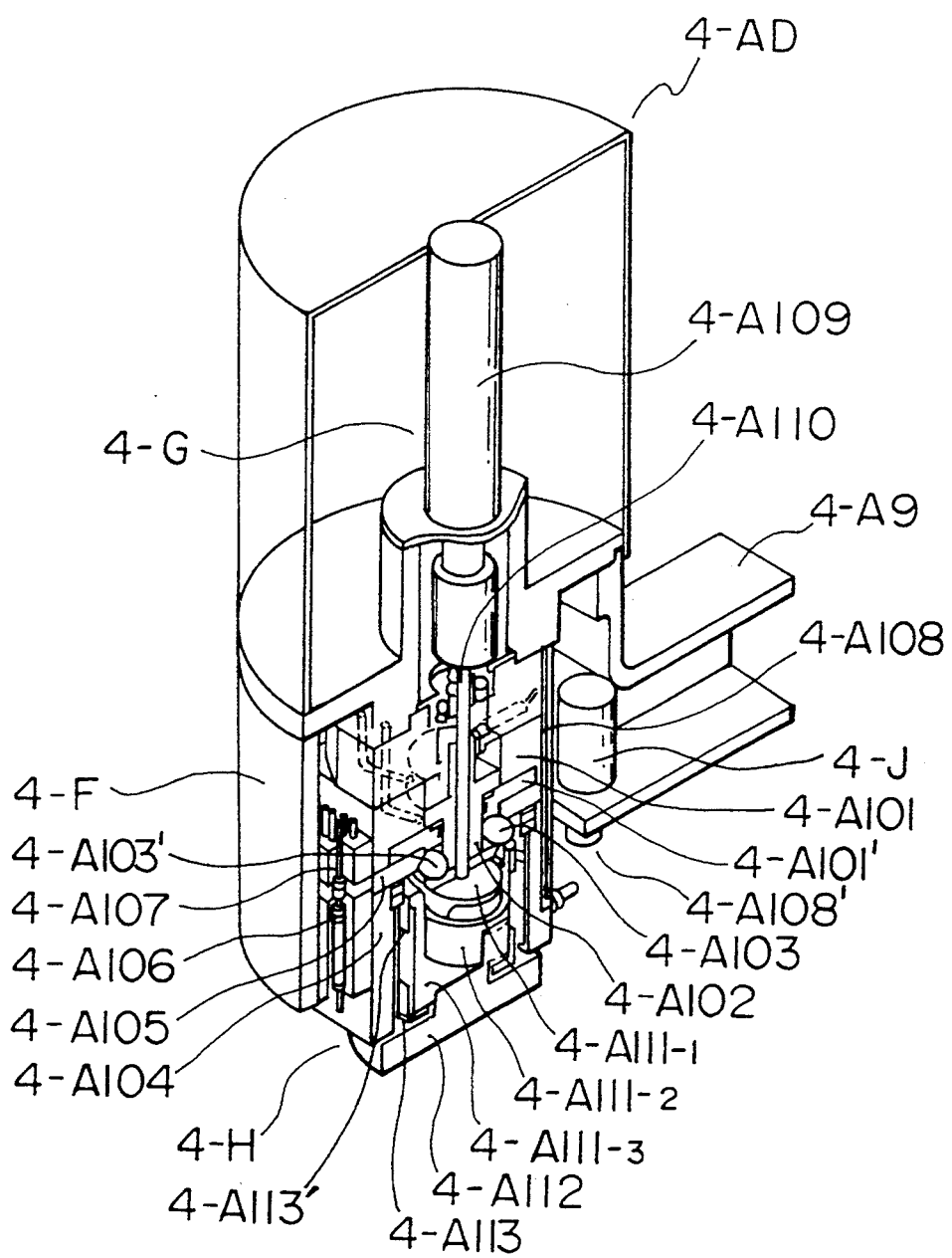
FIG. 50 is a perspective view showing a posture holding means and a position measuring means of a tool replacing mechanism having the positioning unit and an end effector having the tool replacing mechanism mounted thereto.
Figure 51:
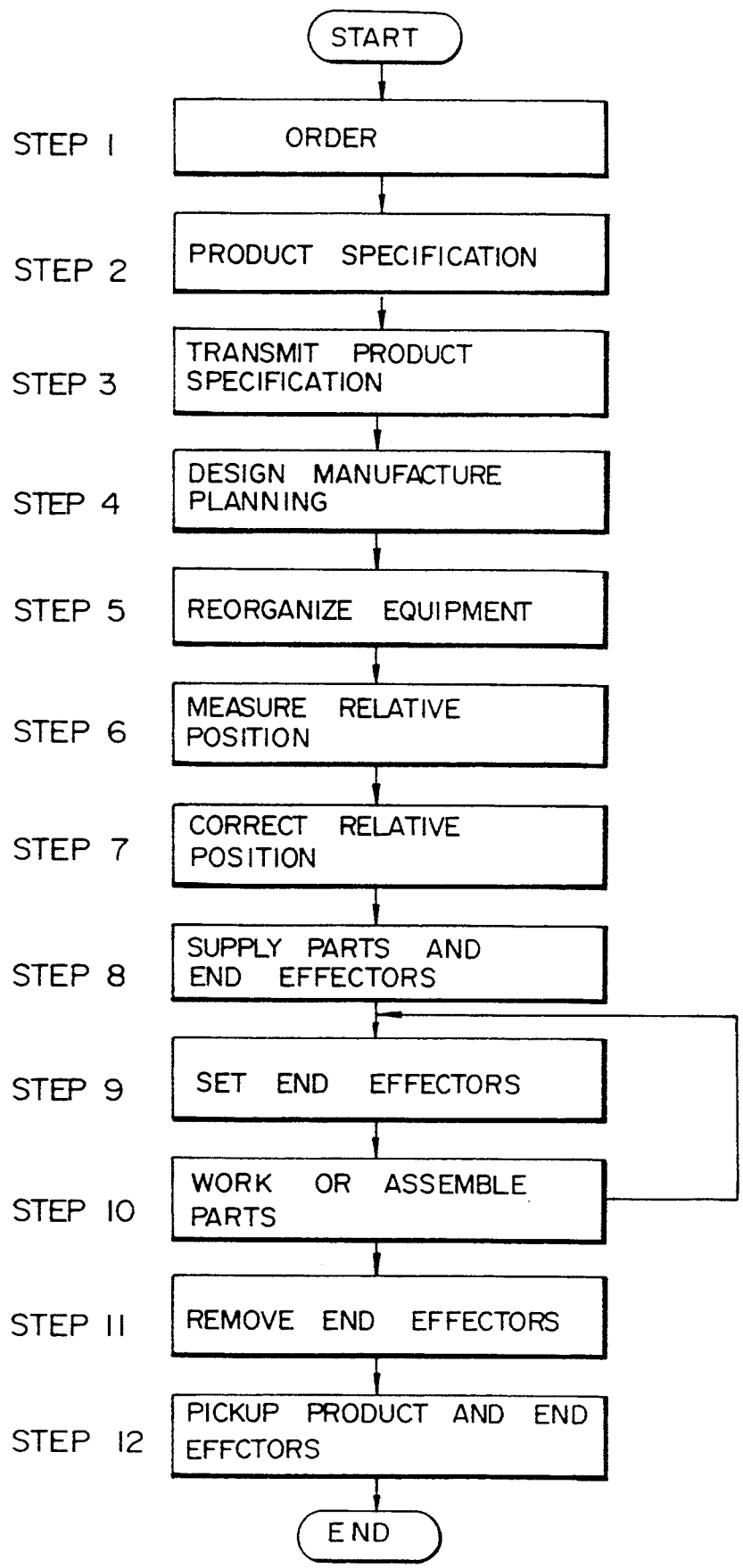
FIG. 51 is a flowchart for illustrating the operating content done in the embodiment shown in FIGS. 45 and 46.

FIG. 45 is a perspective view showing the working and assembling apparatus having three positioning units and two posture positioning units. In this figure, the other two positioning units 4-1A and 4-3A and the other posture positioning unit 4-2B are not in operation. FIG. 46 is a perspective view showing the working and assembling apparatus having three positioning units and two posture-positioning units. FIG. 47 is a perspective view showing the positioning unit shown in FIGS. 45 and 46. FIG. 48 is a perspective view showing the posture positioning unit shown in FIGS. 45 and 46. FIG. 49 is a perspective view showing the mechanism having a mechanism having the positioning unit shown in FIG. 47 and the posture positioning unit shown in FIG. 48. FIG. 50 is a perspective view showing a tool replacing mechanism provided in the positioning unit and the posture holding means and the location measuring means of an end effector mounted to the tool replacing mechanism. FIG. 51 is a flowchart showing the content of the operation done in the mechanisms shown in FIGS. 45 and 46.

As shown in FIG. 47, the positioning unit 4-A is composed of a three freedom-degree linear moving mechanism having a turning portion 4-AA, the vertical moving portion 4-AB, an arm portion 4-AC, and a hand portion 4-AD and a horizontally conveying mechanism of a carriage 4-AE. The turning portion 4-AA contains a direct drive motor 4-A1 inside of itself, the output shaft of which is directly connected to a turning post 4-A2 so that the direct drive motor 4-A1 is allowed to rotate on the center shaft 4-AAo. The vertical moving portion 40AB is a designed in a manner to vertically move the arm portion 4-AC through links 4-A4 and 4-A5. The arm portion 4-AC has a vertical moving member 4-A6 engaged with the ends of the links 4-A4 and 4-A5. And, an electromagnetic brake 4-A7 composes a gravity load balancing means of the direct drive motor 4-A3 included in the vertical moving portion 4-AB. The output shaft of the direct drive motor 4-A8 fixed in the arm portion 4-AC and a vertical member 4-A6 are directly connected to an arm 4-A9 so that the direct drive motor 4-A8 is rotated on the center shaft 4-ACo. The hand portion 4-AD provides a camera 4-J serving as a position measuring means for measuring the relative position relation among the tool replacing mechanism 4-F formed as shown in FIG. 50, a posture holding means 4-G of an end effector mounted to the tip of the tool replacing mechanism 4-F, the positioning unit 4-A, and the posture positioning unit 4-B. The end effector 4-H is positioned in the horizontal manner by controlling the rotation angles of the direct drive motor 4-A1 of the turning portion 4-AA and the direct drive motor 4-A8 of the arm portion 4-AC. Further, the end effector 4-H is positioned in a three-dimensional manner by controlling the rotation angle of the direct drive motor 4-A5 of the vertical moving portion 4-AB. With the vertical movement of the vertical moving member 4-A6, the ends of the pair of links 4-A4 and 4-A5 are vertically vibrated around the center line 4-ABo of the direct drive motor 4-A5 of the vertical moving portion 4-AB. The vertical moving member 4-A6 and the end effector 4-H are allowed to be positioned on the plane by controlling the rotation angles of the direct drive motor 4-A1 of the turning portion 4-AA and the direct drive motor 4-A8 of the arm portion 4-AC. On the other hand, the carriage 4-AE provides a moving means for moving the three freedom-degree linear moving mechanism and a fixing means for fixing the moving mechanism. It is a so-called floor carriage. When the positioning unit 4-A is moved from the carriage 4-AE, the relative positional relation between the positioning unit 4-A and the posture-positioning unit 4-B is changed. However, since the camera 4-J provided in the hand portion 4-AD serves to measure the relative position, the positional relation between both can be defined. The positioning unit A is allowed to provide an end factor 4-H suited to the operation by using the tool replacing mechanism 4-F provided in the hand portion 4-AD. The posture of the end effector 40H can be held by rotating the center shaft 4-ADo in the reverse direction by the addition of angles of the direct drive motor 4-A1 of the turning portion 4-AA and the direct drive motor 4-A8 of the arm portion 4-AC. The rotation of the center shaft 4-ADo is carried out by the posture holding means 4-G.

The posture positioning unit 4-B is composed of a three freedom-degree rotating mechanism having a rotation X portion 4-BK, a rotation Y portion 4-BL, and a rotation Z portion 4-BM and a horizontally conveying mechanism of the carriage 4-BN.

The rotation X portion 4-BK has a direct drive motor 4-B11 inside of itself. The output shaft of the direct drive motor 4-B11 is directly connected to a rotation Y base 4-B12 of the rotation Y portion 4-BL so that the rotation X portion 4-BK is allowed to rotate on the center shaft 4-BKo. The rotation Y portion 4-BL has a direct drive motor 4-B11, the output shaft of which is directly connected to the rotation base 4-B14 of the rotation Z portion 4-BM so that the rotation Y portion 4-BL is allowed to rotate on the center shaft 4-BLo. The rotation Y base 4-B12 provides a direct drive motor 4-B13 and an electromagnetic brake 4-B15 composing the gravity load balancing means in a manner to clip a rotation Z base 4-B14. The rotation Z portion 4-BM has the direct drive motor 4-B16, the output shaft of which is directly connected to the table frame 4-B17 having a table 4-B18 mounted thereon. The rotation base 4-B14 provides a direct drive motor 4-B16 and an electromagnetic brake 4-B19 composing the gravity load balancing means so that the rotation base 4-B14 is allowed to rotate on a center shaft 4-BMo. The center shafts 4-BKo, 4-BLo, and 4-BMo are arranged to be crossed on one point and at right angles. For positioning the posture of the table 4-B18 in a three-dimensional manner, therefore it is necessary to merely control the rotation angles of the direct drive motor 4-B11 of the rotation X portion 4-BK, the direct drive motor 4-B13 of the rotation Y portion 4-BL, and the direct drive motor 4-B16 of the rotation Z portion 4-BM. On the other hand, the carriage 4-BN provides a moving means for moving the three freedom-degree rotating mechanism and a fixing means for the moved three freedom-degree rotating mechanism. It is a so-called horizontal conveyance car. When the carriage 4-BN serves to move the posture positioning unit 4-B, the camera 4-J provided in the hand portion 4-AD of the positioning unit 4-A serves to measure the relative position of the posture positioning unit 4-B against the positioning unit 4-A so that the positional relation between both units 4-B and 4-A is allowed to be defined.

As shown in FIG. 49, hence, the positioning unit 4-A is capable of positioning an object gripped by the end effector 4-H and the posture positioning unit 4-B is capable of posture-positioning an object placed on the table-4-B1. Further, when the machine layout is changed with the movement of the carriage 4-AE of the positioning unit 4-A or the carriage 4-BN of the posture positioning unit 4-B, the camera 4-J serving as a position measuring means measures the relative position for the purpose of calibrating the coordinate axis. The combination of the two units allows the object to be positioned in any place and posture. And, two or more pairs of the two units allows the positional relation between them to be changed. The equipment layout is flexibly realized depending on the content of the working or assembling operation.

FIG. 50 shows the tool replacing mechanism 4-F provided in the hand portion 4-AD of the positioning unit 4-A, the posture holding means 4-G of the end effector 4-H mounted on the tip of the tool replacing mechanism 4-F, and the camera 4-J of the position measuring means. The tool replacing mechanism 4-F has an arm 4-A9 at the tip of which a cylinder 4-A101 is provided. By lowering a piston 4-A102 through the effect of a pressurized air, the taper portion formed at the tip of the piston 4-A102 serves to push out lock halls 4-A103 provided in the lower locations of the cylinder 4-A101 so that the lock balls 4-A103 come into contact with the corresponding tape plate 4-A105 provided on the upper end of a housing 4-A104 of the end effector 4-H. In this case, the electric connection is done between a probe pin 4-A106 and a contact pin 4-A107 and the air pressure connection is done between air passages 4-A108.

The posture holding means 4-G of the end effector 4-H provides a motor 4-A109 at the tip of the arm 4-A9. The motor 4-A109 has an output shaft 4-A110 which passes through the piston 4-A102 and is connected to the base 4-A104 of the end effector 4-AH through an Oldham's coupling so that the output shaft 4-A110 is allowed to rotate through a bearing 4-A113 provided in the housing 4-A104. The Oldham's coupling 4-A111 is arranged so that the Oldham upper part 4-A111-1, directly connected to the output shaft 4-A110, is engaged with an Oldham lower part 4-A111-3, directly connected to the base 4-A112 of the end effector 4-H, through the Oldham middle part 4-A111-2. The Oldham's coupling is functioned when the tool replacing mechanism 4-F replaces the end effector 4-H.

The tool or the hand of the end effector 4-H is allowed to provide a tool or hand on the base 4-A112 of the end effector 4-H according to the kind of operation. The tool or hand is allowed to be replaced with another one by the tool replacing mechanism 4-F. The posture of the tool or hand of the end effector 4-H is allowed to be held by the posture holding means 4-G. It means that the present assembling and working system provides a lot of functions corresponding to each working or assembling content.

In turn, the description will be directed to the operating flow done when the working or assembling operation is carried out in the equipment arrangements shown in FIGS. 45 and 46 with reference to FIG. 51.

FIG. 45 shows the state in which the combination of the positioning unit 4-2A and the posture positioning unit 4-1B terminates the working or assembling operation. In this state, the positioning units 4-1A and 4-3A and the posture positioning unit 4-2B are in the standby state and at the home positions. The positioning units, 4-1A, 4-2A, 4-3A and the posture positioning units 4-1B and 4-2B are located on a common stage 4-W. In this figure, the control unit shown in FIG. 5, the power line connected between the unit and the control unit, and the signal lines are not illustrative.

After terminating the working or assembling operation based on the equipment arrangement and function shown in FIG. 45, the process of working or assembling the parts based on the equipment arrangement and function shown in FIG. 46, as shown in FIG. 51, takes the steps of accepting a new order (Step 1), defining the product specification of the order (Step 2), transmitting the data modelling the product specification to the producing department (Step 3), and planning the production of the product (Step 4). Then, based on the resulting working plan for producing the product, at Step 5, the manufacturing equipment is reorganized for building a layout for the optimum equipment. That is, the positioning unit 4-1B is moved to the right position on the stage 4-W by the carriages 4-1AE, 4-2AE, 4-1BN and is fixed at the position. The positioning unit 4-3A and the posture positioning unit 4-2B are moved to a right position on the stage 4-W and are fixed at the position. At Step 6, the cameras 4-1J, 4-2J, 4-3J (not shown) provided at the hand portions 4-1AD, 4-2AD, 4-3AD of the positioning units 4-1A, 4-2A, 4-3A serve to recognize the target marks (not shown) provided on the tables 4-1B18, 4-2B18 of the posture positioning units 4-1B, 4-2B for the purpose of measuring the relative position of the positioning units from the posture positioning units. At Step 7, based on the data about the relative position, the calibration between both of the units is carried out for correcting the relative position. At Step 8, the parts 4-Ii, 4-Ij required for working or assembling the product and the end effectors 4-1H, 4-2H', 4-3H, 4-3H' are set on the tables 4-1B18 and 4-2B18. At Step 9, the end effectors 4-1H, 4-2H, 4-3H used for working and assembling are linked to the tool replacing mechanisms 4-1F, 4-2F, 4-3F of the positioning units 4-1A, 4-2A, 4-3A for the purpose of setting the end effectors. At Step 10, the working or assembling operation is carried out according to the working and assembling sequence planned at the Step 4. On the way of the Step 10, the end effectors 4-1H, 4-2H, 4-3H are replaced on the basis of the operating plan. In case the working or assembling of the parts requires the direction and the posture to be held, the posture holding means 4-1G, 4-2G, 4-3G start to operate. The posture holding means 4-1G, 4-2G, 4-3G are provided in the end effectors 4-1H, 4-2H, 4-3H mounted to the tip of the tool replacing mechanisms 4-1F, 4-2F, 4-3F provided at the hand portions 4-1AD, 4-2AD, 4-3AD of the positioning units 4-1A, 4-2A, 4-3A. The repetition of the Step 9 and the Step 10 results in the termination of the working or assembling of the parts. At Step 11, the end effectors 4-1H, 4-2H, 4-3H are removed. Finally, at Step 12, the completed product and the end effector 4-H are moved from the table 18 and then the operation is terminated.

Figure 52:
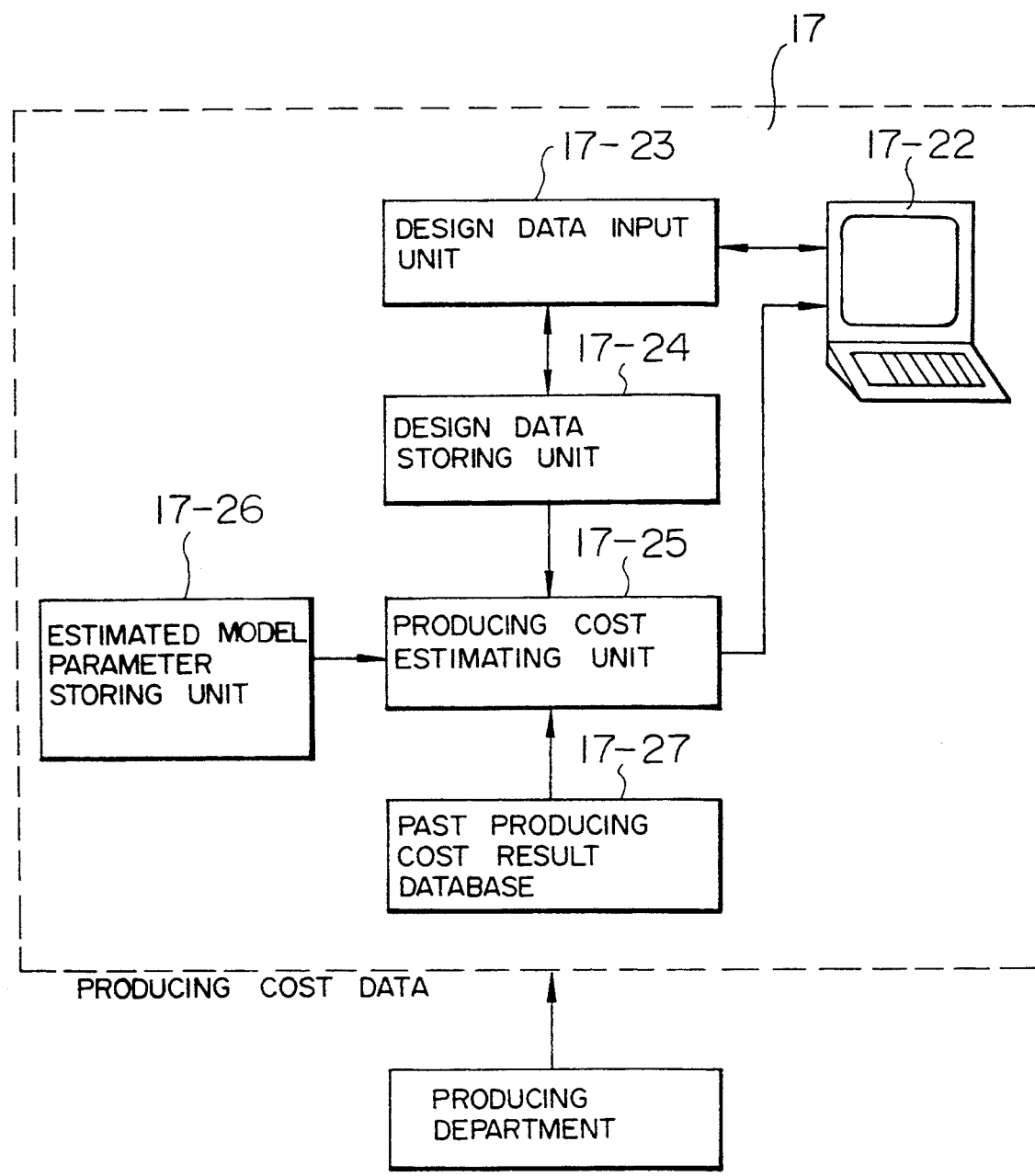
FIG. 52 is a block diagram showing how to calculate a production cost by using the information about the feature of manufacturing equipment transmitted from the producing department in a detail CAD system 17.

FIG. 52 is a block diagram showing how to estimate the production cost based on the information about the feature of the manufacturing equipment transmitted from the producing department in the detail design CAD system 17. In FIG. 52, the arrangement about how to estimate the production cost of the detail design CAD system 17 includes a detail design processing unit 17-23, a design data storing unit 17-24, a production cost estimating unit 17-25 having a pattern learning function, an estimated model parameter storing unit 17-26, and a past production cost result database 17027. This arrangement is designed to transmit the defined design data to the ordering department and the production department and accept the data about the actual production cost from the producing department.

In case a designer performs detail design through an I/O unit 17-22, he or she can accept the estimated result of the production cost. The design data processed by a detail design processing unit 17-23 is stored in a design data storing unit 17-24 and is used in a production cost estimating unit 17-25. The production cost estimating unit 17-25 serves to carry out the pattern conversion by referring to a past production cost result database 17-27 storing the data about the production cost obtained from the production department and output to the I/O unit 17-22 the estimated value of the production cost each time the design data is newly input or changed. The parameters used in the model for carrying out the pattern conversion are stored in the model parameter storing unit 17-26. The parameters are updated to an optimum value as a result of carrying out the learning so that the previous estimated data is made closer to the actually consumed production cost. The present arrangement makes it possible to show the correct production cost against the design data input by a designer even if the effect of the design specification on the production cost is vague, resulting in leading the design in which the production cost is considered. The resulting production cost is transmitted to each product specification defining system 1 through the order generalizing system 2 or directly, in which system 1 the production cost is used for defining the final price of each product.

The present invention has been arranged as described above. Hence, the invention offers the following effects.

1. Since the information is replaced between the ordering department and the production department, the function-, cost- and due date-balanced product specification can be defined.

2. Since the optimum steps and equipment arrangement is planned and the equipment arrangement is flexibly realized, the product with various kinds of specifications can be more efficiently produced.

3. Since the information is replaced between the ordering department and the designing department, if the product with the required specification need the out-of-stock parts, such product can be swiftly designed and produced. The designing department is capable of accepting the tendency about the customer requirements from the ordering department and designing the product suited to each requirement of a customer.

Different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and the scope of the claims.

What is claimed is:

1. A custom manufacturing system comprising:
   means for selectively indicating a particular product having custom product specifications required by a customer;
   a product ordering department having means for receiving said required product specifications input by said customer;
   a design department for designing custom product design information for said specified product according to said input required custom product specifications, said design department having means for storing said custom product design information;
   a production department for manufacturing said product according to said custom product design information, said production department having means for outputting and storing production status information and means for storing end product manufacturing information, wherein said production department receives said custom product design information from said design department via a transmitting means;
   means for estimating and showing at least one of completion time data and cost data according to said custom product design information and said production status information; and
   means for creating and displaying a product design having said input custom required specifications, according to said product design information, said production status information and said end product information.

2. The custom manufacturing system according to claim 1 further comprising means for storing a manufacturing result of the product and wherein the product design based on the manufacturing result is shown to a customer.

3. The custom manufacturing system according to claim 1 further comprising means for, if the product design meeting the input custom required specification of the product is not shown, transmitting said required specification to said design department, and
   means for, after the product meeting said input custom required specification is designed, transmitting said design information to means for storing the design information of said product so that said storing means can newly store said design information.

4. The custom manufacturing system according to claim 1 further comprises means for transmitting information indicating a production feature of the production department to the design department, and means for designing the product based on the feature information of the production department and transmitting the design information to the production department.

5. The custom manufacturing system according to claim 1 wherein said production department comprises production planning means for creating production planning information for the product ordered by said customer, and means for manufacturing the product based on said production planning information.

6. The custom manufacturing system according to claim 5, wherein said production planning means includes a database for storing feature data of parts composing each product, product structure data, and assembly knowledge based on the function performance of manufacturing equipment, and means for defining an assembling sequence, machinery, and an equipment layout for manufacturing said product.

7. The custom manufacturing system according to claim 5, wherein said means for manufacturing the product includes at least one pair of a positioning means, having a three-dimensional mechanism and a place conveying mechanism, and a posture positioning means providing a plane conveying mechanism in a three-dimensional posture positioning mechanism, said manufacturing means further comprising a position recognizing device for recognizing relative positional relation between moving mechanisms.

8. The custom manufacturing system according to claim 1, wherein said means for inputting the input custom required specification of said product has a function for inputting a three-dimensional form and color of a sample as an outer appearance specification.

9. The custom manufacturing system according to claim 1, wherein said means for inputting the required specification of said product has a function for inputting quantity and type specifications.

10. The custom manufacturing system according to claim 1, wherein said means for inputting a selective indication of the product to be purchased has a function of for inputting a proper specification selected from two or more recommended specifications.

11. The custom manufacturing system according to claim 1, wherein said means for inputting the required specification of said product has a function of changing an input outer appearance specification.

12. The custom manufacturing system according to claim 1, wherein the production status information of said production department is the data representing the production stage in process and the operating state of the equipment in the production department.

13. A custom manufacturing system according to claim 1 wherein said end product manufacturing information comprises cost of the manufactured product and date of completion of production.

14. A custom manufacturing system according to claim 1, wherein completion time data and cost data are estimated according to previous end product information stored in said production department and said production status information output by said production department.

15. A custom manufacturing system comprising:
means for storing an input of required specifications of a product,
means for collecting a plurality of required specifications stored in said storing means and transmitting said plurality of required specifications to a designing department,
means for designing a product choosing from required specifications most frequently input based on said plurality of required specifications,
means for storing design information for said product,
means for producing said product according to said required specifications,
means for transmitting said design information of said product having selected required specifications, chosen from said plurality of required specifications, to said means for storing the design information of said product, and
means for transmitting said design information for said product from said means for designing said product to said means for producing said product.

16. A custom manufacturing method comprising the steps of:
inputting a plurality of required specifications of a product,
collecting the plurality of required specifications;
transmitting the plurality of required specifications to a design department,
determining the product design using required specifications most frequently input based on the data about said collected plurality of required specifications,
designing the product based on the determined product design information chose from the frequently required specifications, and
transmitting the product design to a production department, and
producing the product according to the product design information.

* * * * *